United States Patent
Chandrasekhar et al.

(10) Patent No.: US 12,410,355 B2
(45) Date of Patent: Sep. 9, 2025

(54) COMPOSITIONS AND METHODS FOR CARBON DIOXIDE SOLIDIFICATION

(71) Applicant: CHEVRON U.S.A. INC., San Ramon, CA (US)

(72) Inventors: Sriram Chandrasekhar, Houston, TX (US); Taimur Malik, Houston, TX (US); Behdad Aminzadeh Goharrizi, Spring, TX (US); Sujeewa S. Palayangoda, San Ramon, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 0 days.

(21) Appl. No.: 18/234,318

(22) Filed: Aug. 15, 2023

(65) Prior Publication Data

US 2024/0067860 A1 Feb. 29, 2024

Related U.S. Application Data

(60) Provisional application No. 63/398,180, filed on Aug. 15, 2022.

(51) Int. Cl.
*E21B 41/00* (2006.01)
*C09K 8/42* (2006.01)
*C09K 8/493* (2006.01)

(52) U.S. Cl.
CPC .............. *C09K 8/493* (2013.01); *C09K 8/426* (2013.01)

(58) Field of Classification Search
CPC ....... C09K 8/426; C09K 8/493; E21B 41/005; E21B 41/0057; E21B 41/0064
See application file for complete search history.

(56) References Cited

U.S. PATENT DOCUMENTS

| | | |
|---|---|---|
| 3,811,504 A | 5/1974 | Haferkamp et al. |
| 3,811,505 A | 5/1974 | Flournoy et al. |
| 3,811,507 A | 5/1974 | Flournoy et al. |
| 3,890,239 A | 6/1975 | Dycus et al. |
| 4,463,806 A | 8/1984 | Hurd |
| 5,488,148 A | 1/1996 | Weerasooriya et al. |
| 6,022,843 A | 2/2000 | Shanks et al. |
| 6,225,267 B1 | 5/2001 | Eckard et al. |
| 7,629,299 B2 | 12/2009 | Berger et al. |
| 7,770,641 B2 | 8/2010 | Dwarakanath et al. |

(Continued)

FOREIGN PATENT DOCUMENTS

| | | |
|---|---|---|
| WO | 2008/079855 A2 | 7/2008 |
| WO | 2011/094442 A1 | 8/2011 |

(Continued)

OTHER PUBLICATIONS

Williams, Neil J., et al. "CO2 capture via crystalline hydrogen-bonded bicarbonate dimers." Chem 5.3 (2019): 719-730.

(Continued)

*Primary Examiner* — Angela M DiTrani Leff
(74) *Attorney, Agent, or Firm* — Meunier Carlin & Curfman LLC

(57) ABSTRACT

Compositions and methods that can be used to sequester carbon dioxide within a subterranean formation are described. The methods can include contacting carbon dioxide present in the subterranean formation with a complexing agent, resulting in precipitation of a carbonate or bicarbonate salt of the complexing agent within the subterranean formation.

16 Claims, 6 Drawing Sheets

(56) References Cited

U.S. PATENT DOCUMENTS

| | | | |
|---|---|---|---|
| 8,211,837 | B2 | 7/2012 | Weerasooriya et al. |
| 9,422,469 | B2 | 8/2016 | Dwarakanath et al. |
| 9,605,198 | B2 | 3/2017 | Shong et al. |
| 9,617,464 | B2 | 4/2017 | Dwarakanath et al. |
| 9,976,072 | B2 | 5/2018 | Shong et al. |
| 10,266,750 | B2 | 4/2019 | Oghena et al. |
| 10,337,303 | B2 | 7/2019 | Dwarakanath et al. |
| 10,583,387 | B2 * | 3/2020 | Custelcean ......... B01D 53/1475 |
| 10,633,332 | B2 * | 4/2020 | Custelcean ........... C07C 281/18 |
| 2005/0199395 | A1 | 9/2005 | Berger et al. |
| 2006/0185845 | A1 | 8/2006 | Shpakoff et al. |
| 2006/0189486 | A1 | 8/2006 | Shpakoff et al. |
| 2006/0216811 | A1 * | 9/2006 | Cunningham ........... B65G 5/00 |
| | | | 435/41 |
| 2007/0191633 | A1 | 8/2007 | Berger et al. |
| 2009/0112014 | A1 | 4/2009 | Campbell et al. |
| 2009/0270281 | A1 | 10/2009 | Steinbrenner et al. |
| 2010/0004843 | A1 | 1/2010 | Yu et al. |
| 2010/0012331 | A1 * | 1/2010 | Larter ................... E21B 43/243 |
| | | | 166/401 |
| 2010/0200465 | A1 * | 8/2010 | Dana ....................... C10B 53/06 |
| | | | 196/46 |
| 2010/0292110 | A1 | 11/2010 | Pope et al. |
| 2010/0319920 | A1 | 12/2010 | Pope et al. |
| 2011/0046024 | A1 | 2/2011 | Campbell et al. |
| 2011/0048721 | A1 | 3/2011 | Pope et al. |
| 2011/0059872 | A1 | 3/2011 | Weerasooriya et al. |
| 2011/0059873 | A1 | 3/2011 | Weerasooriya et al. |
| 2011/0071057 | A1 | 3/2011 | Weerasooriya et al. |
| 2011/0100402 | A1 | 5/2011 | Soane et al. |
| 2011/0190174 | A1 | 8/2011 | Weerasooriya et al. |
| 2011/0190175 | A1 | 8/2011 | Steinbrenner et al. |
| 2011/0201531 | A1 | 8/2011 | Sharma et al. |
| 2017/0198202 | A1 | 7/2017 | Shong et al. |
| 2021/0277301 | A1 * | 9/2021 | Varela ..................... E21B 43/26 |
| 2024/0018849 | A1 * | 1/2024 | Patel .................. E21B 41/0064 |

FOREIGN PATENT DOCUMENTS

| | | |
|---|---|---|
| WO | 2012/027757 A1 | 3/2012 |
| WO | 2012/069477 A1 | 5/2012 |

OTHER PUBLICATIONS

Kasturi, A., Gabitto, J., Tsouris, C., & Custelcean, R. (2021). Carbon dioxide capture with aqueous amino acids: Mechanistic study of acid regeneration by guanidine crystallization and process intensification. Separation and Purification Technology, 271, 118839.

Zhang, Jincai, and Shang-Xian Yin. "Fracture gradient prediction: an overview and an improved method." Petroleum Science 14 (2017): 720-730.

Barnes, Julian R., et al. "Application of internal olefin sulfonates and other surfactants to EOR. Part 1: Structure-Performance relationships for selection at different reservoir conditions." SPE improved oil recovery symposium. OnePetro, 2010. SPE-129766-MS https://doi.org/10.2118/129766-MS.

Metz, B., et al., (2005). "IPCC special report on carbon dioxide capture and storage." Cambridge: Cambridge University Press, Chapter 5.

Custelcean et al., ChemSusChem, 13, 6381-6390, 2020.

Custelcean, Chem. Commun., 56, 10272, 2020.

* cited by examiner

COMPOSITIONS AND METHODS FOR CARBON DIOXIDE SOLIDIFICATION

CROSS-REFERENCE TO RELATED APPLICATION

This application claims priority to U.S. Provisional Application 63/398,180, filed on Aug. 15, 2022, the contents of which is hereby incorporated by reference in its entirety.

BACKGROUND

There is significant interest in methods for $CO_2$ storage. While various methods have been explored, existing methods for $CO_2$ storage exhibit significant shortcomings. Accordingly, there remains a need for new methods of $CO_2$ storage. The compositions and methods disclosed herein address these and other needs.

SUMMARY

Provided herein are compositions and methods of using the compositions thereof. The methods described herein can be used for sequestering carbon dioxide, influencing migration of a gas or fluid, and/or reducing and/or preventing migration of a gas or fluid within a subterranean formation.

In some embodiments, the methods for sequestering carbon dioxide within a subterranean formation can include contacting carbon dioxide present in the subterranean formation with a complexing agent, resulting in precipitation of a carbonate or bicarbonate salt of the complexing agent within the subterranean formation. In some embodiments, contacting can include injecting an aqueous composition including a complexing agent into the subterranean formation via a wellbore in fluid communication with the subterranean formation.

In some embodiments, the methods of influencing migration of a gas or fluid within a subterranean formation can include injecting an aqueous composition including a complexing agent into the subterranean formation via a wellbore in fluid communication with the subterranean formation; displacing the complexing agent to a desired location within the subterranean formation; and contacting the complexing agent with carbon dioxide, resulting in precipitation of a carbonate or bicarbonate salt of the complexing agent at the desired location within the subterranean formation.

In some embodiments, the methods of reducing and/or preventing migration of a gas or fluid within a subterranean formation can include injecting an aqueous composition including a complexing agent into the subterranean formation via a wellbore in fluid communication with the subterranean formation; and displacing the complexing agent to a desired location within the subterranean formation to form a barrier to reduce and/or prevent gas or fluid (e.g., carbon dioxide) penetration. In some embodiments, when the complexing agent contacts carbon dioxide, a precipitate comprising a carbonate or bicarbonate salt of the complexing agent forms at the desired location within the subterranean formation.

In some embodiments, the methods can further include injecting a gas comprising $CO_2$ through the wellbore and into the subterranean formation. In some embodiments, the gas comprises at least 60% $CO_2$. In some embodiments, the gas is from 95% to 100% $CO_2$.

In some embodiments, the complexing agent can include an iminoguanidine complexing agent described herein. In some embodiments, the carbonate or bicarbonate salt of the complexing agent can be a carbonate or bicarbonate salt of an iminoguanidine complexing agent described herein. In some embodiments, the complexing agent can include a metal salt with a Ksp value of from $1\times10^{-4}$ to 1, and which reacts with $CO_2$ to form a carbonate or bicarbonate salt with a Ksp value of from $1\times10^{-2}$ to $1\times10^{-14}$. In some embodiments, the complexing agent can be present in the aqueous composition in a concentration of from 0.1% to 10% by weight, based on the total weight of the aqueous composition.

Described herein are also aqueous compositions including from 0.1% to 10% of an iminoguanidine complexing agent, where the iminoguanidine complexing agent exhibits a Ksp of from $1\times10^{-4}$ to 1 at 25° C.; and where exposure of the iminoguanidine complexing agent to $CO_2$ forms a carbonate or bicarbonate salt of the iminoguanidine complexing agent having a Ksp of from $1\times10^{-2}$ to $1\times10^{-4}$ at 25° C.

In some embodiments, the iminoguanidine complexing agent and the carbonate or bicarbonate salt of the iminoguanidine complexing agent have a difference in Ksp value of from 4 to 14 orders of magnitude, such as from 6 to 12 orders of magnitude.

In some embodiments, the compositions can further include an aqueous solution including one or more of an acid, an alkali agent, a polymer, a gelling agent, a crosslinker, a biocide, a scale inhibitor, a breaker, a pH adjusting agent, a non-emulsifier agent, an iron control agent, a chelating agent, a corrosion inhibitor, a clay stabilizing agent, a wettability alteration chemical, an anti-foam agent (e.g., chemical defoamer), a sulfide scavenger, a mobility control agent, a co-solvent, a surfactant(s), a surfactant package or any combination thereof.

In some embodiments, the surfactant package can include an anionic surfactant, a non-ionic surfactant, a cationic surfactant, a zwitteronic surfactant, or any combination thereof.

The details of one or more embodiments of the disclosure are set forth in the accompanying drawings and the description below. Other features, objects, and advantages of the disclosure will be apparent from the description and drawings, and from the claims.

DESCRIPTION OF DRAWINGS

As shown in FIG. 8, $CO_2$ binding to an iminoguanidine complexing agent is an equilibrium process, with $CO_2$ binding and precipitation being favored to the left of the dotted line and $CO_2$ release and foam generation being favored towards the to the right of the dotted line.

Like reference symbols in the various drawings indicate like elements.

DETAILED DESCRIPTION

Figure 1:
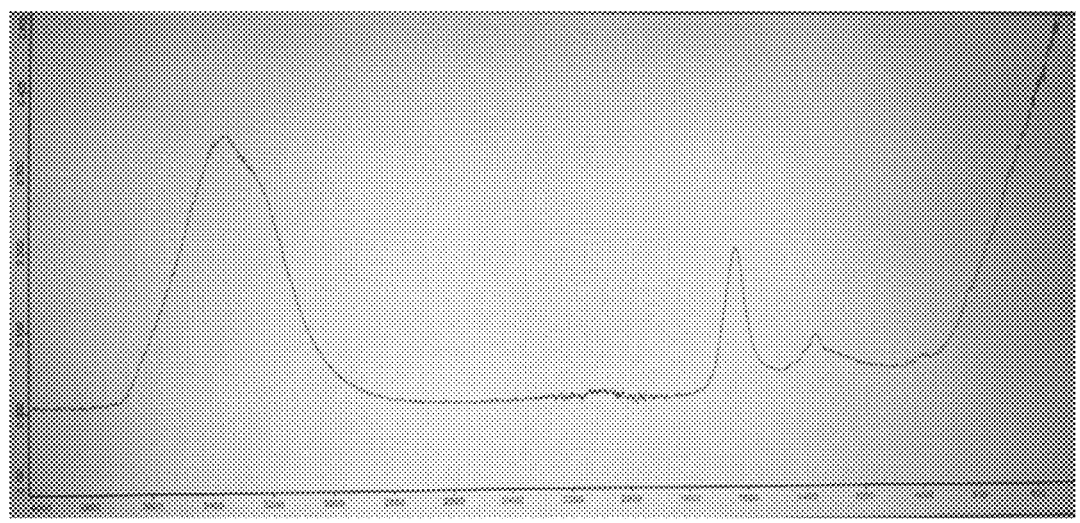
FIG. 1 shows FTIR spectra of precipitate. Confirmation of $CO_3$ Functionality: Peak at ~1600 $cm^{-1}$ Wavelength.

A number of embodiments of the disclosure have been described. Nevertheless, it will be understood that various modifications may be made without departing from the spirit and scope of the invention. Accordingly, other embodiments are within the scope of the following claims.

Definitions

To facilitate understanding of the disclosure set forth herein, a number of terms are defined below. Unless defined otherwise, all technical and scientific terms used herein generally have the same meaning as commonly understood by one of ordinary skill in the art to which this disclosure belongs. Unless otherwise specified, all percentages are in weight percent and the pressure is in atmospheres.

As used in this specification and the following claims, the terms "comprise" (as well as forms, derivatives, or variations thereof, such as "comprising" and "comprises") and "include" (as well as forms, derivatives, or variations thereof, such as "including" and "includes") are inclusive (i.e., open-ended) and do not exclude additional elements or steps. For example, the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof. Accordingly, these terms are intended to not only cover the recited element(s) or step(s), but may also include other elements or steps not expressly recited. Furthermore, as used herein, the use of the terms "a" or "an" when used in conjunction with an element may mean "one," but it is also consistent with the meaning of "one or more," "at least one," and "one or more than one." Therefore, an element preceded by "a" or "an" does not, without more constraints, preclude the existence of additional identical elements. Other than in the examples, or where otherwise noted, all numbers expressing quantities of ingredients, reaction conditions, and so forth used in the specification and claims are to be understood at the very least, and not as an attempt to limit the application of the doctrine of equivalents to the scope of the claims, to be construed in light of the number of significant digits and ordinary rounding approaches.

The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of ±10 percent of the given numeric value provided such a deviation does not alter the end function or result of the value. Therefore, a value of about 1% can be construed to be a range from 0.9% to 1.1%. Furthermore, a range may be construed to include the start and the end of the range. For example, a range of 10% to 20% (i.e., range of 10%-20%) can includes 10% and also includes 20%, and includes percentages in between 10% and 20%, unless explicitly stated otherwise herein.

It is understood that when combinations, subsets, groups, etc. of elements are disclosed (e.g., combinations of components in a composition, or combinations of steps in a method), that while specific reference of each of the various individual and collective combinations and permutations of these elements may not be explicitly disclosed, each is specifically contemplated and described herein. By way of example, if a composition is described herein as including a component of type A, a component of type B, a component of type C, or any combination thereof, it is understood that this phrase describes all of the various individual and collective combinations and permutations of these components. For example, in some embodiments, the composition described by this phrase could include only a component of type A. In some embodiments, the composition described by this phrase could include only a component of type B. In some embodiments, the composition described by this phrase could include only a component of type C. In some embodiments, the composition described by this phrase could include a component of type A and a component of type B. In some embodiments, the composition described by this phrase could include a component of type A and a component of type C. In some embodiments, the composition described by this phrase could include a component of type B and a component of type C. In some embodiments, the composition described by this phrase could include a component of type A, a component of type B, and a component of type C. In some embodiments, the composition described by this phrase could include two or more components of type A (e.g., A1 and A2). In some embodiments, the composition described by this phrase could include two or more components of type B (e.g., B1 and B2). In some embodiments, the composition described by this phrase could include two or more components of type C (e.g., C1 and C2). In some embodiments, the composition described by this phrase could include two or more of a first component (e.g., two or more components of type A (A1 and A2)), optionally one or more of a second component (e.g., optionally one or more components of type B), and optionally one or more of a third component (e.g., optionally one or more components of type C). In some embodiments, the composition described by this phrase could include two or more of a first component (e.g., two or more components of type B (B1 and B2)), optionally one or more of a second component (e.g., optionally one or more components of type A), and optionally one or more of a third component (e.g., optionally one or more components of type C). In some embodiments, the composition described by this phrase could include two or more of a first component (e.g., two or more components of type C (C1 and C2)), optionally one or more of a second component (e.g., optionally one or more components of type A), and optionally one or more of a third component (e.g., optionally one or more components of type B).

Unless defined otherwise, all technical and scientific terms used herein have the same meanings as commonly understood by one of skill in the art to which the disclosed invention belongs.

Chemical terms used herein will have their customary meaning in the art unless specified otherwise. The organic moieties mentioned when defining variable positions within the general formulae described herein (e.g., the term "halogen") are collective terms for the individual substituents encompassed by the organic moiety. The prefix Cn-Cm preceding a group or moiety indicates, in each case, the possible number of carbon atoms in the group or moiety that follows.

As used herein, the term "substituted" is contemplated to include all permissible substituents of organic compounds. In a broad aspect, the permissible substituents include acyclic and cyclic, branched and unbranched, carbocyclic and heterocyclic, and aromatic and nonaromatic substituents of organic compounds. Illustrative substituents include, for example, those described below. The permissible substituents can be one or more and the same or different for appropriate organic compounds. For purposes of this disclosure, heteroatoms present in a compound or moiety, such as nitrogen, can have hydrogen substituents and/or any permissible substituents of organic compounds described herein which satisfy the valency of the heteroatom. This disclosure is not intended to be limited in any manner by the permissible substituents of organic compounds. Also, the terms "substitution" or "substituted with" include the implicit proviso that such substitution is in accordance with permitted valence of the substituted atom and the substituent, and that the substitution results in a stable compound (e.g., a compound that does not spontaneously undergo transformation such as by rearrangement, cyclization, elimination, etc.

As used herein, the term "alkyl" refers to saturated, straight-chained, cyclic, or branched saturated hydrocarbon moieties. Unless otherwise specified, $C_7$-$C_{32}$ (e.g., $C_7$-$C_{28}$, $C_7$-$C_{24}$, $C_7$-$C_{20}$, $C_7$-$C_{18}$, $C_7$-$C_{16}$, $C_7$-$C_{14}$, $C_7$-$C_{12}$, $C_{12}$-$C_{24}$, $C_{12}$-$C_{18}$, $C_{16}$-$C_{24}$, or $C_{12}$-$C_{18}$) alkyl groups are intended. Alkyl substituents may be unsubstituted or substituted with one or more chemical moieties. The alkyl group can be substituted with one or more groups including, but not limited to, hydroxy, halogen, acyl, alkyl, alkoxy, alkenyl, alkynyl, aryl, heteroaryl, acyl, aldehyde, amino, carboxylic acid, ester, ether, ketone, nitro, silyl, sulfo-oxo, sulfonyl, sulfone, sulfoxide, or thiol, as described below, provided that the substituents are sterically compatible and the rules of chemical bonding and strain energy are satisfied. The alkyl group can also include one or more heteroatoms (e.g., from one to three heteroatoms) incorporated within the hydrocarbon moiety. Examples of heteroatoms include, but are not limited to, nitrogen, oxygen, sulfur, and phosphorus.

Throughout the specification "alkyl" is generally used to refer to both unsubstituted alkyl groups and substituted alkyl groups; however, substituted alkyl groups are also specifically referred to herein by identifying the specific substituent(s) on the alkyl group.

As used herein, the term "alkenyl" refers to unsaturated, straight-chained, or branched hydrocarbon moieties containing a double bond. Unless otherwise specified, $C_7$-$C_{32}$ (e.g., $C_7$-$C_{28}$, $C_7$-$C_{24}$, $C_7$-$C_{20}$, $C_7$-$C_{18}$, $C_7$-$C_{16}$, $C_7$-$C_{14}$, $C_7$-$C_{12}$, $C_{12}$-$C_{24}$, $C_{12}$-$C_{18}$, $C_{16}$-$C_{24}$, or $C_{12}$-$C_{18}$) alkenyl groups are intended. Asymmetric structures such as ($Z^1Z^2$)C=C($Z^3Z^4$) are intended to include both the E and Z isomers. This can be presumed in structural formulae herein wherein an asymmetric alkene is present, or it can be explicitly indicated by the bond symbol C=C. Alkenyl substituents may be unsubstituted or substituted with one or more chemical moieties. Examples of suitable substituents include, for example, alkyl, halogenated alkyl, alkoxy, alkenyl, alkynyl, aryl, heteroaryl, acyl, aldehyde, amino, carboxylic acid, ester, ether, halide, hydroxy, ketone, nitro, silyl, sulfo-oxo, sulfonyl, sulfone, sulfoxide, or thiol, as described below, provided that the substituents are sterically compatible and the rules of chemical bonding and strain energy are satisfied.

As used herein, the term "aryl," as well as derivative terms such as aryloxy, refers to groups that include a monovalent aromatic carbocyclic group of from 3 to 20 carbon atoms. Aryl groups can include a single ring or multiple condensed rings. In some embodiments, aryl groups include $C_6$-$C_{10}$ aryl groups. Examples of aryl groups include, but are not limited to, phenyl, biphenyl, naphthyl, tetrahydronaphthyl, phenylcyclopropyl, and indanyl. In some embodiments, the aryl group can be a phenyl, indanyl or naphthyl group. The term "heteroaryl" is defined as a group that contains an aromatic group that has at least one heteroatom incorporated within the ring of the aromatic group. Examples of heteroatoms include, but are not limited to, nitrogen, oxygen, sulfur, and phosphorus. The term "non-heteroaryl," which is included in the term "aryl," defines a group that contains an aromatic group that does not contain a heteroatom. The aryl or heteroaryl substituents may be unsubstituted or substituted with one or more chemical moieties. Examples of suitable substituents include, for example, alkyl, halogenated alkyl, alkoxy, alkenyl, alkynyl, aryl, heteroaryl, acyl, aldehyde, amino, carboxylic acid, cycloalkyl, ester, ether, halide, hydroxy, ketone, nitro, silyl, sulfo-oxo, sulfonyl, sulfone, sulfoxide, or thiol as described herein. The term "biaryl" is a specific type of aryl group and is included in the definition of aryl. Biaryl refers to two aryl groups that are bound together via a fused ring structure, as in naphthalene, or are attached via one or more carbon-carbon bonds, as in biphenyl.

As used herein, the term "evolve" refers to the production, release, or liberation of a gas such as carbon dioxide. In some embodiments, the gas can be an end product of a chemical reaction.

For this disclosure, the term "enhanced oil recovery" refers to techniques for increasing the amount of unrefined petroleum (e.g., crude oil) that may be extracted from an oil reservoir. Using EOR, more of the reservoir's original oil can typically be extracted compared with only using primary and secondary recovery (e.g., by water injection or natural gas injection). Enhanced oil recovery may also be referred to as improved oil recovery or tertiary oil recovery (as opposed to primary and secondary oil recovery). Examples of EOR operations include, for example, miscible gas injection (which includes, for example, carbon dioxide flooding), chemical injection (sometimes referred to as chemical enhanced oil recovery (CEOR), and which includes, for example, polymer flooding, alkaline flooding, surfactant flooding, conformance control operations, as well as combinations thereof such as alkaline-polymer flooding or alkaline-surfactant-polymer flooding), microbial injection, and thermal recovery (which includes, for example, cyclic steam, steam flooding). In some embodiments, the EOR operation can include a polymer (P) flooding operation, an alkaline-polymer (AP) flooding operation, a surfactant-polymer (SP) flooding operation, an alkaline-surfactant-polymer (ASP) flooding operation, a conformance control operation, or any combination thereof. The terms "operation" and "application" may be used interchangeability herein, as in EOR operations or EOR applications.

The term "hydrocarbon" refers to a compound containing only carbon and hydrogen atoms.

"Hydrocarbon-bearing formation" or simply "formation" refers to the rock matrix in which a wellbore may be drilled. For example, a formation refers to a body of rock that is sufficiently distinctive and continuous such that it can be mapped. It should be appreciated that while the term "formation" generally refers to geologic formations of interest, that the term "formation," as used herein, may, in some instances, include any geologic points or volumes of interest (such as a survey area).

"Unconventional formation" is a subterranean hydrocarbon-bearing formation that generally requires intervention in order to recover hydrocarbons from the reservoir at economic flow rates or volumes. For example, an unconventional formation includes reservoirs having an unconventional microstructure in which fractures are used to recover hydrocarbons from the reservoir at sufficient flow rates or volumes (e.g., an unconventional reservoir generally needs to be fractured under pressure or have naturally occurring fractures in order to recover hydrocarbons from the reservoir at sufficient flow rates or volumes).

In some embodiments, the unconventional formation can include a reservoir having a permeability of less than 25 millidarcy (mD) (e.g., 20 mD or less, 15 mD or less, 10 mD or less, 5 mD or less, 1 mD or less, 0.5 mD or less, 0.1 mD or less, 0.05 mD or less, 0.01 mD or less, 0.005 mD or less, 0.001 mD or less, 0.0005 mD or less, 0.0001 mD or less, 0.00005 mD or less, 0.00001 mD or less, 0.000005 mD or less, 0.000001 mD or less, or less). In some embodiments, the unconventional formation can include a reservoir having a permeability of at least 0.000001 mD (e.g., at least 0.000005 mD, at least 0.00001 mD, 0.00005 mD, at least 0.0001 mD, 0.0005 mD, 0.001 mD, at least 0.005 mD, at least 0.01 mD, at least 0.05 mD, at least 0.1 mD, at least 0.5 mD, at least 1 mD, at least 5 mD, at least 10 mD, at least 15 mD, or at least 20 mD).

The unconventional formation can include a reservoir having a permeability ranging from any of the minimum values described above to any of the maximum values described above. For example, in some embodiments, the unconventional formation can include a reservoir having a permeability of from 0.000001 mD to 25 mD (e.g., from 0.001 mD to 25 mD, from 0.001 mD to 10 mD, from 0.01 mD to 10 mD, from 0.1 mD to 10 mD, from 0.001 mD to 5 mD, from 0.01 mD to 5 mD, or from 0.1 mD to 5 mD).

The formation may include faults, fractures (e.g., naturally occurring fractures, fractures created through hydraulic fracturing, etc.), geobodies, overburdens, underburdens, horizons, salts, salt welds, etc. The formation may be onshore, offshore (e.g., shallow water, deep water, etc.), etc. Furthermore, the formation may include hydrocarbons, such as liquid hydrocarbons (also known as oil or petroleum), gas hydrocarbons, a combination of liquid hydrocarbons and gas hydrocarbons (e.g., including gas condensate), etc.

The formation, the hydrocarbons, or both may also include non-hydrocarbon items, such as pore space, connate water, brine, fluids from enhanced oil recovery, etc. The formation may also be divided up into one or more hydrocarbon zones, and hydrocarbons can be produced from each desired hydrocarbon zone.

The term formation may be used synonymously with the term "reservoir" or "subsurface reservoir" or "subsurface region of interest" or "subsurface formation" or "subsurface volume of interest" or "subterranean formation". For example, in some embodiments, the reservoir may be, but is not limited to, a shale reservoir, a carbonate reservoir, a tight sandstone reservoir, a tight siltstone reservoir, etc. Indeed, the terms "formation," "hydrocarbon," and the like are not limited to any description or configuration described herein.

A "wellbore" refers to a single hole, usually cylindrical, that is drilled into a subsurface volume of interest. A wellbore may be drilled in one or more directions. For example, a wellbore may include a vertical wellbore, a horizontal wellbore, a deviated wellbore, and/or other type of wellbore. A wellbore may be drilled in the formation for exploration and/or recovery of resources. For example, a wellbore may be drilled in the formation to aid in extraction and/or production of resources such as hydrocarbons. As another example, a wellbore may be drilled in the formation for fluid injection. A plurality of wellbores (e.g., tens to hundreds of wellbores) are often used in a field depending on the desired outcome.

A wellbore may be drilled into a formation using practically any drilling technique and equipment known in the art, such as geosteering, directional drilling, etc. Drilling the wellbore may include using a tool, such as a drilling tool that includes a drill bit and a drill string. Drilling fluid, such as drilling mud, may be used while drilling in order to cool the drill tool and remove cuttings. Other tools may also be used while drilling or after drilling, such as measurement-while-drilling (MWD) tools, seismic-while-drilling (SWD) tools, wireline tools, logging-while-drilling (LWD) tools, or other downhole tools. After drilling to a predetermined depth, the drill string and the drill bit may be removed, and then the casing, the tubing, and/or other equipment may be installed according to the design of the wellbore may be installed according to the design of the wellbore. The equipment to be used in drilling the wellbore may be dependent on the design of the wellbore, the formation, the hydrocarbons, and/or other factors.

A wellbore may include a plurality of components, such as, but not limited to, a casing, a liner, a tubing string, a sensor, a packer, a screen, a gravel pack, artificial lift equipment (e.g., an electric submersible pump (ESP)), and/or other components. If a wellbore is drilled offshore, the wellbore may include one or more of the previous components plus other offshore components, such as a riser. A wellbore may also include equipment to control fluid flow into the wellbore, control fluid flow out of the wellbore, or any combination thereof. For example, a wellbore may include a wellhead, a choke, a valve, and/or other control devices. These control devices may be located on the surface, in the subsurface (e.g., downhole in the wellbore), or any combination thereof. In some embodiments, the same control devices may be used to control fluid flow into and out of the wellbore. In some embodiments, different control devices may be used to control fluid flow into and out of a wellbore. In some embodiments, the rate of flow of fluids through the wellbore may depend on the fluid handling capacities of the surface facility that is in fluidic communication with the wellbore. The equipment to be used in controlling fluid flow into and out of a wellbore may be dependent on the wellbore, the formation, the surface facility, and/or other factors. Moreover, sand control equipment and/or sand monitoring equipment may also be installed (e.g., downhole and/or on the surface). A wellbore may also include any completion hardware that is not discussed separately. The term "wellbore" may be used synonymously with the terms "borehole," "well," or "well bore." The term "wellbore" is not limited to any description or configuration described herein.

"Slickwater," as used herein, refers to water-based aqueous solution comprising a friction reducer which is typically pumped at high rates to fracture a reservoir. Optionally when employing slickwater, smaller sized proppant particles (e.g., 40/70 or 50/140 mesh size) are used due to the fluid having a relatively low viscosity (and therefore a diminished ability to transport sizable proppants relative to more viscous fluids). In some embodiments, proppants are added to some stages of completion during production of an unconventional reservoir. In some embodiments, slickwater is injected with a small quantity of proppant.

"Fracturing" is one way that hydrocarbons may be recovered (sometimes referred to as produced) from the formation. For example, hydraulic fracturing may entail preparing a fracturing fluid and injecting that fracturing fluid into the wellbore at a sufficient rate and pressure to open existing fractures and/or create fractures in the formation. The fractures permit hydrocarbons to flow more freely into the wellbore. In the hydraulic fracturing process, the fracturing fluid may be prepared on-site to include at least proppants. The proppants, such as sand or other particles, are meant to hold the fractures open so that hydrocarbons can more easily flow to the wellbore. The fracturing fluid and the proppants may be blended together using at least one blender. The fracturing fluid may also include other components in addition to the proppants.

The wellbore and the formation proximate to the wellbore are in fluid communication (e.g., via perforations), and the fracturing fluid with the proppants is injected into the wellbore through a wellhead of the wellbore using at least one pump (oftentimes called a fracturing pump). The fracturing fluid with the proppants is injected at a sufficient rate and pressure to open existing fractures and/or create fractures in the subsurface volume of interest. As fractures become sufficiently wide to allow proppants to flow into those fractures, proppants in the fracturing fluid are deposited in those fractures during injection of the fracturing fluid. After the hydraulic fracturing process is completed, the fracturing fluid is removed by flowing or pumping it back out of the wellbore so that the fracturing fluid does not block the flow of hydrocarbons to the wellbore. The hydrocarbons will typically enter the same wellbore from the formation and go up to the surface for further processing.

The equipment to be used in preparing and injecting the fracturing fluid may be dependent on the components of the fracturing fluid, the proppants, the wellbore, the formation, etc. However, for simplicity, the term "fracturing apparatus" is meant to represent any tank(s), mixer(s), blender(s), pump(s), manifold(s), line(s), valve(s), fluid(s), fracturing fluid component(s), proppants, and other equipment and non-equipment items related to preparing the fracturing fluid and injecting the fracturing fluid.

Other hydrocarbon recovery processes may also be utilized to recover the hydrocarbons. Furthermore, those of ordinary skill in the art will appreciate that one hydrocarbon recovery process may also be used in combination with at least one other recovery process or subsequent to at least one other recovery process.

"Aqueous solution" as used herein, refers to any fluid which is injected into a reservoir via a well. The aqueous solution may be a low particle aqueous fluid having a maximum particle size of less than 0.1 micrometers in diameter in particle size distribution measurements performed at a temperature and salinity of the unconventional formation for which injection is to occur. For example, the low particle size aqueous fluid can be formed by mixing an aqueous solution with a surfactant package.

The term "interfacial tension" or "IFT" as used herein refers to the surface tension between test oil and water of different salinities containing a surfactant formulation at different concentrations. Typically, interfacial tensions are measured using a spinning drop tensiometer or calculated from phase behavior experiments.

The term "proximate" is defined as "near". If item A is proximate to item B, then item A is near item B. For example, in some embodiments, item A may be in contact with item B. For example, in some embodiments, there may be at least one barrier between item A and item B such that item A and item B are near each other, but not in contact with each other. The barrier may be a fluid barrier, a non-fluid barrier (e.g., a structural barrier), or any combination thereof. Both scenarios are contemplated within the meaning of the term "proximate."

The term "contacting" as used herein, refers to materials or compounds being sufficiently close in proximity to react or interact. For example, in methods of contacting an unrefined petroleum material, a hydrocarbon-bearing formation, and/or a wellbore, the term "contacting" can include placing a compound (e.g., a surfactant) or an aqueous composition (e.g., chemical, surfactant or polymer) within a hydrocarbon-bearing formation using any suitable manner known in the art (e.g., pumping, injecting, pouring, releasing, displacing, spotting or circulating the chemical into a well, wellbore or hydrocarbon-bearing formation).

The terms "unrefined petroleum" and "crude oil" are used interchangeably and in keeping with the plain ordinary usage of those terms. "Unrefined petroleum" and "crude oil" may be found in a variety of petroleum reservoirs (also referred to herein as a "reservoir," "oil field deposit" "deposit" and the like) and in a variety of forms including oleaginous materials, oil shales (i.e., organic-rich fine-grained sedimentary rock), tar sands, light oil deposits, heavy oil deposits, and the like. "Crude oils" or "unrefined petroleums" generally refer to a mixture of naturally occurring hydrocarbons that may be refined into diesel, gasoline, heating oil, jet fuel, kerosene, and other products called fuels or petrochemicals. Crude oils or unrefined petroleums are named according to their contents and origins, and are classified according to their per unit weight (specific gravity). Heavier crudes generally yield more heat upon burning, but have lower gravity as defined by the American Petroleum Institute (API) (i.e., API gravity) and market price in comparison to light (or sweet) crude oils. Crude oil may also be characterized by its Equivalent Alkane Carbon Number (EACN). The term "API gravity" refers to the measure of how heavy or light a petroleum liquid is compared to water. If an oil's API gravity is greater than 10, it is lighter and floats on water, whereas if it is less than 10, it is heavier and sinks. API gravity is thus an inverse measure of the relative density of a petroleum liquid and the density of water. API gravity may also be used to compare the relative densities of petroleum liquids. For example, if one petroleum liquid floats on another and is therefore less dense, it has a greater API gravity.

Crude oils vary widely in appearance and viscosity from field to field. They range in color, odor, and in the properties they contain. While all crude oils are mostly hydrocarbons, the differences in properties, especially the variation in molecular structure, determine whether a crude oil is more or less easy to produce, pipeline, and refine. The variations may even influence its suitability for certain products and the quality of those products. Crude oils are roughly classified into three groups, according to the nature of the hydrocarbons they contain. (i) Paraffin-based crude oils contain higher molecular weight paraffins, which are solid at room temperature, but little or no asphaltic (bituminous) matter. They can produce high-grade lubricating oils. (ii) Asphaltene based crude oils contain large proportions of asphaltic matter, and little or no paraffin. Some are predominantly naphthenes and so yield lubricating oils that are sensitive to temperature changes than the paraffin-based crudes. (iii) Mixed based crude oils contain both paraffin and naphthenes, as well as aromatic hydrocarbons. Most crude oils fit this latter category.

"Reactive" crude oil, as referred to herein, is crude oil containing natural organic acidic components (also referred to herein as unrefined petroleum acid) or their precursors such as esters or lactones. These reactive crude oils can generate soaps (carboxylates) when reacted with alkali. More terms used interchangeably for crude oil throughout this disclosure are hydrocarbons, hydrocarbon material, or active petroleum material. An "oil bank" or "oil cut" as referred to herein, is the crude oil that does not contain the injected chemicals and is pushed by the injected fluid during an enhanced oil recovery process. A "nonactive oil," as used herein, refers to an oil that is not substantially reactive or crude oil not containing significant amounts of natural organic acidic components or their precursors such as esters or lactones such that significant amounts of soaps are generated when reacted with alkali. A nonactive oil as referred to herein includes oils having an acid number of less than 0.5 mg KOH/g of oil.

"Unrefined petroleum acids" as referred to herein are carboxylic acids contained in active petroleum material (reactive crude oil). The unrefined petroleum acids contain $C_{11}$-$C_{20}$ alkyl chains, including napthenic acid mixtures. The recovery of such "reactive" oils may be performed using alkali (e.g., NaOH, NaHCO$_3$, or Na$_2$CO$_3$) in a surfactant composition. The alkali reacts with the acid in the reactive oil to form soap in situ. These in situ generated soaps serve as a source of surfactants minimizing the levels of added surfactants, thus enabling efficient oil recovery from the reservoir.

The term "polymer" refers to a molecule having a structure that essentially includes the multiple repetitions of units derived, actually or conceptually, from molecules of low relative molecular mass. In some embodiments, the polymer is an oligomer.

The term "productivity" as applied to a petroleum or oil well refers to the capacity of a well to produce hydrocarbons (e.g., unrefined petroleum); that is, the ratio of the hydrocarbon flow rate to the pressure drop, where the pressure drop is the difference between the average reservoir pressure and the flowing bottom hole well pressure (i.e., flow per unit of driving force).

The term "solubility" or "solubilization" in general refers to the property of a solute, which can be a solid, liquid or gas, to dissolve in a solid, liquid or gaseous solvent thereby forming a homogenous solution of the solute in the solvent. Solubility occurs under dynamic equilibrium, which means that solubility results from the simultaneous and opposing processes of dissolution and phase joining (e.g., precipitation of solids). The solubility equilibrium occurs when the two processes proceed at a constant rate. The solubility of a given solute in a given solvent typically depends on temperature. For many solids dissolved in liquid water, the solubility increases with temperature. In liquid water at high temperatures, the solubility of ionic solutes tends to decrease due to the change of properties and structure of liquid water. In more particular, solubility and solubilization as referred to herein is the property of oil to dissolve in water and vice versa.

"Viscosity" refers to a fluid's internal resistance to flow or being deformed by shear or tensile stress. In other words, viscosity may be defined as thickness or internal friction of a liquid. Thus, water is "thin", having a lower viscosity, while oil is "thick", having a higher viscosity. More generally, the less viscous a fluid is, the greater its ease of fluidity.

The term "salinity" as used herein, refers to concentration of salt dissolved in an aqueous phases. Examples for such salts are without limitation, sodium chloride, magnesium and calcium sulfates, and bicarbonates. In more particular, the term salinity as it pertains to the present invention refers to the concentration of salts in brine and surfactant solutions.

The term "co-solvent," as used herein, refers to a compound having the ability to increase the solubility of a solute (e.g., a surfactant as disclosed herein) in the presence of an unrefined petroleum acid. In some embodiments, the co-solvents provided herein have a hydrophobic portion (alkyl or aryl chain), a hydrophilic portion (e.g., an alcohol) and optionally an alkoxy portion. Co-solvents as provided herein include alcohols (e.g., $C_1$-$C_6$ alcohols, $C_1$-$C_6$ diols), alkoxy alcohols (e.g., $C_1$-$C_6$ alkoxy alcohols, $C_1$-$C_6$ alkoxy diols, and phenyl alkoxy alcohols), glycol ether, glycol and glycerol. The term "alcohol" is used according to its ordinary meaning and refers to an organic compound containing an —OH groups attached to a carbon atom. The term "diol" is used according to its ordinary meaning and refers to an organic compound containing two —OH groups attached to two different carbon atoms. The term "alkoxy alcohol" is used according to its ordinary meaning and refers to an organic compound containing an alkoxy linker attached to a —OH group.

The phrase "surfactant package," as used herein, refers to one or more surfactants which are present in a composition.

The term "sequestration," "sequester," and the like as used herein, refers to a process of capturing and storing carbon dioxide, such as atmospheric carbon dioxide or carbon dioxide present in exhaust or flue gas. For example, as discussed herein, carbon dioxide in the subterranean formation may be contacted with a complexing agent. The reaction of the carbon dioxide with the complexing agent car result in precipitation of a salt of the complexing agent with the formation. Thus, in some embodiments, carbon dioxide can be stored in solid form within the subterranean formation. Further, in some embodiments, the precipitate can influence the migration of gases or fluid within the subterranean formation, facilitating physical storage of carbon dioxide within the subterranean formation. Thus, in this disclosure, the terms "sequestration," "sequester," and the like refer to storage. This definition is only applicable for this application.

The terms "generation" and "supplementation," as used herein in the context of foam generation and foam supplementation, refer to a process in which an expansion gas is provided in the present of a liquid, such that the expansion gas becomes entrained or suspended within the liquid, forming an intimate mixture in which the liquid is a continuous phase and the gas is a discontinuous phase.

Described herein are methods of using an agent that can reversibly bind or release carbon dioxide based on changes in temperature. For example, based on the temperature the agent can be a liquid or a precipitate. At some temperatures and under some conditions, the agent can be in the form of a liquid and can bind carbon dioxide forming an agent precipitate. Alternatively, at some temperatures and under some conditions, a carbonate or bicarbonate salt of the agent can release carbon dioxide.

Thus, in some cases, the agent can be used to sequester carbon dioxide within a subterranean formation. Sequestration of carbon dioxide can influence migration of a gas or fluid within the subterranean formation, for example, by blocking the migration of a gas plume within the formation. The agent can also be used to treat regions within a subterranean formation to reduce and/or prevent potential $CO_2$ migration by forming a solid barrier within the subterranean formation.

In other cases, a carbonate or bicarbonate salt of the agent can be used to generate foams in situ within a subterranean formation. The carbonate or bicarbonate salt of the agent can be present in a formulation comprising one or more surfactants that can form a foam in the presence of a gas. At a suitable temperature or under suitable conditions, the carbonate or bicarbonate salt of the agent can release or evolve carbon dioxide, thereby generating the foam in situ within the subterranean formation. The generated foams can be used in different oil and gas operations. For example, the oil and gas operation can include for example, an enhanced oil recovery (EOR) operation, a pressure protection operation, a fracturing operation, or any combination thereof.

Figure 8:
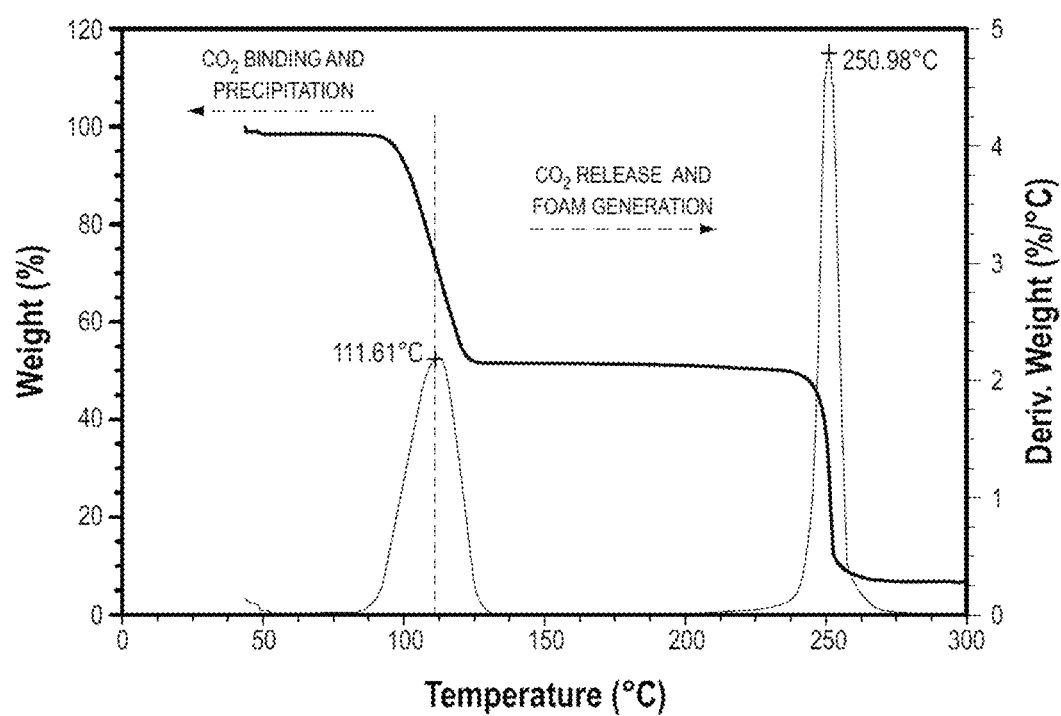
FIG. 8 shows a TGA-MS plot showing $CO_2$ binding to an iminoguanidine complexing agent.

FIG. 8 shows that the transition between sequestration and release of carbon dioxide is an equilibrium process dependent on environmental conditions including temperature, pressure, and/or salinity. Accordingly, one of ordinary skill in the art would be able to determine appropriate conditions (e.g., temperature, solution composition, etc.) suitable to achieve a desired transition depending on the environmental conditions.

Reference will now be made in detail to specific aspects of the disclosed materials, compounds, compositions, articles, and methods, examples of which are illustrated in the accompanying Examples and Figures.

Methods

Methods for Gas Solidification

Described herein are methods for sequestering carbon dioxide within a subterranean formation. The method can include contacting carbon dioxide present in the subterranean formation with a complexing agent, resulting in precipitation of a carbonate or bicarbonate salt of the complexing agent within the subterranean formation. In some embodiments, contacting can include injecting an aqueous composition including a complexing agent into the subterranean formation via a wellbore in fluid communication with the subterranean formation.

Described herein are also methods of influencing migration of a gas or fluid within a subterranean formation, the method including injecting an aqueous composition including a complexing agent into the subterranean formation via a wellbore in fluid communication with the subterranean formation; displacing the complexing agent to a desired location within the subterranean formation; and contacting the complexing agent with carbon dioxide, resulting in precipitation of a carbonate or bicarbonate salt of the complexing agent at the desired location within the subterranean formation.

In some embodiments, the carbonate or bicarbonate salt of the complexing agent can influence migration of a gas or fluid within a subterranean formation. For example, in some embodiments, the carbonate or bicarbonate salt of the complexing agent can influence the migration of a gas plume present within the subterranean formation. In some embodiments, the method can be used to block or partially block the migration of a gas plume present within the subterranean formation.

Also described herein are methods of reducing and/or preventing migration of a gas or fluid within a subterranean formation, the method including injecting an aqueous composition including a complexing agent into the subterranean formation via a wellbore in fluid communication with the subterranean formation; and displacing the complexing agent to a desired location within the subterranean formation to form a barrier to reduce and/or prevent gas or fluid (e.g., carbon dioxide) penetration. In some embodiments, when the complexing agent contacts carbon dioxide, a precipitate comprising a carbonate or bicarbonate salt of the complexing agent forms at the desired location within the subterranean formation.

In some embodiments, the method can be used for treating regions within a subterranean formation to reduce and/or prevent potential $CO_2$ migration. For example, in some embodiments, the method can be used as an overburden treatment which may reduce and/or prevent potential $CO_2$ migration. In some embodiments, the method can be used to create a seal to reduce and/or prevent potential $CO_2$ migration (e.g., a precipitate comprising a carbonate or bicarbonate salt of the complexing agent that prevents potential $CO_2$ migration). In some embodiments, the method can be used to create a reactive barrier to reduce and/or prevent potential $CO_2$ migration (e.g., an aqueous composition including a complexing agent which reacts upon contact with carbon dioxide to form a precipitate including a carbonate or bicarbonate salt of the complexing agent that reduces and/or prevents potential $CO_2$ migration).

In some embodiments, the carbon dioxide can be in a gaseous phase. In other embodiments, the carbon dioxide can be in any other phase such as liquid phase.

In some embodiments, displacing the complexing agent to a desired location within the subterranean formation can include injecting an aqueous slug, such as brine.

In some embodiments, the method can further include injecting $CO_2$ through the wellbore and into the subterranean formation. In some embodiments, when the $CO_2$ is in a gaseous phase a gas can include at least 60% $CO_2$ (e.g., at least 65%, at least 70%, at least 75%, at least 80%, at least 85%, at least 90%, or at least 95%). In some embodiments, the gas can include 100% or less $CO_2$ (e.g., 95% or less, 90% or less, 85% or less, 80% or less, 75% or less, 70% or less, or 65% or less).

The gas can include a concentration of $CO_2$ ranging from any of the minimum values described above to any of the maximum values described above. For example, in some embodiments, the gas can include from 60% to 100% $CO_2$ (e.g., from 65% to 100%, from 75% to 100%, from 80% to 100%, from 85% to 100%, from 90% to 100%, from 95% to 100%, from 98% to 100%, from 60% to 98%, from 65% to 98%, from 75% to 98%, from 80% to 98%, from 85% to 98%, from 90% to 98%, from 95% to 98%, from 60% to 95%, from 65% to 95%, from 75% to 95%, from 80% to 95%, from 85% to 95%, from 90% to 95%, from 60% to 90%, from 65% to 90%, from 75% to 90%, from 80% to 90%, from 85% to 90%, from 60% to 85%, from 65% to 85%, from 75% to 85%, from 80% to 85%, from 60% to 80%, from 65% to 80%, from 75% to 80%, from 60% to 75%, from 65% to 75%, from 60% to 70%, from 65% to 70%, or from 60% to 65%). In some embodiments, the gas can include at least 60% $CO_2$. In some embodiments, the gas can include from 95% to 100% $CO_2$.

In some embodiments, the subterranean formation can have a temperature of at least 25° C. (e.g., at least 30° C., at least 35° C., at least 40° C., at least 50° C., at least 55° C., at least 60° C., at least 65° C., at least 70° C., at least 75° C., at least 80° C., or at least 85° C.). In some embodiments, the subterranean formation can have a temperature of 90° C. or less (e.g., 85° C. or less, 80° C. or less, 75° C. or less, 70° C. or less, 65° C. or less, 60° C. or less, 55° C. or less, 50° C. or less, 45° C. or less, 40° C. or less, 35° C. or less, or 30° C. or less).

The subterranean formation can have a temperature ranging from any of the minimum values described above to any of the maximum values described above. For example, in some embodiments, the subterranean formation can have a temperature of from 25° C. to 90° C., (e.g., from 30° C. to 90° C., from 35° C. to 90° C., from 40° C. to 90° C., from 45° C. to 90° C., from 50° C. to 90° C., from 55° C. to 90° C., from 60° F. to 90° C., from 65° C. to 90° C., from 70° C. to 90° C., from 75° C. to 90° C., from 80° C. to 90° C., from 85° C. to 90° C., from 25° C. to 85° C., from 30° C. to 85° C., from 35° C. to 85° C., from 40° C. to 85° C., from 45° C. to 85° C., from 50° C. to 85° C., from 55° C. to 85° C., from 60° C. to 85° C., from 65° C. to 85° C., from 70° C. to 85° C., from 75° C. to 85° C., from 80° C. to 85° C., 25° C. to 80° C., 30° C. to 80° C., from 35° C. to 80° C., from 40° C. to 80° C., from 45° C. to 80° C., from 50° C. to 80° C., from 55° C. to 80° C., from 60° C. to 80° C., from 65° C. to 80° C., from 70° C. to 80° C., from 75° C. to 80° C., 25° C. to 75° C., from 30° C. to 75° C., from 35° C. to 75° C., from 40° C. to 75° C., from 45° C. to 75° C., from 50° C. to 75° C., from 55° C. to 75° C., from 60° C. to 75° C., from 65° C. to 75° C., from 70° C. to 75° C., from 25° C. to 70° C., from 30° C. to 70° C., from 35° C. to 70° C., from 40° C. to 70° C., from 45° C. to 70° C., from 50° C. to 70° C., from 55° C. to 70° C., from 60° C. to 70° C., from 65° C. to 70° C., from 25° C. to 65° C., from 30° C. to 65° C., from 35° C. to 65° C., from 40° C. to 65° C., from 45° C. to 65° C., from 50° C. to 65° C., from 55° C. to 65° C., from 60° C. to 65° C., from 25° C. to 60° C., from 30° C. to 60° C., from 35° C. to 60° C., from 40° C. to 60° C., from 45° C. to 60° C., from 50° C. to 60° C., from 55° C. to 60° C., from 25° C. to 50° C., from 30° C. to 50° C., from 35° C. to 50° C., from 40° C. to 50° C., from 45° C. to 50° C., from 25° C. to 40° C., from 30° C. to 40° C., from 35° C. to 40° C., or from 25° C. to 30° C.). In some embodiments, the subterranean formation can have a temperature below 90° C., such as below 65° C.

In some embodiments, the complexing agent can include an iminoguanidine complexing agent described herein. In some embodiments, the carbonate or bicarbonate salt of the complexing agent can be a carbonate or bicarbonate salt of an iminoguanidine complexing agent described herein. In some embodiments, the complexing agent can be monoethanolamine. In some embodiments, the carbonate or bicarbonate salt of the complexing agent can be a carbonate or bicarbonate salt of monoethanolamine.

In some embodiments, the complexing agent can be a metal salt with a Ksp value of from $1\times10^{-4}$ to 1 at 25° C. In some embodiments, the carbonate or bicarbonate salt of the complexing agent can be a carbonate or bicarbonate metal salt with a Ksp value of from $1\times10^{-8}$ to $1\times10^{-14}$ at 25° C. In some embodiments, the complexing agent can be a metal salt with a Ksp value of from $1\times10^{-4}$ to 1 at 25° C., and which reacts with $CO_2$ to form a carbonate or bicarbonate metal salt with a Ksp value of from $1\times10^{-2}$ to $1\times10^{-14}$ at 25° C.

In some embodiments, the complexing agent can have a Ksp value of at least $1\times10^{-4}$ at 25° C. (e.g., at least $1\times10^{-3}$, at least $1\times10^{-2}$, or at least $1\times10^{-1}$). In some embodiments, the complexing agent can have a Ksp value of 1 or less at 25° C., (e.g., $1\times10^{-3}$ or less, $1\times10^{-2}$ or less, or $1\times10^{-1}$ or less).

The complexing agent can have a Ksp value of from any of the minimum values described above to any of the maximum values described above. For example, in some embodiments, the complexing agent can have a Ksp value of from $1\times10^{-4}$ to 1 at 25° C. (e.g., from $1\times10^{-3}$ to 1, from $1\times10^{-2}$ to 1, from $1\times10^{-1}$ to 1, from $1\times10^{-3}$ to 1, from $1\times10^{-4}$ to $1\times10^{-3}$, from $1\times10^{-4}$ to $1\times10^{-2}$, from $1\times10^{-4}$ to $1\times10^{-1}$, from $1\times10^{-3}$ to $1\times10^{-2}$, from $1\times10^{-3}$ to $1\times10^{-1}$, or from $1\times10^{-2}$ to $1\times10^{-1}$).

In some embodiments, the carbonate or bicarbonate salt of the complexing agent has a Ksp value of at least $1\times10^{-2}$ at 25° C. (e.g., at least $1\times10^{-3}$, at least $1\times10^{-4}$, at least $1\times10^{-5}$, at least $1\times10^{-6}$, at least $1\times10^{-7}$, at least $1\times10^{-8}$, at least $1\times10^{-9}$, at least $1\times10^{-10}$, at least $1\times10^{-11}$, at least $1\times10^{-12}$, or at least $1\times10^{-13}$). In some embodiments, the carbonate or bicarbonate salt of the complexing agent has a Ksp value of $1\times10^{-14}$ or less at 25° C. (e.g., $1\times10^{-13}$ or less, $1\times10^{-12}$ or less, $1\times10^{-11}$ or less, $1\times10^{-10}$ or less, $1\times10^{-9}$ or less, $1\times10^{-8}$ or less, $1\times10^{-7}$ or less, $1\times10^{-6}$ or less, $1\times10^{-5}$ or less, $1\times10^{-4}$ or less, or $1\times10^{-3}$ or less).

The carbonate or bicarbonate salt of the complexing agent can have a Ksp value of from any of the minimum values described above to any of the maximum values described above. For example, in some embodiments, the carbonate or bicarbonate salt of the complexing agent can have a Ksp value of from $1\times10^{-2}$ to $1\times10^{-14}$ at 25° C. (e.g., from $1\times10^{-2}$ to $1\times10^{-3}$, from $1\times10^{-2}$ to $1\times10^{-4}$, from $1\times10^{-2}$ to $1\times10^{-5}$, from $1\times10^{-2}$ to $1\times10^{-6}$, from $1\times10^{-2}$ to $1\times10^{-7}$, from $1\times10^{-2}$ to $1\times10^{-8}$, from $1\times10^{-2}$ to $1\times10^{-9}$, from $1\times10^{-2}$ to $1\times10^{-10}$, from $1\times10^{-2}$ to $1\times10^{-11}$ from $1\times10^{-2}$ to $1\times10^{-12}$, from $1\times10^{-2}$ to $1\times10^{-13}$, from $1\times10^{-3}$ to $1\times10^{-4}$, from $1\times10^{-3}$ to $1\times10^{-5}$, from $1\times10^{-3}$ to $1\times10^{-6}$, from $1\times10^{-3}$ to $1\times10^{-7}$, from $1\times10^{-3}$ to $1\times10^{-8}$, from $1\times10^{-3}$ to $1\times10^{-9}$, from $1\times10^{-3}$ to $1\times10^{-10}$, from $1\times10^{-3}$ to $1\times10^{-11}$, from $1\times10^{-3}$ to $1\times10^{-11}$, from $1\times10^{-3}$ to $1\times10^{-13}$, from $1\times10^{-3}$ to $1\times10^{-14}$, from $1\times10^{-4}$ to $1\times10^{-5}$, from $1\times10^{-4}$ to $1\times10^{-6}$, from $1\times10^{-4}$ to $1\times10^{-7}$, from $1\times10^{-4}$ to $1\times10^{-8}$, from $1\times10^{-4}$ to $1\times10^{-9}$, from $1\times10^{-4}$ to $1\times10^{-10}$, from $1\times10^{-4}$ to $1\times10^{-11}$, from $1\times10^{-4}$ to $1\times10^{-12}$, from $1\times10^{-4}$ to $1\times10^{-13}$, from $1\times10^{-4}$ to $1\times10^{-14}$, from $1\times10^{-5}$ to $1\times10^{-6}$, from $1\times10^{-5}$ to $1\times10^{-7}$, from $1\times10^{-5}$ to $1\times10^{-8}$, from $1\times10^{-5}$ to $1\times10^{-9}$, from $1\times10^{-5}$ to $1\times10^{-10}$, from $1\times10^{-5}$ to $1\times10^{-11}$, from $1\times10^{-5}$ to $1\times10^{-12}$, from $1\times10^{-5}$ to $1\times10^{-13}$, from $1\times10^{-5}$ to $1\times10^{-14}$, from $1\times10^{-6}$ to $1\times10^{-7}$, from $1\times10^{-6}$ to $1\times10^{-8}$, from $1\times10^{-6}$ to $1\times10^{-9}$, from $1\times10^{-6}$ to $1\times10^{-10}$, from $1\times10^{-6}$ to $1\times10^{-11}$, from $1\times10^{-6}$ to $1\times10^{-12}$, from $1\times10^{-6}$ to $1\times10^{-13}$, from $1\times10^{-6}$ to $1\times10^{-14}$, from $1\times10^{-7}$ to $1\times10^{-8}$, from $1\times10^{-7}$ to $1\times10^{-9}$, from $1\times10^{-7}$ to $1\times10^{-10}$, from $1\times10^{-7}$ to $1\times10^{-11}$, from $1\times10^{-7}$ to $1\times10^{-12}$, from $1\times10^{-7}$ to $1\times10^{-13}$, from $1\times10^{-7}$ to $1\times10^{-14}$, from $1\times10^{-8}$ to $1\times10^{-9}$, from $1\times10^{-8}$ to $1\times10^{-10}$, from $1\times10^{-8}$ to $1\times10^{-11}$, from $1\times10^{-8}$ to $1\times10^{-12}$, from $1\times10^{-8}$ to $1\times10^{-13}$, from $1\times10^{-8}$ to $1\times10^{-14}$, from $1\times10^{-9}$ to $1\times10^{-10}$, from $1\times10^{-9}$ to $1\times10^{-11}$, from $1\times10^{-9}$ to $1\times10^{-12}$, from 1 $15\times10^{-9}$ to $1\times10^{-13}$, from $1\times10^{-9}$ to $1\times10^{-14}$, from $1\times10^{10}$ to $1\times10^{-11}$, from $1\times10^{-10}$ to $1\times10^{-12}$, from $1\times10^{-10}$ to $1\times10^{-13}$, from $1\times10^{-10}$ to $1\times10^{-14}$, from $1\times10^{-11}$ to $1\times10^{-12}$, from $1\times10^{-11}$ to $1\times10^{-13}$, from $1\times10^{-11}$ to $1\times10^{-14}$, from $1\times10^{-12}$ to $1\times10^{-13}$, from $1\times10^{-12}$ to $1\times10^{-14}$, or from $1\times10^{-13}$ to $1\times10^{-14}$).

In some embodiments, the complexing agent and the carbonate or bicarbonate salt of the complexing agent can have a difference in Ksp value of at least 4 orders of magnitude (e.g., at least 5, at least 6, at least 7, at least 8, at least 9, at least 10, at least 11, at least 12, or at least 13).

In some embodiments, the complexing agent and the carbonate or bicarbonate salt of the complexing agent can have a difference in Ksp value of 14 or less orders of magnitude (e.g., 14 or less, 13 or less, 12 or less, 11 or less, 10 or less, 9 or less, 8 or less, 7 or less, 6 or less, or 5 or less).

The complexing agent and the carbonate or bicarbonate salt of the complexing agent have a difference in Ksp value of from any of the minimum values described above to any of the maximum values described above. For example, in some embodiments, the complexing agent and the carbonate or bicarbonate salt of the complexing agent have a difference in Ksp value of from 4 to 14 orders of magnitude (e.g., from 4 to 12, from 4 to 10, from 4 to 8, from 4 to 6, from 6 to 14, from 6 to 12, from 6 to 10, from 6 to 8, from 8 to 14, from 8 to 12, from 8 to 10, from 10 to 14, from 10 to 12, or from 12 to 14).

In some embodiments, the complexing agent can be present in the aqueous composition in a concentration of at least 0.1% by weight (e.g., at least 0.3% by weight, at least 0.5% by weight, at least 0.75% by weight, at least 1% by weight, at least 1.5% by weight, at least 2% by weight, at least 2.5% by weight, at least 3% by weight, at least 3.5% by weight, at least 4% by weight, or at least 4.5% by weight, at least 3% by weight, at least 4% by weight, at least 5% by weight, at least 6% by weight, at least 7% by weight, at least 8% by weight, or at least 9% by weight), based on the total weight of the aqueous composition. In some embodiments, the complexing agent can be present in the aqueous composition in a concentration of 10% by weight or less (e.g., 9% by weight or less, 8% by weight or less, 7% by weight or less, 6% by weight or less, 5% by weight or less, 4.5% by weight or less, 4% by weight or less, 3.5% by weight or less 3% by weight or less, 2.5% by weight or less, 2.0% by weight or less, 1.5% by weight or less, 1.0% by weight or less, 0.75% by weight or less, 0.5% by weight or less, 0.25% by weight or less, 0.2% by weight or less, or 0.15% by weight or less), based on the total weight of the aqueous composition.

The complexing agent can be present in the aqueous composition in a concentration of from any of the minimum values described above to any of the maximum values described above. For example, in some embodiments, the complexing agent can be present in the aqueous composition in a concentration of from 0.1% to 10% by weight (e.g., from 0.5% to 10% by weight, from 1% to 10% by weight, from 1.5% to 10% by weight, from 2% to 10% by weight, from 2.5% to 10% by weight, from 3% to 10% by weight, from 3.5% to 10% by weight, from 4% to 10% by weight, from 5% to 10% by weight, from 6% to 10% by weight, from 7% to 10% by weight, from 8% to 10% by weight, from 9% to 10% by weight, from 0.1% to 9% by weight, from 0.5% to 9% by weight, from 1% to 9% by weight, from 1.5% to 9% by weight, from 2% to 9% by weight, from 2.5% to 9% by weight, from 3% to 9% by weight, from 3.5% to 9% by weight, from 4% to 9% by weight, from 5% to 9% by weight, from 6% to 9% by weight, from 7% to 9% by weight, from 8% to 9% by weight, from 0.1% to 8% by weight, from 0.5% to 8% by weight, from 1% to 8% by weight, from 1.5% to 8% by weight, from 2% to 8% by weight, from 2.5% to 8% by weight, from 3% to 8% by weight, from 3.5% to 8% by weight, from 4% to 8% by weight, from 5% to 8% by weight, from 6% to 8% by weight, from 7% to 8% by weight, from 0.1% to 7% by weight, from 0.5% to 7% by weight, from 1% to 7% by weight, from 1.5% to 7% by weight, from 2% to 7% by weight, from 2.5% to 7% by weight, from 3% to 7% by weight, from 3.5% to 7% by weight, from 4% to 7% by weight, from 5% to 7% by weight, from 6% to 7% by weight, from 0.1% to 6% by weight, from 0.5% to 6% by weight, from 1% to 6% by weight, from 1.5% to 6% by weight, from 2% to 6% by weight, from 2.5% to 6% by weight, from 3% to 6% by weight, from 3.5% to 6% by weight, from 4% to 6% by weight, from 5% to 6% by weight, from 0.1% to 5% by weight, from 0.2% to 5% by weight, from 0.5% to 5% by weight, from 1% to 5% by weight, from 1.5% to 5% by weight, from 2% to 5% by weight, from 2.5% to 5% by weight, from 3% to 5% by weight, from 3.5% to 5% by weight, from 4% to 5% by weight, from 4.5% to 5% by weight, from 0.1% to 4% by weight, from 0.2% to 4% by weight, from 0.5% to 4% by weight, from 1% to 4% by weight, from 1.5% to 4% by weight, from 2% to 4% by weight, from 2.5% to 4% by weight, from 3% to 4% by weight, from 3.5% to 4% by weight, from 0.1% to 3% by weight, from 0.2% to 3% by weight, from 0.3% to 3% by weight, from 0.5% to 3% by weight, from 1% to 3% by weight, from 1.5% to 3% by weight, from 2% to 3% by weight, from 2.5% to 3% by weight, from 0.1% to 2.5% by weight, from 0.5% to 2.5% by weight, from 1% to 2.5% by weight, from 1.5% to 2.5% by weight, from 2% to 2.5% by weight, from 0.1% to 2% by weight, from 0.5% to 2% by weight, from 1% to 2% by weight, from 1.5% to 2% by weight, from 0.1% to 1.5% by weight from 0.5% to 1.5% by weight, from 1% to 1.5% by weight, from 0.5% to 1% by weight, or from 0.1% to 1% by weight), based on the total weight of the aqueous composition.

Compositions

Described herein are also aqueous composition including from 0.1% to 10% of an iminoguanidine complexing agent dissolved or dispersed in water, where the iminoguanidine complexing agent exhibits a Ksp of from $1\times10^{-4}$ to 1 at 25° C.; and where exposure of the iminoguanidine complexing agent to $CO_2$ forms a carbonate or bicarbonate salt of the iminoguanidine complexing agent having a Ksp of from $1\times10^{-2}$ to $1\times10^{-14}$ at 25° C.

In some embodiments, the iminoguanidine complexing agent can be present in the aqueous composition in a concentration of at least 0.1% by weight, (e.g., at least 0.3% by weight, at least 0.5% by weight, at least 0.75% by weight, at least 1% by weight, at least 1.5% by weight, at least 2% by weight, at least 2.5% by weight, at least 3% by weight, at least 3.5% by weight, at least 4% by weight, at least 4.5% by weight, at least 5% by weight, at least 6% by weight, at least 7% by weight, at least 8% by weight, or at least 9% by weight), based on the total weight of the aqueous composition. In some embodiments, the iminoguanidine complexing agent can be present in the aqueous composition in a concentration of 10% by weight or less (e.g., 9% by weight or less, 8% by weight or less, 7% by weight or less, 6% by weight or less, 5% by weight or less, 4.5% by weight or less, 4% by weight or less, 3.5% by weight or less 3% by weight or less, 2.5% by weight or less, 2.0% by weight or less, 1.5% by weight or less, 1.0% by weight or less, 0.75% by weight or less, 0.5% by weight or less, 0.25% by weight or less, 0.2% by weight or less, or 0.15% by weight or less), based on the total weight of the aqueous composition.

The iminoguanidine complexing agent can be present in the aqueous composition in a concentration of from any of the minimum values described above to any of the maximum values described above. For example, in some embodiments, the iminoguanidine complexing agent can be present in the aqueous composition in a concentration of from 0.1% to 10% by weight (e.g, from 0.5% to 10% by weight, from 1% to 10% by weight, from 1.5% to 10% by weight, from 2% to 10% by weight, from 2.5% to 10% by weight, from 3% to 10% by weight, from 3.5% to 10% by weight, from 4% to 10% by weight, from 5% to 10% by weight, from 6% to 10% by weight, from 7% to 10% by weight, from 8% to 10% by weight, from 9% to 10% by weight, from 0.1% to 9% by weight, from 0.5% to 9% by weight, from 1% to 9% by weight, from 1.5% to 9% by weight, from 2% to 9% by weight, from 2.5% to 9% by weight, from 3% to 9% by weight, from 3.5% to 9% by weight, from 4% to 9% by weight, from 5% to 9% by weight, from 6% to 9% by weight, from 7% to 9% by weight, from 8% to 9% by weight, from 0.1% to 8% by weight, from 0.5% to 8% by weight, from 1% to 8% by weight, from 1.5% to 8% by weight, from 2% to 8% by weight, from 2.5% to 8% by weight, from 3% to 8% by weight, from 3.5% to 8% by weight, from 4% to 8% by weight, from 5% to 8% by weight, from 6% to 8% by weight, from 7% to 8% by weight, from 0.1% to 7% by weight, from 0.5% to 7% by weight, from 1% to 7% by weight, from 1.5% to 7% by weight, from 2% to 7% by weight, from 2.5% to 7% by weight, from 3% to 7% by weight, from 3.5% to 7% by weight, from 4% to 7% by weight, from 5% to 7% by weight, from 6% to 7% by weight, from 0.1% to 6% by weight, from 0.5% to 6% by weight, from 1% to 6% by weight, from 1.5% to 6% by weight, from 2% to 6% by weight, from 2.5% to 6% by weight, from 3% to 6% by weight, from 3.5% to 6% by weight, from 4% to 6% by weight, from 5% to 6% by weight, from 0.1% to 5% by weight, from 0.2% to 5% by weight, from 0.5% to 5% by weight, from 1% to 5% by weight, from 1.5% to 5% by weight, from 2% to 5% by weight, from 2.5% to 5% by weight, from 3% to 5% by weight, from 3.5% to 5% by weight, from 4% to 5% by weight, from 4.5% to 5% by weight, from 0.1% to 4% by weight, from 0.2% to 4% by weight, from 0.5% to 4% by weight, from 1% to 4% by weight, from 1.5% to 4% by weight, from 2% to 4% by weight, from 2.5% to 4% by weight, from 3% to 4% by weight, from 3.5% to 4% by weight, from 0.1% to 3% by weight, from 0.2% to 3% by weight, from 0.3% to 3% by weight, from 0.5% to 3% by weight, from 1% to 3% by weight, from 1.5% to 3% by weight, from 2% to 3% by weight, from 2.5% to 3% by weight, from 0.1% to 2.5% by weight, from 0.5% to 2.5% by weight, from 1% to 2.5% by weight, from 1.5% to 2.5% by weight, from 2% to 2.5% by weight, from 0.1% to 2% by weight, from 0.5% to 2% by weight, from 1% to 2% by weight, from 1.5% to 2% by weight, from 0.1% to 1.5% by weight from 0.5% to 1.5% by weight, from 1% to 1.5% by weight, from 0.5% to 1% by weight, or from 0.1% to 1% by weight), based on the total weight of the aqueous composition. In some embodiments, the complexing agent can be present in the aqueous composition in a concentration of from 0.3% to 3% by weight, based on the total weight of the aqueous composition.

In some embodiments, the iminoguanidine complexing agent can be defined by the following structures of Formula I-1 or Formula I-2:

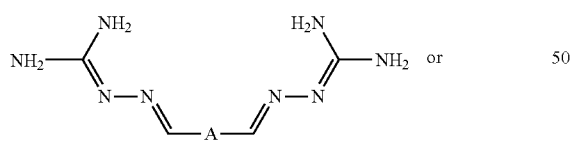

Formula I-1

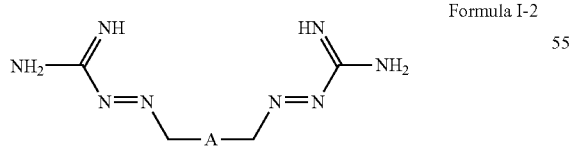

Formula I-2 wherein
A is a ring-containing moiety or a bond, and
one or more of the hydrogen atoms in Formula I-1 or Formula I-2 may be replaced with one, two, or more equivalent number of methyl groups.

In some embodiments, the iminoguanidine complexing agent can be selected from:

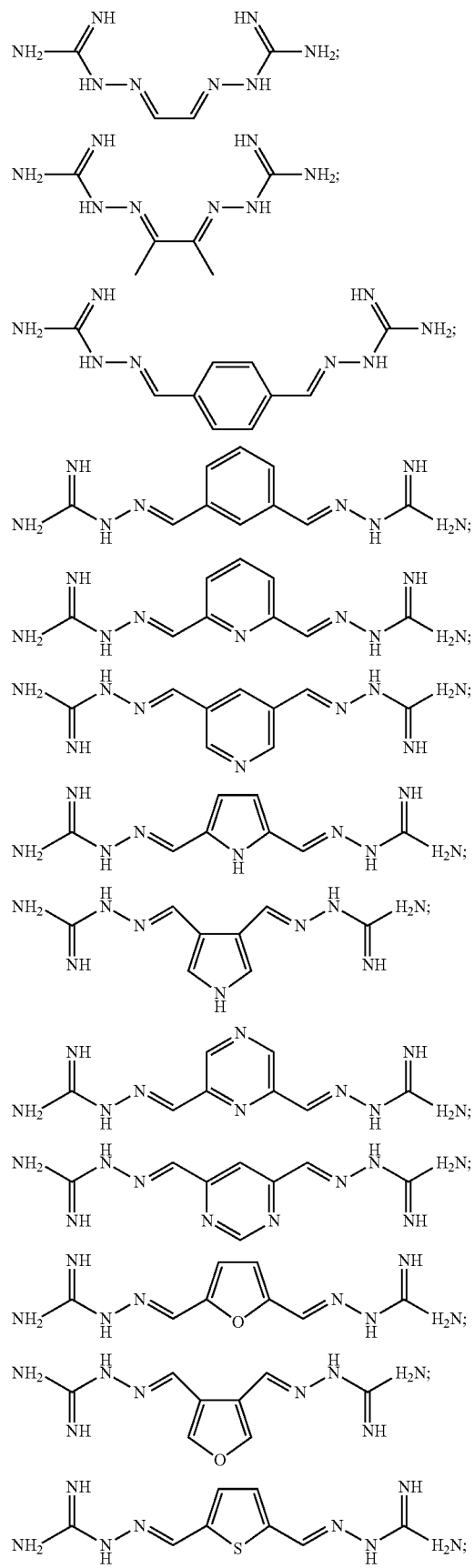

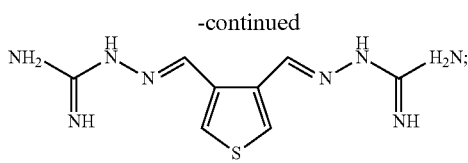

or any combination thereof.

In some embodiments, the iminoguanidine complexing agent can be selected from:

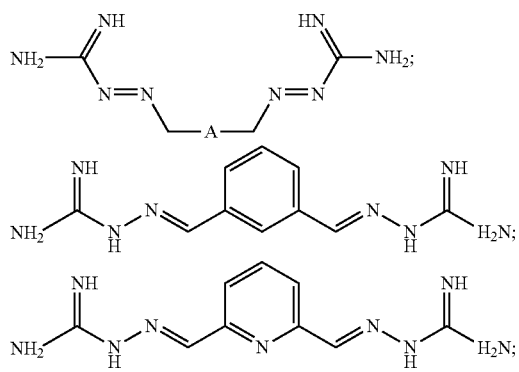

or any combination thereof.

In some embodiments, the iminoguanidine complexing agent can be

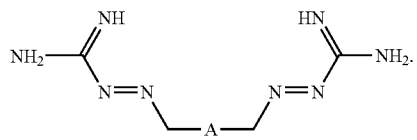

In some embodiments, the iminoguanidine complexing agent can be

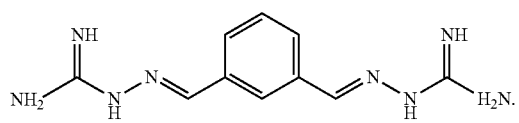 [SMILES: N=C(N)N/N=C/c1cccc(/C=N/NC(=N)N)c1]

In some embodiments, the iminoguanidine complexing agent can be

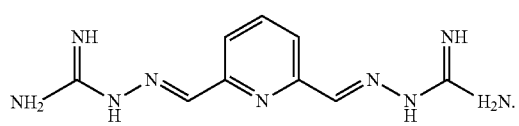 [SMILES: N=C(N)N/N=C/c1cccc(/C=N/NC(=N)N)n1]

In some embodiments, the iminoguanidine complexing agent can have a Ksp value of at least $1\times10^{-4}$ at 25° C. (e.g., at least $1\times10^{-3}$, at least $1\times10^{-2}$, or at least $1\times10^{-1}$) In some embodiments, the iminoguanidine complexing agent can have a Ksp value of 1 or less at 25° C., (e.g., $1\times10^{-3}$ or less, $1\times10^{-2}$ or less, or $1\times10^{-1}$ or less).

The iminoguanidine complexing agent can have a Ksp value of from any of the minimum values described above to any of the maximum values described above. For example, in some embodiments, the iminoguanidine complexing agent can have a Ksp value of from $1\times10^{-4}$ to 1 at 25° C. (e.g., from $1\times10^{-3}$ to 1, from $1\times10^{-2}$ to 1, from $1\times10^{-1}$ to 1, from $1\times10^{-3}$ to 1, from $1\times10^{-4}$ to $1\times10^{-3}$, from $1\times10^{-4}$ to $1\times10^{-2}$, from $1\times10^{-4}$ to $1\times10^{-1}$, from $1\times10^{-3}$ to $1\times10^{-2}$, from $1\times10^{-3}$ to $1\times10^{-1}$, or from $1\times10^{-2}$ to $1\times10^{-1}$).

In some embodiments, the carbonate or bicarbonate salt of the iminoguanidine complexing agent can be defined by the following structures of Formula I-a:

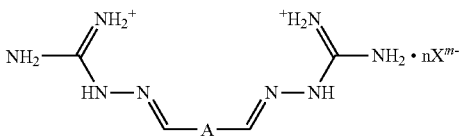

Formula I-a wherein
A is a ring-containing moiety or a bond; one or more of the hydrogen atoms in Formula I-a may be replaced with one, two, or more equivalent number of methyl groups;
$X^{m-}$ is a carbonate or bicarbonate anion, with m being 1 for bicarbonate and 2 for carbonate; and n is 0.5, 1, or 2.

In some embodiments, the carbonate or bicarbonate salt of the iminoguanidine complexing agent can be selected from:

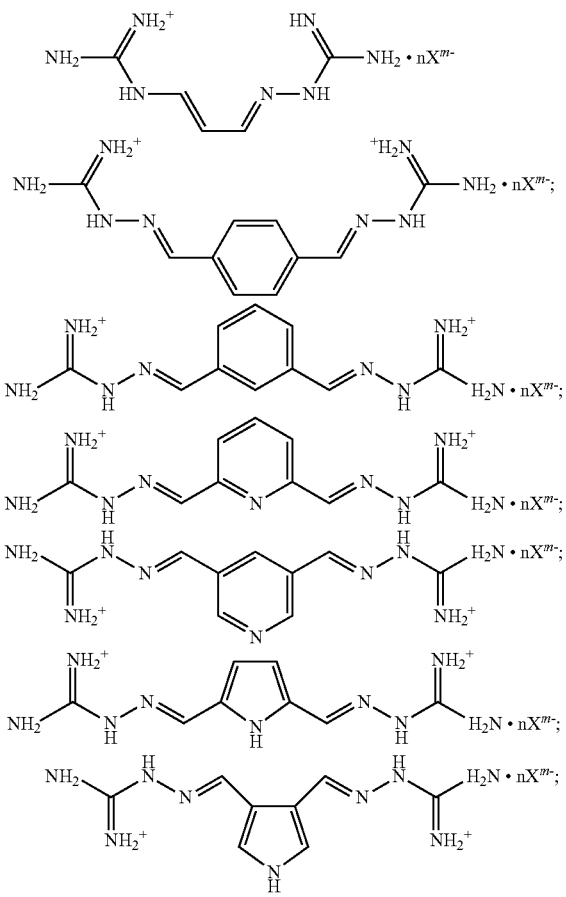

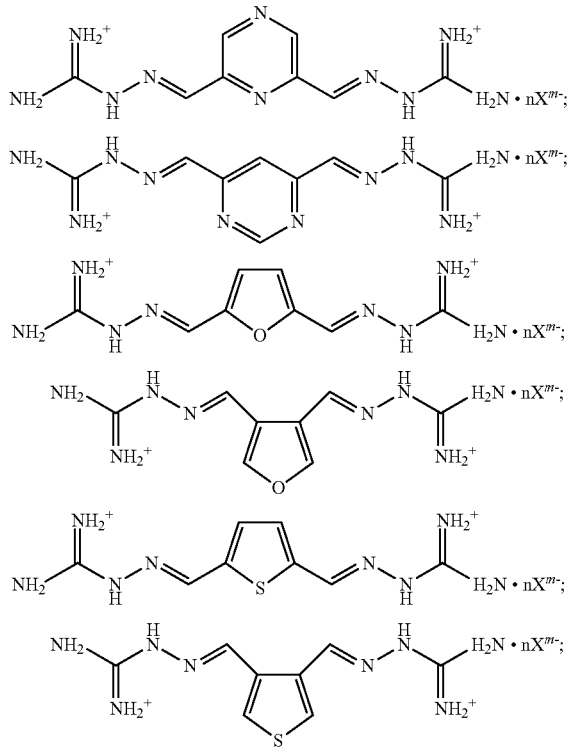

or any combination thereof.

In some embodiments, the carbonate or bicarbonate salt of the iminoguanidine complexing agent can be selected from:

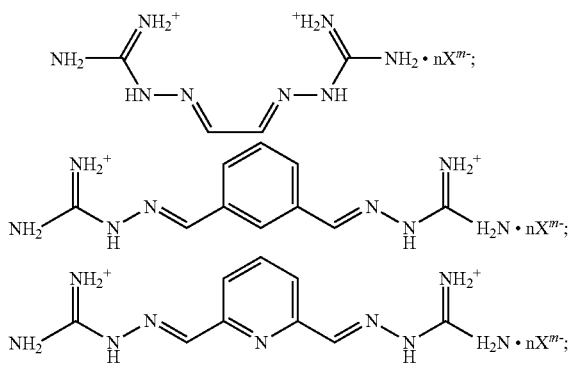

or any combination thereof.

In some embodiments, the carbonate or bicarbonate salt of the iminoguanidine complexing agent can be

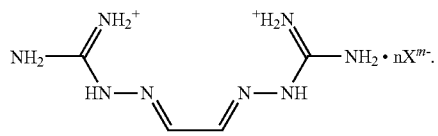

In some embodiments, the carbonate or bicarbonate salt of the iminoguanidine complexing agent can be

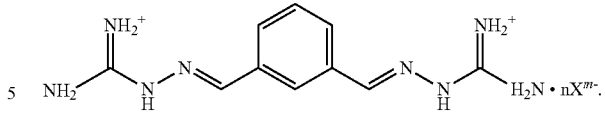

In some embodiments, the carbonate or bicarbonate salt of the iminoguanidine complexing agent can be

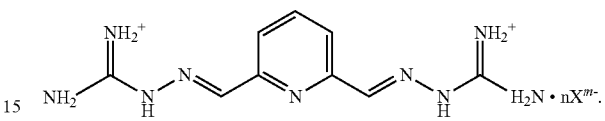

In some embodiments, the carbonate or bicarbonate salt of the iminoguanidine complexing agent has a Ksp value of at least $1 \times 10^{-2}$ at 25° C., (e.g., at least $1 \times 10^{-3}$, at least $1 \times 10^{-4}$, at least $1 \times 10^{-5}$, at least $1 \times 10^{-6}$, at least $1 \times 10^{-7}$, at least $1 \times 10^{-8}$, at least $1 \times 10^{-9}$, at least $1 \times 10^{-10}$, at least $1 \times 10^{-11}$, at least $1 \times 10^{-12}$, or at least $1 \times 10^{-13}$). In some embodiments, the carbonate or bicarbonate salt of the iminoguanidine complexing agent has a Ksp value of $1 \times 10^{-14}$ or less at 25° C. (e.g., $1 \times 10^{-13}$ or less, $1 \times 10^{-12}$ or less, $1 \times 10^{-11}$ or less, $1 \times 10^{-10}$ or less, $1 \times 10^{-9}$ or less, $1 \times 10^{-8}$ or less, $1 \times 10^{-7}$ or less, $1 \times 10^{-6}$ or less, $1 \times 10^{-5}$ or less, $1 \times 10^{-4}$ or less, or $1 \times 10^{-3}$ or less).

The carbonate or bicarbonate salt of the iminoguanidine complexing agent can have a Ksp value of from any of the minimum values described above to any of the maximum values described above. For example, in some embodiments, the carbonate or bicarbonate salt of the iminoguanidine complexing agent can have a Ksp value of from $1 \times 10^{-2}$ to $1 \times 10^{-14}$ at 25° C. (e.g., from $1 \times 10^{-2}$ to $1 \times 10^{-3}$, from $1 \times 10^{-2}$ to $1 \times 10^{-4}$, from $1 \times 10^{-2}$ to $1 \times 10^{-5}$, from $1 \times 10^{-2}$ to $1 \times 10^{-6}$, from $1 \times 10^{-2}$ to $1 \times 10^{-7}$, from $1 \times 10^{-2}$ to $1 \times 10^{-8}$, from $1 \times 10^{-2}$ to $1 \times 10^{-9}$, from $1 \times 10^{-2}$ to $1 \times 10^{-10}$, from $1 \times 10^{-2}$ to $1 \times 10^{-11}$, from $1 \times 10^{-2}$ to $1 \times 10^{-12}$, from $1 \times 10^{-2}$ to $1 \times 10^{-13}$, from $1 \times 10^{-3}$ to $1 \times 10^{-4}$, from $1 \times 10^{-3}$ to $1 \times 10^{-5}$, from $1 \times 10^{-3}$ to $1 \times 10^{-6}$, from $1 \times 10^{-3}$ to $1 \times 10^{-7}$, from $1 \times 10^{-3}$ to $1 \times 10^{-8}$, from $1 \times 10^{-3}$ to $1 \times 10^{-9}$, from $1 \times 10^{-3}$ to $1 \times 10^{-10}$, from $1 \times 10^{-3}$ to $1 \times 10^{-11}$, from $1 \times 10^{-3}$ to $1 \times 10^{-12}$, from $1 \times 10^{-3}$ to $1 \times 10^{-13}$, from $1 \times 10^{-3}$ to $1 \times 10^{-14}$, from $1 \times 10^{-4}$ to $1 \times 10^{-5}$, from $1 \times 10^{-4}$ to $1 \times 10^{-6}$, from $1 \times 10^{-4}$ to $1 \times 10^{-7}$, from $1 \times 10^{-4}$ to $1 \times 10^{-8}$, from $1 \times 10^{-4}$ to $1 \times 10^{-9}$, from $1 \times 10^{-4}$ to $1 \times 10^{-10}$, from $1 \times 10^{-4}$ to $1 \times 10^{-11}$, from $1 \times 10^{-4}$ to $1 \times 10^{-12}$, from $1 \times 10^{-4}$ to $1 \times 10^{-13}$, from $1 \times 10^{-4}$ to $1 \times 10^{-14}$, from $1 \times 10^{-5}$ to $1 \times 10^{-6}$, from $1 \times 10^{-5}$ to $1 \times 10^{-7}$, from $1 \times 10^{-5}$ to $1 \times 10^{-8}$, from $1 \times 10^{-5}$ to $1 \times 10^{-9}$, from $1 \times 10^{-5}$ to $1 \times 10^{-10}$, from $1 \times 10^{-5}$ to $1 \times 10^{-11}$, from $1 \times 10^{-5}$ to $1 \times 10^{-12}$, from $1 \times 10^{-5}$ to $1 \times 10^{-13}$, from $1 \times 10^{-5}$ to $1 \times 10^{-14}$, from $1 \times 10^{-6}$ to $1 \times 10^{-7}$, from $1 \times 10^{-6}$ to $1 \times 10^{-8}$, from $1 \times 10^{-6}$ to $1 \times 10^{-9}$, from $1 \times 10^{-6}$ to $1 \times 10^{-10}$, from $1 \times 10^{-6}$ to $1 \times 10^{-11}$, from $1 \times 10^{-6}$ to $1 \times 10^{-12}$, from $1 \times 10^{-6}$ to $1 \times 10^{-13}$, from $1 \times 10^{-6}$ to $1 \times 10^{-14}$, from $1 \times 10^{-7}$ to $1 \times 10^{-8}$, from $1 \times 10^{-7}$ to $1 \times 10^{-9}$, from $1 \times 10^{-7}$ to $1 \times 10^{-10}$, from $1 \times 10^{-7}$ to $1 \times 10^{-11}$, from $1 \times 10^{-7}$ to $1 \times 10^{-12}$, from $1 \times 10^{-7}$ to $1 \times 10^{-13}$, from $1 \times 10^{-7}$ to $1 \times 10^{-14}$, from $1 \times 10^{-8}$ to $1 \times 10^{-9}$, from $1 \times 10^{-8}$ to $1 \times 10^{-10}$, from $1 \times 10^{-8}$ to $1 \times 10^{-11}$, from $1 \times 10^{-8}$ to $1 \times 10^{-12}$, from $1 \times 10^{-8}$ to $1 \times 10^{-13}$, from $1 \times 10^{-8}$ to $1 \times 10^{-14}$, from $1 \times 10^{-9}$ to $1 \times 10^{-10}$, from $1 \times 10^{-9}$ to $1 \times 10^{-11}$, from $1 \times 10^{-9}$ to $1 \times 10^{-12}$, from $1 \times 10^{-9}$ to $1 \times 10^{-13}$, from $1 \times 10^{-9}$ to $1 \times 10^{-14}$, from $1 \times 10^{-1}$ to $1 \times 10^{-11}$, from $1 \times 10^{-1}$ to $1 \times 10^{-12}$, from $1 \times 10^{-1}$ to $1 \times 10^{-13}$, from $1 \times 10^{-1}$ to $1 \times 10^{-14}$ from $1 \times 10^{-11}$ to $1 \times 10^{-12}$, from $1 \times 10^{-11}$ to $1 \times 10^{-13}$, from $1 \times 10^{-11}$ to $1 \times 10^{-14}$, from $1 \times 10^{-12}$ to $1 \times 10^{-13}$, from $1 \times 10^{-12}$ to $1 \times 10^{-14}$, or from $1 \times 10^{-13}$ to $1 \times 10^{-14}$).

In some embodiments, the iminoguanidine complexing agent and the carbonate or bicarbonate salt of the iminoguanidine complexing agent can have a difference in Ksp value of at least 4 orders of magnitude (e.g., at least 5, at least 6, at least 7, at least 8, at least 9, at least 10, at least 11, at least 12, or at least 13). In some embodiments, the iminoguanidine complexing agent and the carbonate or bicarbonate salt of the iminoguanidine complexing agent can have a difference in Ksp value of 14 or less orders of magnitude (e.g., 14 or less, 13 or less, 12 or less, 11 or less, 10 or less, 9 or less, 8 or less, 7 or less, 6 or less, or 5 or less).

The iminoguanidine complexing agent and the carbonate or bicarbonate salt of the iminoguanidine complexing agent have a difference in Ksp value of from any of the minimum values described above to any of the maximum values described above. For example, in some embodiments, the iminoguanidine complexing agent and the carbonate or bicarbonate salt of the iminoguanidine complexing agent have a difference in Ksp value of from 4 to 14 orders of magnitude (e.g., from 4 to 12, from 4 to 10, from 4 to 8, from 4 to 6, from 6 to 14, from 6 to 12, from 6 to 10, from 6 to 8, from 8 to 14, from 8 to 12, from 8 to 10, from 10 to 14, from 10 to 12, or from 12 to 14).

In some embodiments, the compositions can further include an aqueous solution including water, an acid, an alkali agent, a polymer, a gelling agent, a crosslinker, a biocide, a scale inhibitor, a breaker, a pH adjusting agent, a non-emulsifier agent, a polymer, a friction reducer, an iron control agent, a chelating agent (e.g., EDTA or a salt thereof, for example, for use as an iron control agent), a corrosion inhibitor, a clay stabilizing agent (e.g., KCl), a wettability alteration chemical, an anti-foam agent (e.g., chemical defoamer), a sulfide scavenger, a mobility control agent, a co-solvent, a surfactant(s), a surfactant package or any combination thereof.

The aqueous solution can include any type of water, treated or untreated, and can vary in salt content. For example, the aqueous solution can include sea water, brackish water, flowback or produced water, wastewater (e.g., reclaimed or recycled), brine (e.g., reservoir or synthetic brine), fresh water (e.g., fresh water comprises<1,000 ppm TDS water), or any combination thereof. In some embodiments, the aqueous solution can include slickwater.

In some embodiments, the water can include hard water or hard brine. The hard water or hard brine can include a divalent metal ion chosen from $Ca^{2+}$, $Mg^{2+}$, $Sr^{2+}$, $Ba^{2+}$, or any combination thereof. In certain embodiments, the hard water or hard brine can include at least 10 ppm at least 100 ppm, at least 500 ppm, at least 1,000 ppm, at least 5,000 ppm, or at least 10,000 ppm of divalent metal ions can be chosen from $Ca^{2+}$, $Mg^{2+}$, $Sr^{2+}$, $Ba^{2+}$, or any combination thereof. In certain examples, the hard water or hard brine can include from 100 ppm to 25,000 ppm of divalent metal ions chosen from $Ca^{2+}$, $Mg^{2+}$, $Sr^{2+}$, $Ba^{2+}$, or any combination thereof.

In these embodiments, the aqueous solution can include from 30% to 99.85% by weight of the total composition of water, for example from 70% to 98% water, from 70% to 90% water, from 70% to 80% water, from 50% to 90% water, from 50% to 70% water, from 50% to 80% water, from 40% to 98% water, or from 50% to 99% water.

Acids

In some embodiments, the aqueous solution can include an acid (e.g., at least 10% acid, such as from 10% to 20% by weight acid). The acid can include any suitable acid known in the art. In some embodiments, the acid can include a strong acid, such as HCl, HF, or any combination thereof. In other embodiments, the acid can include a weak acid, such as an organic acid (e.g., acetic acid, citric acid, tartric acid, or any combination thereof).

In some embodiments, the aqueous solution can have a pH of at least 2 (e.g., at least 2.5, at least 3, at least 3.5, at least 4, at least 4.5, at least 5, or at least 5.5). In some embodiments, the aqueous solution can have a pH of 6 or less (e.g., 5.5 or less, 5 or less, 4.5 or less, 4 or less, 3.5 or less, 3 or less, or 2.5 or less).

The aqueous solution can have a pH ranging from any of the minimum values described above to any of the maximum values described above. For example, in some embodiments, the aqueous solution can have a pH of from 2 to 6 (e.g., from 2 to 5.5, from 2 to 4, or from 2 to 3).

Alkali Agents

In some embodiments, the aqueous solution can include an alkali agent. The term "alkali agent" is used herein according to its conventional meaning and includes basic, ionic salts of alkali metals or alkaline earth metals. Alkali agents as provided herein are typically capable of reacting with an unrefined petroleum acid (e.g., an acid in crude oil (reactive oil)) to form soap (a surfactant salt of a fatty acid) in situ. These in situ generated soaps serve as a source of surfactants capable of reducing the interfacial tension of hydrocarbons with an aqueous solution. Examples of suitable alkali agents include, but are not limited to, sodium hydroxide, potassium hydroxide, sodium carbonate, potassium carbonate, sodium silicate, sodium metaborate, and salts of EDTA (e.g., EDTA tetrasodium salt or EDTA tetrapotassium salt). In one embodiment, the alkali agent is NaOH. In other embodiments, the alkali agent is $Na_2CO_3$.

In some embodiments, the aqueous solution can have a pH of at least 8 (e.g., at least 8.5, at least 9, at least 9.5, at least 10, at least 10.5, at least 11, or at least 11.5). In some embodiments, the aqueous solution can have a pH of 12 or less (e.g., 11.5 or less, 11 or less, 10.5 or less, 10 or less, 9.5 or less, 9 or less, or 8.5 or less).

The aqueous solution can have a pH ranging from any of the minimum values described above to any of the maximum values described above. For example, in some embodiments, the aqueous solution can have a pH of from 8 to 12 (e.g., from 8.5 to 12, from 9 to 12, from 8.5 to 11.5, from 9 to 11.5, from 8.5 to 11, or from 9 to 11).

Co-Solvents

In some embodiments, the aqueous solution can include a co-solvent. The co-solvent can include any suitable water-miscible solvent. Suitable co-solvents include alcohols, such as lower carbon chain alcohols such as isopropyl alcohol, ethanol, n-propyl alcohol, n-butyl alcohol, sec-butyl alcohol, n-amyl alcohol, sec-amyl alcohol, n-hexyl alcohol, sec-hexyl alcohol and the like; alcohol ethers, polyalkylene alcohol ethers, polyalkylene glycols, poly(oxyalkylene)glycols, poly(oxyalkylene)glycol ethers, ethoxylated phenol, or any other common organic co-solvent or combinations of any two or more co-solvents. In one embodiment, the co-solvent can comprise alkyl ethoxylate $(C_1$-$C_6)$-XEO X=1-30-linear or branched. In some embodiments, the co-solvent can comprise ethylene glycol butyl ether (EGBE), diethylene glycol monobutyl ether (DGBE), triethylene glycol monobutyl ether (TEGBE), ethylene glycol dibutyl ether (EGDE), polyethylene glycol monomethyl ether (mPEG), dimethyl ether, or any combination thereof. Examples of suitable co-solvents are also described in U.S. Pat. No. 10,337,303, which is incorporated by reference herein in its entirety.

In some embodiments, the co-solvent can be present in the aqueous solution in an amount of from 0.1% to 25% by weight (e.g. from 0.1% to 10% by weight, or from 0.5% to 5% by weight) of the total weight of the aqueous solution.

Friction Reducer

In some embodiments, the aqueous solution can include a friction reducer. Examples of friction reducers are known in the art. Examples of suitable polymers include synthetic polymers such as polyacrylamides. Examples of suitable polymers include synthetic polymers such as partially hydrolyzed polyacrylamides (HPAMs or PHPAs) and hydrophobically-modified associative polymers (APs). Also included are co-polymers of polyacrylamide (PAM) and one or both of 2-acrylamido 2-methylpropane sulfonic acid (and/or sodium salt) commonly referred to as AMPS (also more generally known as acrylamido tertiobutyl sulfonic acid or ATBS), N-vinyl pyrrolidone (NVP), and the NVP-based synthetic may be single-, co-, or ter-polymers. In one embodiment, the synthetic polymer is polyacrylic acid (PAA). In one embodiment, the synthetic polymer is polyvinyl alcohol (PVA). Copolymers may be made of any combination or mixture above, for example, a combination of NVP and ATBS. Indeed, the terminology "mixtures thereof" or "combinations thereof" can include "modifications thereof" herein.

In some embodiments, the friction reducer can be present in the aqueous solution in a concentration of at least 0.1 gpt (e.g., at least 0.5 gpt, at least 1 gpt, at least 2 gpt, at least 3 gpt, or at least 4 gpt). In some embodiments, the friction reducer can be present in the aqueous solution in a concentration of 5 gpt or less (e.g., 4 gpt or less, 3 gpt or less, 2 gpt or less, 1 gpt or less, or 0.5 gpt or less).

The friction reducer can be present in the aqueous solution in a concentration can range from any of the minimum values described above to any of the maximum values described above. For example, in some embodiments, the friction reducer can be present in the aqueous solution in a concentration ranging from 0.1 gpt to 5 gpt (e.g., from 0.1 gpt to 4.5 gpt, from 0.1 gpt to 4 gpt, from 0.1 gpt to 3.5 gpt, from 0.1 gpt to 3 gpt, from 0.1 gpt to 2.5 gpt, from 0.1 gpt to 2 gpt, from 0.1 gpt to 1.5 gpt, from 0.1 gpt to 1 gpt, from 0.1 gpt to 0.5 gpt, from 1 gpt to 2 gpt, from 1 gpt to 3 gpt, from 1 gpt to 4 gpt, from 1 gpt to 5 gpt, from 0.5 gpt to 2 gpt, from 0.5 gpt to 3 gpt, from 0.5 gpt to 4 gpt, from 0.5 gpt to 5 gpt, from 2 gpt to 4 gpt, from 2 gpt to 5 gpt, from 2 gpt to 3 gpt, from 3 gpt to 5 gpt, from 3 gpt to 4 gpt, or from 4 gpt to 5 gpt).

Polymers

In some embodiments, the aqueous solution can include a polymer. Examples of polymer are known in the art. Examples of suitable polymers include biopolymers such as polysaccharides. For example, polysaccharides can be xanthan gum, scleroglucan, guar gum, a mixture thereof (e.g., any modifications thereof such as a modified chain), etc. Indeed, the terminology "mixtures thereof" or "combinations thereof" can include "modifications thereof" herein.

In some embodiments, the aqueous solution includes one or more synthetic (co)polymers, such as one or more acrylamide containing (co)polymers. As used herein, the terms "polymer," "polymers," "polymeric," and similar terms are used in their ordinary sense as understood by one skilled in the art, and thus may be used herein to refer to or describe a large molecule (or group of such molecules) that contains recurring units. Polymers may be formed in various ways, including by polymerizing monomers and/or by chemically modifying one or more recurring units of a precursor polymer. A polymer may be a "homopolymer" comprising substantially identical recurring units formed by, e.g., polymerizing a particular monomer. A polymer may also be a "copolymer" comprising two or more different recurring units formed by, e.g., copolymerizing two or more different monomers, and/or by chemically modifying one or more recurring units of a precursor polymer. The term "terpolymer" may be used herein to refer to polymers containing three or more different recurring units. The term "polymer" as used herein is intended to include both the acid form of the polymer as well as its various salts.

In some embodiments, the one or more synthetic (co) polymers can be a polymer useful for enhanced oil recovery applications. The term "enhanced oil recovery" or "EOR" (also known as tertiary oil recovery), refers to a process for hydrocarbon production in which an aqueous solution comprising at least a water soluble polymer is injected into a hydrocarbon bearing formation.

In some embodiments, the one or more synthetic (co) polymers comprise water-soluble synthetic (co)polymers. Examples of suitable synthetic (co)polymers include acrylic polymers, such as polyacrylic acids, polyacrylic acid esters, partly hydrolyzed acrylic esters, substituted polyacrylic acids such as polymethacrylic acid and polymethacrylic acid esters, polyacrylamides, partly hydrolyzed polyacrylamides, and polyacrylamide derivatives such as acrylamide tertiary butyl sulfonic acid (ATBS); copolymers of unsaturated carboxylic acids, such as acrylic acid or methacrylic acid, with olefins such as ethylene, propylene and butylene and their oxides; polymers of unsaturated dibasic acids and anhydrides such as maleic anhydride; vinyl polymers, such as polyvinyl alcohol (PVA), N-vinylpyrrolidone, and polystyrene sulfonate; and copolymers thereof, such as copolymers of these polymers with monomers such as ethylene, propylene, styrene, methylstyrene, and alkylene oxides. In some embodiments, the one or more synthetic (co)polymer can comprise polyacrylic acid (PAA), polyacrylamide (PAM), acrylamide tertiary butyl sulfonic acid (ATBS) (or AMPS, 2-acrylamido-2-methylpropane sulfonic acid), N-vinylpyrrolidone (NVP), polyvinyl alcohol (PVA), or a blend or copolymer of any of these polymers. Copolymers may be made of any combination above, for example, a combination of NVP and ATBS. In certain examples, the one or more synthetic (co)polymers can comprise acrylamide tertiary butyl sulfonic acid (ATBS) (or AMPS, 2-acrylamido-2-methylpropane sulfonic acid) or a copolymer thereof.

In some embodiments, the one or more synthetic (co) polymers can comprise acrylamide (co)polymers. In some embodiments, the one or more acrylamide (co)polymers comprise water-soluble acrylamide (co)polymers. In various embodiments, the acrylamide (co)polymers comprise at least 30% by weight, or at least 50% by weight acrylamide units with respect to the total amount of all monomeric units in the (co)polymer.

Optionally, the acrylamide-(co)polymers can comprise, besides acrylamide, at least one additional co-monomer. In example embodiments, the acrylamide-(co)polymer may comprise less than about 50%, or less than about 40%, or less than about 30%, or less than about 20% by weight of the at least one additional co-monomer. In some embodiments, the additional comonomer can be a water-soluble, ethylenically unsaturated, in particular monoethylenically unsaturated, comonomer. Suitable additional water-soluble comonomers include comonomers that are miscible with water in any ratio, but it is sufficient that the monomers dissolve sufficiently in an aqueous phase to copolymerize with acrylamide. In some cases, the solubility of such additional monomers in water at room temperature can be at least 50 g/L (e.g., at least 150 g/L, or at least 250 g/L).

Other suitable water-soluble comonomers can comprise one or more hydrophilic groups. The hydrophilic groups can be, for example, functional groups that comprise one or more atoms selected from the group of O-, N-, S-, and P-atoms. Examples of such functional groups include carbonyl groups >C—O, ether groups —O—, in particular polyethylene oxide groups —($CH_2$—$CH_2$—O—)$_n$—, where n is preferably a number from 1 to 200, hydroxy groups —OH, ester groups —C(O)O—, primary, secondary or tertiary amino groups, ammonium groups, amide groups —C(O)—NH— or acid groups such as carboxyl groups —COOH, sulfonic acid groups —$SO_3H$, phosphonic acid groups —$PO_3H_2$ or phosphoric acid groups —OP(OH)$_3$.

Examples of monoethylenically unsaturated comonomers comprising acid groups include monomers comprising —COOH groups, such as acrylic acid or methacrylic acid, crotonic acid, itaconic acid, maleic acid or fumaric acid, monomers comprising sulfonic acid groups, such as vinylsulfonic acid, allylsulfonic acid, 2-acrylamido-2-methylpropanesulfonic acid, 2-methacrylamido-2-methylpropanesulfonic acid, 2-acrylamidobutanesulfonic acid, 3-acrylamido-3-methylbutanesulfonic acid or 2-acrylamido-2,4,4-trimethylpentanesulfonic acid, or monomers comprising phosphonic acid groups, such as vinylphosphonic acid, allylphosphonic acid, N-(meth)acrylamidoalkylphosphonic acids or (meth)acryloyloxyalkyl-phosphonic acids. Of course the monomers may be used as salts.

The —COOH groups in polyacrylamide-copolymers may not only be obtained by copolymerizing acrylic amide and monomers comprising —COOH groups but also by hydrolyzing derivatives of —COOH groups after polymerization. For example, the amide groups —CO—$NH_2$ of acrylamide may hydrolyze thus yielding —COOH groups.

Also to be mentioned are derivatives of acrylamide thereof, such as, for example, N-methyl(meth)acrylamide, N,N'-dimethyl(meth)acrylamide, and N-methylolacrylamide, N-vinyl derivatives such as N-vinylformamide, N-vinylacetamide, N-vinylpyrrolidone or N-vinylcaprolactam, and vinyl esters, such as vinyl formate or vinyl acetate. N-vinyl derivatives can be hydrolyzed after polymerization to vinylamine units, vinyl esters to vinyl alcohol units.

Other example comonomers include monomers comprising hydroxy and/or ether groups, such as, for example, hydroxyethyl(meth)acrylate, hydroxypropyl(meth)acrylate, allyl alcohol, hydroxyvinyl ethyl ether, hydroxyl vinyl propyl ether, hydroxyvinyl butyl ether or polyethyleneoxide (meth)acrylates.

Other example comonomers are monomers having ammonium groups, i.e monomers having cationic groups. Examples comprise salts of 3-trimethylammonium propylacrylamides or 2-trimethylammonium ethyl(meth)acrylates, for example the corresponding chlorides, such as 3-trimethylammonium propylacrylamide chloride (DIMAPAQUAT) and 2-trimethylammonium ethyl methacrylate chloride (MADAME-QUAT).

Other example monoethylenically unsaturated monomers include monomers which may cause hydrophobic association of the (co)polymers. Such monomers comprise besides the ethylenic group and a hydrophilic part also a hydrophobic part.

Other example comonomers include N-alkyl acrylamides and N-alkyl quaternary acrylamides, where the alkyl group comprises, for example, a C2-C28 alkyl group.

In certain embodiments, each of the one or more acrylamide-(co)polymers can optionally comprise crosslinking monomers, i.e. monomers comprising more than one polymerizable group. In certain embodiments, the one or more acrylamide-(co)polymers may optionally comprise crosslinking monomers in an amount of less than 0.5%, or 0.1%, by weight, based on the amount of all monomers.

In an embodiment, each of the one or more acrylamide-(co)polymers comprises at least one monoethylenically unsaturated comonomer comprising acid groups, for example monomers which comprise at least one group selected from —COOH, —$SO_3H$ or —$PO_3H_2$. Examples of such monomers include but are not limited to acrylic acid, methacrylic acid, vinylsulfonic acid, allylsulfonic acid or 2-acrylamido-2-methylpropanesulfonic acid, particularly preferably acrylic acid and/or 2-acrylamido-2-methylpropanesulfonic acid and most preferred acrylic acid or the salts thereof. The amount of such comonomers comprising acid groups can be from 0.1% to 70%, from 1% to 50%, or from 10% to 50% by weight based on the amount of all monomers.

In an embodiment, each of the one or more acrylamide-(co)polymers comprise from 50% to 90% by weight of acrylamide units and from 10% to 50% by weight of acrylic acid units and/or their respective salts, based on the total weight of all the monomers making up the copolymer. In an embodiment, each of the one or more acrylamide-(co)polymers comprise from 60% to 80% by weight of acrylamide units and from 20% to 40% by weight of acrylic acid units, based on the total weight of all the monomers making up the copolymer.

In some embodiments, the one or more synthetic (co)polymers (e.g., the one or more acrylamide (co)polymers) are in the form of particles, which are dispersed in the solution. In some embodiments, the particles of the one or more synthetic (co)polymers can have an average particle size of from 0.4 µm to 5 µm, or from 0.5 µm to 2 µm. Average particle size refers to the $d_{50}$ value of the particle size distribution (number average) as measured by laser diffraction analysis.

In some embodiments, the one or more synthetic (co)polymers (e.g., the one or more acrylamide (co)polymers) can have a weight average molecular weight ($M_w$) of from 5,000,000 g/mol to 30,000,000 g/mol; from 10,000,000 g/mol to 25,000,000 g/mol; or from 15,000,000 g/mol to 25,000,000 g/mol.

In some embodiments, the polymer can be present in the aqueous solution in an amount of at least 0.003% by weight (e.g. at least 0.01% by weight, at least 0.05% by weight, at least 0.1% by weight, at least 0.5% by weight, at least 1% by weight, at least 5% by weight, at least 10% by weight, at least 15% by weight, or at least 20% by weight) of the total weight of the aqueous solution. In some embodiments, the polymer can be present in the aqueous solution in an amount of 25% by weight or less, (e.g., 20% by weight or less, 15% by weight or less, 10% by weight or less, 5% by weight or less, 1% by weight or less, 0.5% by weight or less, 0.1% by weight or less, 0.05% by weight or less, or 0.01% by weight or less) of the total weight of the aqueous solution.

The polymer can be present in the aqueous solution in an amount ranging from any of the minimum values described above to any of the maximum values described above. For example, in some embodiments, the polymer can be present in the aqueous solution in an amount of from 0.003% to 25% by weight (e.g. from 0.003% to 10% by weight, from 0.01% to 10% by weight, from 0.01% to 25% by weight, from 0.1% to 25% by weight, from 0.1% to 5% by weight, from 0.1% to 10% by weight, from 0.5% to 25%, from 0.5% to 10% by weight, from 0.5% to 5% by weight from 0.5% to 25% by weight, from 1% to 5%, from 1% to 10%, from 1% to 25%, from 5% to 10%, from 5% to 25%, or from 10% to 25%) of the total weight of the aqueous solution.

Surfactant

Suitable surfactants can include one or more anionic surfactant, non-ionic surfactant, cationic surfactant, zwitterionic surfactant, or any combination thereof. In some embodiments the surfactant can be a surfactant package.

Suitable surfactant packages can include a primary surfactant and optionally one or more secondary surfactants.

In some cases, the primary surfactant can include an anionic surfactant. In these cases, one or more secondary surfactants can include one or more non-ionic surfactants, one or more additional anionic surfactants, one or more cationic surfactants, one or more zwitterionic surfactants, or any combination thereof.

In other cases, the primary surfactant can include a non-ionic surfactant. In these cases, one or more secondary surfactants can include one or more additional non-ionic surfactants, one or more anionic surfactants, one or more cationic surfactants, one or more zwitterionic surfactants, or any combination thereof.

In other cases, the primary surfactant can include a cationic surfactant. In these cases, one or more secondary surfactants can include one or more non-ionic surfactants, one or more anionic surfactants, one or more additional cationic surfactants, one or more zwitterionic surfactants, or any combination thereof.

In other cases, the primary surfactant can include a zwitterionic surfactant. In these cases, one or more secondary surfactants can include one or more non-ionic surfactants, one or more anionic surfactants, one or more cationic surfactants, one or more additional zwitterionic surfactants, or any combination thereof.

In some embodiments, the primary surfactant can include at least 10% by weight (e.g., at least 15% by weight, at least 20% by weight, at least 25% by weight, at least 30% by weight, at least 35% by weight, at least 40% by weight, at least 45% by weight, at least 50% by weight, at least 55% by weight, at least 60% by weight, at least 65% by weight, at least 70% by weight, at least 75% by weight, at least 80% by weight, or at least 85% by weight) of the aqueous solution, based on the total weight of the aqueous solution. In some embodiments, the primary surfactant can include 90% by weight or less (e.g., 85% by weight or less, 80% by weight or less, 75% by weight or less, 70% by weight or less, 65% by weight or less, 60% by weight or less, 55% by weight or less, 50% by weight or less, 45% by weight or less, 40% by weight or less, 35% by weight or less, 30% by weight or less, 25% by weight or less, 20% by weight or less, or 15% by weight or less) of the aqueous solution, based on the total weight of the aqueous solution.

The primary surfactant can be present in the aqueous solution in an amount ranging from any of the minimum values described above to any of the maximum values described above. For example, in some embodiments, the primary surfactant can include from 10% to 90% by weight (e.g., from 10% to 50% by weight) of the aqueous solution, based on the total weight of the aqueous solution.

In some embodiments, the one or more secondary surfactants can include at least 10% by weight (e.g., at least 15% by weight, at least 20% by weight, at least 25% by weight, at least 30% by weight, at least 35% by weight, at least 40% by weight, at least 45% by weight, at least 50% by weight, at least 55% by weight, at least 60% by weight, at least 65% by weight, at least 70% by weight, at least 75% by weight, at least 80% by weight, or at least 85% by weight) of the aqueous solution, based on the total weight of the aqueous solution. In some embodiments, the one or more secondary surfactants can include 90% by weight or less (e.g., 85% by weight or less, 80% by weight or less, 75% by weight or less, 70% by weight or less, 65% by weight or less, 60% by weight or less, 55% by weight or less, 50% by weight or less, 45% by weight or less, 40% by weight or less, 35% by weight or less, 30% by weight or less, 25% by weight or less, 20% by weight or less, or 15% by weight or less) of the aqueous solution, based on the total weight of the aqueous solution.

The one or more secondary surfactants can be present in the aqueous solution in an amount ranging from any of the minimum values described above to any of the maximum values described above. For example, in some embodiments, the one or more secondary surfactants can include from 10% to 90% by weight (e.g., from 10% to 50% by weight) of the aqueous solution, based on the total weight of the aqueous solution.

In some embodiments, the aqueous solution can include an anionic surfactant. In other embodiments, the aqueous solution can consist essentially of an anionic surfactant (i.e., the anionic surfactant is the only surfactant present in the aqueous solution). In other embodiments, the aqueous solution can consist of an anionic surfactant. In some of these embodiments, the aqueous solution further includes water. In some of these embodiments, the aqueous solution does not include a hydrocarbon.

In some embodiments, the aqueous solution can include an anionic surfactant and a non-ionic surfactant. In other embodiments, the aqueous solution can consist essentially of an anionic surfactant and a non-ionic surfactant (i.e., the anionic surfactant and the non-ionic surfactant are the only surfactants present in the aqueous solution). In other embodiments, the aqueous solution can consist of an anionic surfactant and a non-ionic surfactant. In some of these embodiments, the aqueous solution can further include water. In some of these embodiments, the aqueous solution does not include a hydrocarbon.

In some embodiments, the aqueous solution can include an anionic surfactant, a second anionic surfactant, and a non-ionic surfactant. In other embodiments, the aqueous solution can consist essentially of an anionic surfactant, a second anionic surfactant, and a non-ionic surfactant (i.e., the anionic surfactant, the second anionic surfactant, and the non-ionic surfactant are the only surfactants present in the aqueous solution). In other embodiments, the aqueous solution can consist of an anionic surfactant, a second anionic surfactant, and a non-ionic surfactant. In some of these embodiments, the aqueous solution further includes water. In some of these embodiments, the aqueous solution does not include a hydrocarbon.

In some embodiments, the aqueous solution can include a non-ionic surfactant. In other embodiments, the aqueous solution can consist essentially of a non-ionic surfactant (i.e., the non-ionic surfactant is the only surfactant present in the aqueous solution). In other embodiments, the aqueous solution can consist of a non-ionic surfactant. In some of these embodiments, the aqueous solution further includes water. In some of these embodiments, the aqueous solution does not include a hydrocarbon.

In some embodiments, the aqueous solution can include a non-ionic surfactant, an anionic surfactant, and a second anionic surfactant. In other embodiments, the aqueous solution can consist essentially of a non-ionic surfactant, an anionic surfactant, and a second anionic surfactant (i.e., the anionic surfactant, the second anionic surfactant, and the non-ionic surfactant are the only surfactants present in the aqueous solution). In other embodiments, the aqueous solution can consist of a non-ionic surfactant, an anionic surfactant, and a second anionic surfactant. In some of these embodiments, the aqueous solution further includes water. In some of these embodiments, the aqueous solution does not include a hydrocarbon.

Suitable anionic surfactants for use as a primary surfactant and/or a secondary surfactant include a hydrophobic tail that includes from 6 to 60 carbon atoms. In some embodiments, the anionic surfactant can include a hydrophobic tail that comprises at least 6 carbon atoms (e.g., at least 7 carbon atoms, at least 8 carbon atoms, at least 9 carbon atoms, at least 10 carbon atoms, at least 11 carbon atoms, at least 12 carbon atoms, at least 13 carbon atoms, at least 14 carbon atoms, at least 15 carbon atoms, at least 16 carbon atoms, at least 17 carbon atoms, at least 18 carbon atoms, at least 19 carbon atoms, at least 20 carbon atoms, at least 21 carbon atoms, at least 22 carbon atoms, at least 23 carbon atoms, at least 24 carbon atoms, at least 25 carbon atoms, at least 26 carbon atoms, at least 27 carbon atoms, at least 28 carbon atoms, at least 29 carbon atoms, at least 30 carbon atoms, at least 31 carbon atoms, at least 32 carbon atoms, at least 33 carbon atoms, at least 34 carbon atoms, at least 35 carbon atoms, at least 36 carbon atoms, at least 37 carbon atoms, at least 38 carbon atoms, at least 39 carbon atoms, at least 40 carbon atoms, at least 41 carbon atoms, at least 42 carbon atoms, at least 43 carbon atoms, at least 44 carbon atoms, at least 45 carbon atoms, at least 46 carbon atoms, at least 47 carbon atoms, at least 48 carbon atoms, at least 49 carbon atoms, at least 50 carbon atoms, at least 51 carbon atoms, at least 52 carbon atoms, at least 53 carbon atoms, at least 54 carbon atoms, at least 55 carbon atoms, at least 56 carbon atoms, at least 57 carbon atoms, at least 58 carbon atoms, or at least 59 carbon atoms). In some embodiments, the anionic surfactant can include a hydrophobic tail that comprises 60 carbon atoms or less (e.g., 59 carbon atoms or less, 58 carbon atoms or less, 57 carbon atoms or less, 56 carbon atoms or less, 55 carbon atoms or less, 54 carbon atoms or less, 53 carbon atoms or less, 52 carbon atoms or less, 51 carbon atoms or less, 50 carbon atoms or less, 49 carbon atoms or less, 48 carbon atoms or less, 47 carbon atoms or less, 46 carbon atoms or less, 45 carbon atoms or less, 44 carbon atoms or less, 43 carbon atoms or less, 42 carbon atoms or less, 41 carbon atoms or less, 40 carbon atoms or less, 39 carbon atoms or less, 38 carbon atoms or less, 37 carbon atoms or less, 36 carbon atoms or less, 35 carbon atoms or less, 34 carbon atoms or less, 33 carbon atoms or less, 32 carbon atoms or less, 31 carbon atoms or less, 30 carbon atoms or less, 29 carbon atoms or less, 28 carbon atoms or less, 27 carbon atoms or less, 26 carbon atoms or less, 25 carbon atoms or less, 24 carbon atoms or less, 23 carbon atoms or less, 22 carbon atoms or less, 21 carbon atoms or less, 20 carbon atoms or less, 19 carbon atoms or less, 18 carbon atoms or less, 17 carbon atoms or less, 16 carbon atoms or less, 15 carbon atoms or less, 14 carbon atoms or less, 13 carbon atoms or less, 12 carbon atoms or less, 11 carbon atoms or less, 10 carbon atoms or less, 9 carbon atoms or less, 8 carbon atoms or less, or 7 carbon atoms or less).

The anionic surfactant can include a hydrophobic tail that comprises a number of carbon atoms ranging from any of the minimum values described above to any of the maximum values described above. For example, in some embodiments, the anionic surfactant can comprise a hydrophobic tail comprising from 6 to 15, from 16 to 30, from 31 to 45, from 46 to 60, from 6 to 25, from 26 to 60, from 6 to 30, from 31 to 60, from 6 to 32, from 33 to 60, from 6 to 12, from 13 to 22, from 23 to 32, from 33 to 42, from 43 to 52, from 53 to 60, from 6 to 10, from 10 to 15, from 16 to 25, from 26 to 35, or from 36 to 45 carbon atoms. The hydrophobic (lipophilic) carbon tail may be a straight chain, branched chain, and/or may comprise cyclic structures. The hydrophobic carbon tail may comprise single bonds, double bonds, triple bonds, or any combination thereof. In some embodiments, the anionic surfactant can include a branched hydrophobic tail derived from Guerbet alcohols. The hydrophilic portion of the anionic surfactant can comprise, for example, one or more sulfate moieties (e.g., one, two, or three sulfate moieties), one or more sulfonate moieties (e.g., one, two, or three sulfonate moieties), one or more sulfosuccinate moieties (e.g., one, two, or three sulfosuccinate moieties), one or more carboxylate moieties (e.g., one, two, or three carboxylate moieties), or any combination thereof.

In some embodiments, the anionic surfactant can include, for example a sulfonate, a disulfonate, a polysulfonate, a sulfate, a disulfate, a polysulfate, a sulfosuccinate, a disulfosuccinate, a polysulfosuccinate, a carboxylate, a dicarboxylate, a polycarboxylate, or any combination thereof. In some embodiments, the anionic surfactant can include, for example a sulfonate, a disulfonate, a sulfate, a disulfate, a sulfosuccinate, a disulfosuccinate, a carboxylate, a dicarboxylate, or any combination thereof. In some examples, the anionic surfactant can comprise an internal olefin sulfonate (IOS), an isomerized olefin sulfonate, an alfa olefin sulfonate (AOS), an alkyl aryl sulfonate (AAS), a xylene sulfonate, an alkane sulfonate, a petroleum sulfonate, an alkyl diphenyl oxide (di)sulfonate, an alcohol sulfate, an alkoxy sulfate, an alkoxy sulfonate, an alkoxy carboxylate, an alcohol phosphate, or an alkoxy phosphate. In some embodiments, the anionic surfactant can include an alkoxy carboxylate surfactant, an alkoxy sulfate surfactant, an alkoxy sulfonate surfactant, an alkyl sulfonate surfactant, an aryl sulfonate surfactant, or an olefin sulfonate surfactant.

An "alkoxy carboxylate surfactant" or "alkoxy carboxylate" refers to a compound having an alkyl or aryl attached to one or more alkoxylene groups (typically —CH$_2$—CH(ethyl)-O—, —CH$_2$—CH(methyl)-O—, or —CH$_2$—CH$_2$—O—) which, in turn is attached to —COO$^-$ or acid or salt thereof including metal cations such as sodium. In embodiments, the alkoxy carboxylate surfactant can be defined by the formulae below:

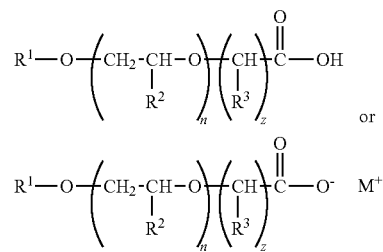

wherein $R^1$ is substituted or unsubstituted C6-C36 alkyl or substituted or unsubstituted aryl; $R^2$ is, independently for each occurrence within the compound, hydrogen or unsubstituted C1-C6 alkyl; $R^3$ is independently hydrogen or unsubstituted C1-C6 alkyl, n is an integer from 0 to 175, z is an integer from 1 to 6 and $M^+$ is a monovalent, divalent or trivalent cation. In some of these embodiments, $R^1$ can be an unsubstituted linear or branched C6-C36 alkyl.

In certain embodiments, the alkoxy carboxylate can be a C6-C32:PO(0-65):EO(0-100)-carboxylate (i.e., a C6-C32 hydrophobic tail, such as a branched or unbranched C6-C32 alkyl group, attached to from 0 to 65 propyleneoxy groups (—CH$_2$—CH(methyl)-O-linkers), attached in turn to from 0 to 100 ethyleneoxy groups (—CH$_2$—CH$_2$—O-linkers), attached in turn to —COO$^-$ or an acid or salt thereof including metal cations such as sodium). In certain embodiments, the alkoxy carboxylate can be a branched or unbranched C6-C30:PO(30-40):EO(25-35)-carboxylate.

In certain embodiments, the alkoxy carboxylate can be a branched or unbranched C6-C12:PO(30-40):EO(25-35)-carboxylate. In certain embodiments, the alkoxy carboxylate can be a branched or unbranched C6-C30:EO(8-30)-carboxylate.

An "alkoxy sulfate surfactant" or "alkoxy sulfate" refers to a surfactant having an alkyl or aryl attached to one or more alkoxylene groups (typically —CH$_2$—CH(ethyl)-O—, —CH$_2$—CH(methyl)-O—, or —CH$_2$—CH$_2$—O—) which, in turn is attached to —SO$_3^-$ or acid or salt thereof including metal cations such as sodium. In some embodiment, the alkoxy sulfate surfactant has the formula R—(BO)$_e$—(PO)$_f$—(EO)$_g$—SO$_3^-$ or acid or salt (including metal cations such as sodium) thereof, wherein R is C6-C32 alkyl, BO is —CH$_2$—CH(ethyl)-O—, PO is —CH$_2$—CH(methyl)-O—, and EO is —CH$_2$—CH$_2$—O—. The symbols e, f and g are integers from 0 to 50 wherein at least one is not zero.

In embodiments, the alkoxy sulfate surfactant can be an aryl alkoxy sulfate surfactant. The aryl alkoxy surfactant can be an alkoxy surfactant having an aryl attached to one or more alkoxylene groups (typically —CH$_2$—CH(ethyl)-O—, —CH$_2$—CH(methyl)-O—, or —CH$_2$—CH$_2$—O—) which, in turn is attached to —SO$_3^-$ or acid or salt thereof including metal cations such as sodium.

An "alkyl sulfonate surfactant" or "alkyl sulfonate" refers to a compound that includes an alkyl group (e.g., a branched or unbranched C6-C32 alkyl group) attached to —SO$_3^-$ or acid or salt thereof including metal cations such as sodium.

An "aryl sulfate surfactant" or "aryl sulfate" refers to a compound having an aryl group attached to —O—SO$_3^-$ or acid or salt thereof including metal cations such as sodium. An "aryl sulfonate surfactant" or "aryl sulfonate" refers to a compound having an aryl group attached to —SO$_3^-$ or acid or salt thereof including metal cations such as sodium. In some cases, the aryl group can be substituted, for example, with an alkyl group (an alkyl aryl sulfonate).

An "internal olefin sulfonate," "isomerized olefin sulfonate," or "IOS" refers to an unsaturated hydrocarbon compound comprising at least one carbon-carbon double bond and at least one SO$_3^-$ group, or a salt thereof. As used herein, a "C20-C28 internal olefin sulfonate," "a C20-C28 isomerized olefin sulfonate," or "C20-C28 IOS" refers to an IOS, or a mixture of IOSs with an average carbon number of 20 to 28, or of 23 to 25. The C20-C28 IOS may comprise at least 80% of IOS with carbon numbers of 20 to 28, at least 90% of IOS with carbon numbers of 20 to 28, or at least 99% of IOS with carbon numbers of 20 to 28. As used herein, a "C15-C18 internal olefin sulfonate," "C15-C18 isomerized olefin sulfonate," or "C15-C18 IOS" refers to an IOS or a mixture of IOSs with an average carbon number of 15 to 18, or of 16 to 17. The C15-C18 IOS may comprise at least 80% of IOS with carbon numbers of 15 to 18, at least 90% of IOS with carbon numbers of 15 to 18, or at least 99% of IOS with carbon numbers of 15 to 18. The internal olefin sulfonates or isomerized olefin sulfonates may be alpha olefin sulfonates, such as an isomerized alpha olefin sulfonate. The internal olefin sulfonates or isomerized olefin sulfonates may also comprise branching. In certain embodiments, C15-18 IOS may be added to the surfactant package when the aqueous solution is intended for use in high temperature unconventional subterranean formations, such as formations above 130° F. (approximately 55° C.). The IOS may be at least 20% branching, 30% branching, 40% branching, 50% branching, 60% branching, or 65% branching. In some embodiments, the branching is between 20-98%, 30-90%, 40-80%, or around 65%. Examples of internal olefin sulfonates and the methods to make them are found in U.S. Pat. No. 5,488,148, and U.S. Patent Application Publication 2009/0112014, all incorporated herein by reference.

In some embodiments, the anionic surfactant can be a disulfonate, alkyldiphenyloxide disulfonate, mono alkyldiphenyloxide disulfonate, di alkyldiphenyloxide disulfonate, or a di alkyldiphenyloxide monosulfonate, where the alkyl group can be a C6-C36 linear or branched alkyl group. In some embodiments, the anionic surfactant can be an alkylbenzene sulfonate or a dibenzene disulfonate. In some embodiments, the anionic surfactant can be benzenesulfonic acid, decyl(sulfophenoxy)-disodium salt; linear or branched C6-C36 alkyl:PO(0-65):EO(0-100) sulfate; or linear or branched C6-C36 alkyl:PO(0-65):EO(0-100) carboxylate. In some embodiments, the anionic surfactant can be an isomerized olefin sulfonate (C6-C30), internal olefin sulfonate (C6-C30) or internal olefin disulfonate (C6-C30). In some embodiments, the anionic surfactant is a Guerbet-PO(0-65)-EO(0-100) sulfate (Guerbet portion can be C6-C36). In some embodiments, the anionic surfactant can be a Guerbet-PO(0-65)-EO(0-100) carboxylate (Guerbet portion can be C6-C36). In some embodiments, the anionic surfactant can be alkyl PO(0-65) and EO(0-100) sulfonate: where the alkyl group is linear or branched C6-C36. In some embodiments, the anionic surfactant can be a sulfosuccinate, such as a dialkylsulfosuccinate. In some embodiments, the anionic surfactant can be an alkyl aryl sulfonate (AAS) (e.g. an alkyl benzene sulfonate (ABS)), a C10-C30 internal olefin sulfate (IOS), a petroleum sulfonate, or an alkyl diphenyl oxide (di)sulfonate.

In some examples, the anionic surfactant can include a surfactant defined by the formula below:

$$R^1\text{-}R^2\text{-}R^3$$

wherein $R^1$ comprises a branched or unbranched, saturated or unsaturated, cyclic or non-cyclic, hydrophobic carbon chain having 6-32 carbon atoms and an oxygen atom linking $R^1$ and $R^2$; $R^2$ comprises an alkoxylated chain comprising at least one oxide group selected from the group consisting of ethylene oxide, propylene oxide, butylene oxide, and combinations thereof; and $R^3$ comprises a branched or unbranched hydrocarbon chain comprising 2-12 carbon atoms and from 2 to 5 carboxylate groups.

In some examples, the anionic surfactant can include a surfactant defined by the formula below:

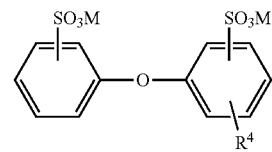

wherein $R^4$ is a branched or unbranched, saturated or unsaturated, cyclic or non-cyclic, hydrophobic carbon chain having 6-32 carbon atoms; and M represents a counterion (e.g., $Na^+$, $K^+$). In some embodiments, $R^4$ is a branched or unbranched, saturated or unsaturated, cyclic or non-cyclic, hydrophobic carbon chain having 6-16 carbon atoms.

Suitable non-ionic surfactants for use as a primary surfactant and/or a secondary surfactant include compounds that can be added to increase wettability. In some embodiments, the hydrophilic-lipophilic balance (HLB) of the non-ionic surfactant is greater than 10 (e.g., greater than 9, greater than 8, or greater than 7). In some embodiments, the HLB of the non-ionic surfactant can be from 7 to 10.

The non-ionic surfactant can include a hydrophobic tail comprising from 6 to 60 carbon atoms. In some embodiments, the non-ionic surfactant can include a hydrophobic tail that includes at least 6 carbon atoms (e.g., at least 7 carbon atoms, at least 8 carbon atoms, at least 9 carbon atoms, at least 10 carbon atoms, at least 11 carbon atoms, at least 12 carbon atoms, at least 13 carbon atoms, at least 14 carbon atoms, at least 15 carbon atoms, at least 16 carbon atoms, at least 17 carbon atoms, at least 18 carbon atoms, at least 19 carbon atoms, at least 20 carbon atoms, at least 21 carbon atoms, at least 22 carbon atoms, at least 23 carbon atoms, at least 24 carbon atoms, at least 25 carbon atoms, at least 26 carbon atoms, at least 27 carbon atoms, at least 28 carbon atoms, at least 29 carbon atoms, at least 30 carbon atoms, at least 31 carbon atoms, at least 32 carbon atoms, at least 33 carbon atoms, at least 34 carbon atoms, at least 35 carbon atoms, at least 36 carbon atoms, at least 37 carbon atoms, at least 38 carbon atoms, at least 39 carbon atoms, at least 40 carbon atoms, at least 41 carbon atoms, at least 42 carbon atoms, at least 43 carbon atoms, at least 44 carbon atoms, at least 45 carbon atoms, at least 46 carbon atoms, at least 47 carbon atoms, at least 48 carbon atoms, at least 49 carbon atoms, at least 50 carbon atoms, at least 51 carbon atoms, at least 52 carbon atoms, at least 53 carbon atoms, at least 54 carbon atoms, at least 55 carbon atoms, at least 56 carbon atoms, at least 57 carbon atoms, at least 58 carbon atoms, or at least 59 carbon atoms). In some embodiments, the non-ionic surfactant can include a hydrophobic tail that comprises 60 carbon atoms or less (e.g., 59 carbon atoms or less, 58 carbon atoms or less, 57 carbon atoms or less, 56 carbon atoms or less, 55 carbon atoms or less, 54 carbon atoms or less, 53 carbon atoms or less, 52 carbon atoms or less, 51 carbon atoms or less, 50 carbon atoms or less, 49 carbon atoms or less, 48 carbon atoms or less, 47 carbon atoms or less, 46 carbon atoms or less, 45 carbon atoms or less, 44 carbon atoms or less, 43 carbon atoms or less, 42 carbon atoms or less, 41 carbon atoms or less, 40 carbon atoms or less, 39 carbon atoms or less, 38 carbon atoms or less, 37 carbon atoms or less, 36 carbon atoms or less, 35 carbon atoms or less, 34 carbon atoms or less, 33 carbon atoms or less, 32 carbon atoms or less, 31 carbon atoms or less, 30 carbon atoms or less, 29 carbon atoms or less, 28 carbon atoms or less, 27 carbon atoms or less, 26 carbon atoms or less, 25 carbon atoms or less, 24 carbon atoms or less, 23 carbon atoms or less, 22 carbon atoms or less, 21 carbon atoms or less, 20 carbon atoms or less, 19 carbon atoms or less, 18 carbon atoms or less, 17 carbon atoms or less, 16 carbon atoms or less, 15 carbon atoms or less, 14 carbon atoms or less, 13 carbon atoms or less, 12 carbon atoms or less, 11 carbon atoms or less, 10 carbon atoms or less, 9 carbon atoms or less, 8 carbon atoms or less, or 7 carbon atoms or less).

The non-ionic surfactant can include a hydrophobic tail that comprises a number of carbon atoms ranging from any of the minimum values described above to any of the maximum values described above. For example, in some embodiments, the non-ionic surfactant can include a hydrophobic tail comprising from 6 to 15, from 16 to 30, from 31 to 45, from 46 to 60, from 6 to 25, from 26 to 60, from 6 to 30, from 31 to 60, from 6 to 32, from 33 to 60, from 6 to 12, from 13 to 22, from 23 to 32, from 33 to 42, from 43 to 52, from 53 to 60, from 6 to 10, from 10 to 15, from 16 to 25, from 26 to 35, or from 36 to 45 carbon atoms. In some cases, the hydrophobic tail may be a straight chain, branched chain, and/or may comprise cyclic structures. The hydrophobic carbon tail may include single bonds, double bonds, triple bonds, or any combination thereof. In some cases, the hydrophobic tail can comprise an alkyl group, with or without an aromatic ring (e.g., a phenyl ring) attached to it. In some embodiments, the hydrophobic tail can comprise a branched hydrophobic tail derived from Guerbet alcohols.

Example non-ionic surfactants include alkyl aryl alkoxy alcohols, alkyl alkoxy alcohols, or any combination thereof. In embodiments, the non-ionic surfactant may be a mix of surfactants with different length lipophilic tail chain lengths. For example, the non-ionic surfactant may be C9-C11:9EO, which indicates a mixture of non-ionic surfactants that have a lipophilic tail length of 9 carbon to 11 carbon, which is followed by a chain of 9 EOs. The hydrophilic moiety is an alkyleneoxy chain (e.g., an ethoxy (EO), butoxy (BO) and/or propoxy (PO) chain with two or more repeating units of EO, BO, and/or PO). In some embodiments, 1-100 repeating units of EO are present. In some embodiments, 0-65 repeating units of PO are present. In some embodiments, 0-25 repeating units of BO are present. For example, the non-ionic surfactant could comprise 10EO:5PO or 5EO. In embodiments, the non-ionic surfactant may be a mix of surfactants with different length lipophilic tail chain lengths. For example, the non-ionic surfactant may be C9-C11:PO9:EO2, which indicates a mixture of non-ionic surfactants that have a lipophilic tail length of 9 carbon to 11 carbon, which is followed by a chain of 9 POs and 2 EOs. In specific embodiments, the non-ionic surfactant is linear C9-C11:9EO. In some embodiments, the non-ionic surfactant is a Guerbet PO(0-65) and EO(0-100) (Guerbet can be C6-C36); or alkyl PO(0-65) and EO(0-100): where the alkyl group is linear or branched C1-C36. In some examples, the non-ionic surfactant can comprise a branched or unbranched C6-C32:PO(0-65):EO(0-100) (e.g., a branched or unbranched C6-C30:PO(30-40):EO(25-35), a branched or unbranched C6-C12:PO(30-40):EO(25-35), a branched or unbranched C6-30:EO(8-30), or any combination thereof). In some embodiments, the non-ionic surfactant is one or more alkyl polyglucosides.

Example cationic surfactants include surfactant analogous to those described above, except bearing primary, secondary, or tertiary amines, or quaternary ammonium cations, as a hydrophilic head group. "Zwitterionic" or "zwitterion" as used herein refers to a neutral molecule with a positive (or cationic) and a negative (or anionic) electrical charge at different locations within the same molecule. Example zwitterionic surfactants include betains and sultains.

Examples of suitable surfactants are disclosed, for example, in U.S. Pat. Nos. 3,811,504, 3,811,505, 3,811,507, 3,890,239, 4,463,806, 6,022,843, 6,225,267, 7,629,299, 7,770,641, 9,976,072, 8,211, 837, 9,422,469, 9,605,198, and 9,617,464; WIPO Patent Application Nos. WO/2012/027757 (equivalent to U.S. Pat. No. 8,822,391); as well as U.S. Patent Application Nos. 2005/0199395, 2006/0185845, 2006/0189486, 2009/0270281, 2011/0046024, 2011/0100402, 2011/0190175, 2007/0191633, 2010/004843. 2011/0201531, 2011/0190174, 2011/0071057, 2011/0059873, 2011/0059872, 2011/0048721, 2010/0319920, 2010/0292110, and 2017/0198202, each of which is hereby incorporated by reference herein in its entirety for its description of example surfactants.

In some embodiments, the primary surfactant can have a concentration within the aqueous solution of at least 0.01% by weight (e.g., at least 0.02% by weight, at least 0.03% by weight, at least 0.04% by weight, at least 0.05% by weight, at least 0.06% by weight, at least 0.07% by weight, at least 0.08% by weight, at least 0.09% by weight, at least 0.1% by weight, at least 0.15% by weight, at least 0.2% by weight, at least 0.25% by weight, at least 0.3% by weight, at least 0.35% by weight, at least 0.4% by weight, at least 0.45% by weight, at least 0.5% by weight, at least 0.55% by weight, at least 0.6% by weight, at least 0.65% by weight, at least 0.7% by weight, at least 0.75% by weight, at least 0.8% by weight, at least 0.85% by weight, at least 0.9% by weight, at least 0.95% by weight, at least 1% by weight, at least 1.25% by weight, at least 1.5% by weight, at least 1.75% by weight, at least 2% by weight, or at least 2.25% by weight), based on the total weight of the aqueous solution. In some embodiments, the primary surfactant can have a concentration within the aqueous solution of 2.5% by weight or less (e.g., 2.25% by weight or less, 2% by weight or less, 1.75% by weight or less, 1.5% by weight or less, 1.25% by weight or less, 1% by weight or less, 0.95% by weight or less, 0.9% by weight or less, 0.85% by weight or less, 0.8% by weight or less, 0.75% by weight or less, 0.7% by weight or less, 0.65% by weight or less, 0.6% by weight or less, 0.55% by weight or less, 0.5% by weight or less, 0.45% by weight or less, 0.4% by weight or less, 0.35% by weight or less, 0.3% by weight or less, 0.25% by weight or less, 0.2% by weight or less, 0.15% by weight or less, 0.1% by weight or less, 0.09% by weight or less, 0.08% by weight or less, 0.07% by weight or less, 0.06% by weight or less, 0.05% by weight or less, 0.04% by weight or less, 0.03% by weight or less, or 0.02% by weight or less), based on the total weight of the aqueous solution. In particular embodiments, the primary surfactant can have a concentration within the aqueous solution of less than 1%, less than 0.5%, less than 0.2%, less than 0.1%, less than 0.075%, or less than 0.05%.

The primary surfactant can have a concentration within the aqueous solution ranging from any of the minimum values described above to any of the maximum values described above. For example, in some embodiments, the primary surfactant can have a concentration within the aqueous solution of from 0.01% to 2.5% by weight (e.g., from 0.05% to 0.5% by weight), based on the total weight of the aqueous solution.

When present, the one or more secondary surfactants can have a concentration within the aqueous solution of at least 0.001% by weight (e.g., at least 0.005% by weight, at least 0.01% by weight, at least 0.02% by weight, at least 0.03% by weight, at least 0.04% by weight, at least 0.05% by weight, at least 0.06% by weight, at least 0.07% by weight, at least 0.08% by weight, at least 0.09% by weight, at least 0.1% by weight, at least 0.15% by weight, at least 0.2% by weight, at least 0.25% by weight, at least 0.3% by weight, at least 0.35% by weight, at least 0.4% by weight, at least 0.45% by weight, at least 0.5% by weight, at least 0.55% by weight, at least 0.6% by weight, at least 0.65% by weight, at least 0.7% by weight, at least 0.75% by weight, at least 0.8% by weight, at least 0.85% by weight, at least 0.9% by weight, at least 0.95% by weight, at least 1% by weight, at least 1.25% by weight, at least 1.5% by weight, at least 1.75% by weight, at least 2% by weight, or at least 2.25% by weight), based on the total weight of the aqueous solution. In some embodiments, the one or more secondary surfactants can have a concentration within the aqueous solution of 2.5% by weight or less (e.g., 2.25% by weight or less, 2% by weight or less, 1.75% by weight or less, 1.5% by weight or less, 1.25% by weight or less, 1% by weight or less, 0.95% by weight or less, 0.9% by weight or less, 0.85% by weight or less, 0.8% by weight or less, 0.75% by weight or less, 0.7% by weight or less, 0.65% by weight or less, 0.6% by weight or less, 0.55% by weight or less, 0.5% by weight or less, 0.45% by weight or less, 0.4% by weight or less, 0.35% by weight or less, 0.3% by weight or less, 0.25% by weight or less, 0.2% by weight or less, 0.15% by weight or less, 0.1% by weight or less, 0.09% by weight or less, 0.08% by weight or less, 0.07% by weight or less, 0.06% by weight or less, 0.05% by weight or less, 0.04% by weight or less, 0.03% by weight or less, 0.02% by weight or less, 0.01% by weight or less, or 0.005% by weight or less), based on the total weight of the aqueous solution. In particular embodiments, the one or more secondary surfactants can have a concentration within the aqueous solution of less than 2%, less than 1.5%, less than 1%, less than 0.5%, less than 0.2%, less than 0.1%, less than 0.075%, less than 0.05%, or less than 0.01%.

When present, the one or more secondary surfactants can have a concentration within the aqueous solution ranging from any of the minimum values described above to any of the maximum values described above. For example, in some embodiments, the one or more secondary surfactants can have a concentration within the aqueous solution of from 0.001% to 2.5% by weight (e.g., from 0.001% to 1.5% by weight, or from 0.05% to 0.5% by weight), based on the total weight of the aqueous solution.

In some embodiments, the primary surfactant and one or more secondary surfactants can be present in the aqueous solution at a weight ratio of primary surfactant to one or more secondary surfactants of at least 1:1 (e.g., at least 2:1, at least 2.5:1, at least 3:1, at least 4:1, at least 5:1, at least 6:1, at least 7:1, at least 8:1, or at least 9:1). In some embodiments, the primary surfactant and one or more secondary surfactants can be present in the aqueous solution in a weight ratio of primary surfactant to one or more secondary surfactants of 10:1 or less (e.g., 9:1 or less; 8:1 or less, 7:1 or less, 6:1 or less, 5:1 or less, 4:1 or less, 3:1 or less, 2.5:1 or less, or 2:1 or less).

The primary surfactant and one or more secondary surfactants can be present in the aqueous solution in a weight ratio ranging from any of the minimum values described above to any of the maximum values described above. For example, the primary surfactant and one or more secondary surfactants can be present in the aqueous solution in a weight ratio of primary surfactant to one or more secondary surfactants of from 1:1 to 10:1 (e.g., 1:1 to 5:1).

In other embodiments, the one or more secondary surfactants are absent (i.e., the primary surfactant is the only surfactant present in the aqueous solution).

In some embodiments, the total concentration of all surfactants in the aqueous solution (the total concentration of the primary surfactant and the one or more secondary surfactants in the aqueous solution) can be at least 0.01% by weight (e.g., at least 0.02% by weight, at least 0.03% by weight, at least 0.04% by weight, at least 0.05% by weight, at least 0.06% by weight, at least 0.07% by weight, at least 0.08% by weight, at least 0.09% by weight, at least 0.1% by weight, at least 0.15% by weight, at least 0.2% by weight, at least 0.25% by weight, at least 0.3% by weight, at least 0.35% by weight, at least 0.4% by weight, at least 0.45% by weight, at least 0.5% by weight, at least 0.55% by weight, at least 0.6% by weight, at least 0.65% by weight, at least 0.7% by weight, at least 0.75% by weight, at least 0.8% by weight, at least 0.85% by weight, at least 0.9% by weight, at least 0.95% by weight, at least 1% by weight, at least 1.25% by weight, at least 1.5% by weight, at least 1.75% by weight, at least 2% by weight, at least 2.25% by weight, at least 2.5% by weight, at least 2.75% by weight, at least 3% by weight, at least 3.25% by weight, at least 3.5% by weight, at least 3.75% by weight, at least 4% by weight, at least 4.25% by weight, at least 4.5% by weight, or at least 4.75% by weight), based on the total weight of the aqueous solution. In some embodiments, the total concentration of all surfactants in the aqueous solution (the total concentration of the primary surfactant and the one or more secondary surfactants in the aqueous solution) can be 5% by weight or less (e.g., 4.75% by weight or less, 4.5% by weight or less, 4.25% by weight or less, 4% by weight or less, 3.75% by weight or less, 3.5% by weight or less, 3.25% by weight or less, 3% by weight or less, 2.75% by weight or less, 2.5% by weight or less, 2.25% by weight or less, 2% by weight or less, 1.75% by weight or less, 1.5% by weight or less, 1.25% by weight or less, 1% by weight or less, 0.95% by weight or less, 0.9% by weight or less, 0.85% by weight or less, 0.8% by weight or less, 0.75% by weight or less, 0.7% by weight or less, 0.65% by weight or less, 0.6% by weight or less, 0.55% by weight or less, 0.5% by weight or less, 0.45% by weight or less, 0.4% by weight or less, 0.35% by weight or less, 0.3% by weight or less, 0.25% by weight or less, 0.2% by weight or less, 0.15% by weight or less, 0.1% by weight or less, 0.09% by weight or less, 0.08% by weight or less, 0.07% by weight or less, 0.06% by weight or less, 0.05% by weight or less, 0.04% by weight or less, 0.03% by weight or less, or 0.02% by weight or less), based on the total weight of the aqueous solution.

The total concentration of all surfactants in the aqueous solution (the total concentration of the primary surfactant and the one or more secondary surfactants in the aqueous solution) can range from any of the minimum values described above to any of the maximum values described above. For example, in some embodiments, the total concentration of all surfactants in the aqueous solution (the total concentration of the primary surfactant and the one or more secondary surfactants in the aqueous solution) can be from 0.01% by weight to 5% by weight (e.g., from 0.01 to 2.5% by weight, from 0.01 to 1% by weight, or from 0.01 to 0.5% by weight).

In some embodiments when the aqueous solution is being injected into a horizontal well, the total concentration of all surfactants in the aqueous solution (the total concentration of the primary surfactant and the one or more secondary surfactants in the aqueous solution) can be from 0.01% to 1.5% by weight, from 0.01% to 10% by weight, or from 0.01% to 0.5% by weight.

In some embodiments when the aqueous solution is being injected into a vertical well, the total concentration of all surfactants in the aqueous solution (the total concentration of the primary surfactant and the one or more secondary surfactants in the aqueous solution) can be from 0.01% to 5% by weight, from 0.01% to 1% by weight, from 0.5% to 5% by weight, from 0.5% to 2.5% by weight, from 0.5% to 1.5% by weight, from 0.5% to 1% by weight, from 1% to 5% by weight, from 1% to 2.5% by weight, or from 1% to 1.5% by weight.

In some embodiments, the aqueous solution can comprise a non-ionic surfactant and an anionic surfactant (e.g., a sulfonate or disulfonate). In some embodiments, the aqueous solution can comprise a non-ionic surfactant and two or more anionic surfactants (e.g., a sulfonate or disulfonate and a carboxylate). In some embodiments, the aqueous solution can comprise a non-ionic surfactant (e.g., a C6-C16 alkyl phenol ethoxylate, or a C6-C16:PO(0-25):EO(0-25), such as a C9-C11 ethoxylated alcohol, a C13 ethoxylated alcohol, a C6-C10 ethoxylated propoxylated alcohol, or a C10-C14 ethoxylated Guerbet alcohol) and a sulfonate surfactant (e.g., a C10-16 disulfonate, or a C16-28 IOS). In some embodiments, the aqueous solution can comprise a non-ionic surfactant (e.g., a C6-C16 alkyl phenol ethoxylate, or a C6-16:PO(0-25):EO(0-25), such as a C9-C11 ethoxylated alcohol, a C13 ethoxylated alcohol, a C6-C10 ethoxylated propoxylated alcohol, or a C10-C14 ethoxylated Guerbet alcohol), a sulfonate surfactant (e.g., a C10-16 disulfonate, or a C16-28 IOS), and a carboxylate surfactant (e.g., a C10-16 alkyl polyglucoside carboxylate or a C22-C36 Guerbet alkoxylated carboxylate).

| Example | Surfactants and Co-Surfactants in Surfactant Package (in weight percent) |
|---|---|
| 1 | 0.09% alkoxylated C6-C16 alcohol<br>0.06% disulfonate |
| 2 | 0.1% alkoxylated C6-C16 alcohol<br>0.1% carboxylate<br>0.1% disulfonate |
| 3 | 0.15% alkoxylated C6-C16 alcohol<br>0.075% carboxylate<br>0.075% disulfonate |
| 4 | 0.2% alkoxylated C6-C16 alcohol<br>0.1% carboxylate |
| 5 | 0.2% alkoxylated C6-C16 alcohol<br>0.033% carboxylate<br>0.066% disulfonate |
| 6 | 0.2% alkoxylated C6-C16 alcohol<br>0.033% carboxylate<br>0.066% disulfonate |
| 7 | 0.2% alkoxylated C6-C16 alcohol<br>0.05% carboxylate<br>0.05% olefin sulfonate |
| 8 | 0.15% alkoxylated C6-C16 alcohol<br>0.05% carboxylate<br>0.05% olefin sulfonate<br>0.05% alkyl polyglucoside |
| 9 | 0.1% alkoxylated C6-C16 alcohol<br>0.05% carboxylate<br>0.05% olefin sulfonate<br>0.1% alkyl polyglucoside |
| 10 | 0.15% alkoxylated C6-C16 alcohol<br>0.07% carboxylate<br>0.03% olefin sulfonate<br>0.1% alkyl polyglucoside |
| 11 | 0.1% alkoxylated C6-C16 alcohol<br>0.04% carboxylate<br>0.05% olefin sulfonate<br>0.03% disulfonate<br>0.1% alkyl polyglucoside |
| 12 | 0.1% alkoxylated C6-C16 alcohol<br>0.04% carboxylate<br>0.06% disulfonate<br>0.1% alkyl polyglucoside |
| 13 | 0.15% alkoxylated C6-C16 alcohol<br>0.15% alkoxylated alkylphenol<br>0.1% olefin sulfonate<br>0.1% Guerbet alkoxylated carboxylate |
| 14 | 0.125% alkoxylated C6-C16 alcohol<br>0.175% alkoxylated alkylphenol<br>0.1% olefin sulfonate<br>0.1% Guerbet alkoxylated carboxylate |

| Example | Surfactants and Co-Surfactants in Surfactant Package (in weight percent) |
|---|---|
| 15 | 0.1% alkoxylated C6-C16 alcohol<br>0.2% alkoxylated alkylphenol<br>0.1% olefin sulfonate<br>0.1% Guerbet alkoxylated carboxylate |
| 16 | 0.12% alkoxylated C6-C16 alcohol<br>0.22% alkoxylated alkylphenol<br>0.08% olefin sulfonate<br>0.08% Guerbet alkoxylated carboxylate |
| 17 | 0.15% alkoxylated C6-C16 alcohol<br>0.15% alkoxylated alkylphenol<br>0.08% olefin sulfonate<br>0.06% Guerbet alkoxylated carboxylate<br>0.06% carboxylate |
| 18 | 0.15% alkoxylated C6-C16 alcohol<br>0.15% alkoxylated alkylphenol<br>0.05% olefin sulfonate<br>0.1% Guerbet alkoxylated carboxylate<br>0.05% disulfonate |
| 19 | 0.5% olefin sulfonate<br>0.5% Guerbet alkoxylated carboxylate<br>0.55% glycosides or glucosides |
| 20 | 0.5% olefin sulfonate<br>0.5% Guerbet alkoxylated carboxylate<br>0.5% glycosides or glucosides<br>0.25% alkoxylated C6-C16 alcohol |
| 21 | 0.5% olefin sulfonate<br>0.5% Guerbet alkoxylated carboxylate<br>0.5% glycosides or glucosides<br>0.5% alkoxylated C6-C16 alcohol |
| 22 | 0.5% olefin sulfonate<br>0.5% Guerbet alkoxylated carboxylate<br>1% glycosides or glucosides<br>0.5% alkoxylated C6-C16 alcohol |
| 23 | 0.05% olefin sulfonate<br>0.05% Guerbet alkoxylated carboxylate<br>0.05% glycosides or glucosides<br>0.05% alkoxylated C6-C16 alcohol |
| 24 | 0.075% glycosides or glucosides<br>0.075% alkoxylated C6-C16 alcohol |
| 25 | 0.1% alkoxylated C6-C16 alcohol<br>0.05% disulfonate |
| 26 | 0.1% alkoxylated C6-C16 alcohol<br>0.05% disulfonate<br>0.03% hydroxyalkyl alkylammonium chloride |
| 27 | 0.03% olefin sulfonate<br>0.04% Guerbet alkoxylated carboxylate<br>0.08% glycosides or glucosides<br>0.05% alkoxylated C6-C16 alcohol |
| 28 | 0.4% olefin sulfonate<br>0.4% Guerbet alkoxylated carboxylate<br>0.7% glycosides or glucosides<br>0.5% alkoxylated C6-C16 alcohol |
| 29 | 0.05% olefin sulfonate<br>0.1% glycosides or glucosides<br>0.05% alkoxylated C6-C16 alcohol |
| 30 | 0.05% olefin sulfonate<br>0.1% alkyl polyglucoside<br>0.05% alkoxylated C6-C16 alcohol |
| 31 | 0.05% olefin sulfonate<br>0.1% glycosides or glucosides<br>0.05% alkoxylated C6-C16 alcohol |
| 32 | 0.05% olefin sulfonate<br>0.1% alkyl polyglucoside<br>0.05% alkoxylated C6-C16 alcohol |
| 33 | 0.05% olefin sulfonate<br>0.1% alkyl polyglucoside<br>0.05% alkoxylated C6-C16 alcohol |
| 34 | 0.05% olefin sulfonate<br>0.05% glycosides or glucosides<br>0.05% alkoxylated C6-C16 alcohol<br>0.05% carboxylate |
| 35 | 0.05% olefin sulfonate<br>0.05% glycosides or glucosides<br>0.05% alkoxylated C6-C16 alcohol<br>0.05% carboxylate |
| 36 | 0.05% olefin sulfonate<br>0.05% alkyl polyglucoside<br>0.05% alkoxylated C6-C16 alcohol |
| 37 | 0.06% olefin sulfonate<br>0.05% alkyl polyglucoside<br>0.04% alkoxylated C6-C16 alcohol |
| 38 | 0.04% olefin sulfonate<br>0.08% glycosides or glucosides<br>0.05% alkoxylated C6-C16 alcohol<br>0.03% disulfonate |
| 39 | 0.035% olefin sulfonate<br>0.075% glycosides or glucosides<br>0.05% alkoxylated C6-C16 alcohol<br>0.04% disulfonate |
| 40 | 0.035% olefin sulfonate<br>0.07% glycosides or glucosides<br>0.045% alkoxylated C6-C16 alcohol<br>0.05% disulfonate |
| 41 | 0.1% alkoxylated C6-C16 alcohol<br>0.1% disulfonate |
| 42 | 0.25% Guerbet alkoxylated carboxylate<br>0.25% olefin sulfonate<br>0.5% glycosides or glucosides<br>0.5% co-solvent |
| 43 | 0.075% alkoxylated C12-C22 alcohol<br>0.075% disulfonate |
| 44 | 0.075% alkoxylated C6-C16 Guerbet alcohol<br>0.075% disulfonate |
| 45 | 0.075% alkoxylated C12-C22 Guerbet alcohol<br>0.075% disulfonate |
| 46 | 0.075% alkoxylated C6-C16 alcohol<br>0.075% disulfonate |
| 47 | 0.075% disulfonate<br>0.075% alkoxylated C6-C16 alcohol |
| 48 | 0.0625% disulfonate<br>0.0875% alkoxylated C6-C16 alcohol |
| 49 | 0.055% disulfonate<br>0.095% alkoxylated C6-C16 alcohol |
| 50 | 0.075% disulfonate<br>0.075% alkoxylated C6-C16 alcohol |
| 51 | 1% alkoxylated C6-C16 alcohol<br>0.5% disulfonate |
| 52 | 1% alkoxylated C6-C16 alcohol |
| 53 | 1% alkoxylated C6-C16 alcohol<br>2.25% sulfosuccinate |
| 54 | 0.25% Guerbet alkoxylated carboxylate<br>1% alkoxylated C6-C16 alcohol<br>2.25% sulfosuccinate |
| 55 | 0.25% Guerbet alkoxylated carboxylate<br>1% alkoxylated alkylphenol<br>2.25% sulfosuccinate |
| 56 | 0.25% Guerbet alkoxylated carboxylate<br>1% alkoxylated C6-C16 alcohol |
| 57 | 0.25 Guerbet alkoxylated carboxylate<br>1% alkoxylated alkylphenol |
| 58 | 0.65% carboxylate<br>0.35% alkoxylated C6-C16 alcohol |
| 59 | 0.325% carboxylate<br>0.925% alkoxylated C6-C16 alcohol |
| 60 | 0.25% olefin sulfonate<br>1.0% alkoxylated C6-C16 alcohol |
| 61 | 0.15% olefin sulfonate<br>0.2% Guerbet alkoxylated carboxylate<br>0.92% carboxylate |
| 62 | 0.65% carboxylate<br>0.35% second carboxylate |
| 63 | 0.65% carboxylate<br>0.35% alkoxylated C6-C16 alcohol<br>1% olefin sulfonate |
| 64 | 1% alkoxylated alcohol<br>1% olefin sulfonate |
| 65 | 0.5% alkoxylated alcohol<br>0.5% olefin sulfonate<br>0.25% carboxylate |

| Example | Surfactants and Co-Surfactants in Surfactant Package (in weight percent) |
|---|---|
| 66 | 0.6% co-solvent |
|  | 0.6% olefin sulfonate |
| 67 | 0.6% co-solvent |
|  | 0.3% disulfonate |
|  | 0.3% olefin sulfonate |
| 68 | 0.6% Guerbet alkoxylated carboxylate |
|  | 0.6% disulfonate |
| 69 | 0.6% co-solvent |
|  | 0.4% disulfonate |
|  | 0.2% olefin sulfonate |
| 70 | 0.5% alkoxylated C6-C16 alcohol |
|  | 0.4% disulfonate |
|  | 0.3% olefin sulfonate |
| 71 | 1% alkoxylated C6-C16 alcohol |
| 72 | 0.9% alkoxylated C6-C16 alcohol |
|  | 0.6% disulfonate |
| 73 | 0.4% alkoxylated C6-C16 alcohol |
|  | 0.35% disulfonate |
|  | 0.25% olefin sulfonate |
|  | 0.5% co-solvent |
| 74 | 0.25% Guerbet alkoxylated carboxylate |
|  | 0.5% alkoxylated C6-C16 alcohol |
|  | 0.35% disulfonate |
|  | 0.15% olefin sulfonate |
|  | 0.35% co-solvent |
| 75 | 0.25% Guerbet alkoxylated carboxylate |
|  | 0.25% alkoxylated C6-C16 alcohol |
|  | 0.25% olefin sulfonate |
|  | 0.25% co-solvent |
| 76 | 0.25% Guerbet alkoxylated carboxylate |
|  | 0.25% alkoxylated C6-C16 alcohol |
|  | 0.25% olefin sulfonate |
|  | 0.25% alkoxylated alcohol |
| 77 | 0.25% Guerbet alkoxylated carboxylate |
|  | 0.35% olefin sulfonate |
|  | 0.5% alkoxylated alcohol |
| 78 | 0.25% Guerbet alkoxylated carboxylate |
|  | 0.25% alkoxylated C6-C16 alcohol |
|  | 0.15% olefin sulfonate |
|  | 0.1% disulfonate |
|  | 0.25% co-solvent |
| 79 | 0.25% Guerbet alkoxylated carboxylate |
|  | 0.25% alkoxylated C6-C16 alcohol |
|  | 0.25% olefin sulfonate |
|  | 0.25% glycosides or glucosides |
|  | 0.25% co-solvent |
|  | 0.15% disulfonate |
| 80 | 0.25% Guerbet alkoxylated carboxylate |
|  | 0.25% olefin sulfonate |
|  | 0.5% glycosides or glucosides |
|  | 0.25% co-solvent |
| 81 | 0.15% alkoxylated C12-C22 alcohol |
| 82 | 0.075% disulfonate |
|  | 0.075% alkoxylated C12-C22 alcohol |
| 83 | 0.75% alkoxylated C12-C22 alcohol |
|  | 0.75% disulfonate |
| 84 | 0.075% alkoxylated C12-C22 alcohol |
|  | 0.075% alkoxylated C6-C16 Guerbet alcohol |
| 85 | 0.15% alkoxylated C6-C16 Guerbet alcohol |
| 86 | 0.075% disulfonate |
|  | 0.075% alkoxylated C6-C16 Guerbet alcohol |
| 87 | 0.075% alkoxylated C6-C16 Guerbet alcohol |
|  | 0.075% disulfonate |
|  | 0.05% co-solvent |
| 88 | 0.1% alkoxylated C6-C16 alcohol |
|  | 0.05% disulfonate |
| 89 | 1% alkoxylated C6-C16 alcohol |
|  | 0.5% disulfonate |
| 90 | 0.075% alkoxylated C6-C16 Guerbet alcohol |
|  | 0.075% disulfonate |
| 91 | 0.075% alkoxylated C6-C16 Guerbet alcohol |
|  | 0.125% disulfonate |
| 92 | 0.075% alkoxylated C12-C22 alcohol |
|  | 0.125% disulfonate |
| 93 | 0.75% disulfonate |
|  | 0.75% alkoxylated C12-C22 alcohol |
| 94 | 0.75% alkoxylated C6-C16 Guerbet alcohol |
|  | 0.75% disulfonate |
| 95 | 0.1% alkoxylated C6-C16 Guerbet alcohol |
|  | 0.05% disulfonate |
| 96 | 0.75% disulfonate |
|  | 0.75% alkoxylated C6-C16 Guerbet alcohol |
| 97 | 0.75% alkoxylated C6-C16 alcohol |
|  | 0.75% disulfonate |
| 98 | 0.75% disulfonate |
|  | 0.75% alkoxylated C6-C16 alcohol |
| 99 | 0.1% alkoxylated C6-C16 alcohol |
|  | 0.05% disulfonate |
| 100 | 0.09% alkoxylated C6-C16 alcohol |
|  | 0.06% disulfonate |
| 101 | 0.1% alkoxylated C6-C16 alcohol |
|  | 0.1% disulfonate |
|  | 0.1% Guerbet alkoxylated carboxylate |
| 102 | 0.1% alkoxylated C6-C16 alcohol |
|  | 0.1% disulfonate |
| 103 | 0.65% Guerbet alkoxylated carboxylate |
|  | 0.35% olefin sulfonate |
|  | 0.33% alkoxylated alkylphenol |
|  | 0.5% co-solvent |
|  | 0.25% second co-solvent |
| 104 | 0.075% alkoxylated C6-C16 alcohol |
|  | 0.075% benzenesulfonic acid, decyl(sulfophenoxy)-disodium salt |
| 105 | 0.15% alkoxylated C6-C16 alcohol |
|  | 0.05% benzenesulfonic acid, decyl(sulfophenoxy)-disodium salt |
| 106 | 0.9% Guerbet alkoxylated carboxylate |
|  | 0.9% alkoxylated C6-C16 alcohol |
|  | 1.2% olefin sulfonate |
|  | 0.225% co-solvent |
|  | 2% sodium tetraborate |
|  | 1% acetic acid |
| 107 | 1% alkoxylated C6-C16 alcohol |
|  | 1% olefin sulfonate |
|  | 2% sodium tetraborate |
|  | 1% acetic acid |
| 108 | 1% alkoxylated C6-C16 alcohol |
|  | 0.75% olefin sulfonate |
|  | 0.5% disulfonate |
|  | 2% sodium tetraborate |
|  | 1% acetic acid |
| 109 | 1% alkoxylated C6-C16 alcohol |
|  | 0.75% olefin sulfonate |
|  | 0.3% disulfonate |
|  | 2% sodium tetraborate |
|  | 1% acetic acid |
| 110 | 0.5% alkoxylated C6-C16 alcohol |
|  | 0.85% olefin sulfonate |
|  | 0.15% disulfonate |
|  | 2% sodium tetraborate |
|  | 1% acetic acid |
| 111 | 0.9% Guerbet alkoxylated carboxylate |
|  | 0.9% alkoxylated C6-C16 alcohol |
|  | 1.2% olefin sulfonate |
|  | 0.225% co-solvent |
|  | 2% sodium tetraborate |
|  | 1% citric acid |
| 112 | 1% alkoxylated C6-C16 alcohol |
|  | 0.75% olefin sulfonate |
|  | 0.3% disulfonate |
|  | 2% sodium tetraborate |
|  | 1% citric acid |
| 113 | 0.9% Guerbet alkoxylated carboxylate |
|  | 0.9% alkoxylated C6-C16 alcohol |
|  | 1.2% olefin sulfonate |
|  | 0.225% co-solvent |
|  | 2% sodium tetraborate |
|  | 1.1% citric acid |

-continued

| Example | Surfactants and Co-Surfactants in Surfactant Package (in weight percent) |
|---|---|
| 114 | 0.5% Guerbet alkoxylated carboxylate<br>0.25% C6-C16 alcohol alkoxylated carboxylate<br>0.5% alkoxylated C6-C16 alcohol<br>0.5% olefin sulfonate<br>0.1% disulfonate<br>0.5% co-solvent<br>2% sodium tetraborate<br>1% acetic acid |
| 115 | 0.5% C6-C16 alcohol alkoxylated carboxylate<br>0.25% alkoxylated C6-C16 alcohol<br>0.15% olefin sulfonate<br>0.35% disulfonate<br>2% sodium tetraborate<br>1% acetic acid |
| 116 | 0.5% Guerbet alkoxylated carboxylate<br>0.25% C6-C16 alcohol alkoxylated carboxylate<br>0.5% alkoxylated C6-C16 alcohol<br>0.5% olefin sulfonate<br>0.1% disulfonate<br>0.5% co-solvent<br>0.02% cetyl betaine<br>2% sodium tetraborate<br>1% acetic acid |
| 117 | 0.075% a first alkoxylated C6-C16 alcohol<br>0.075% a second alkoxylated C6-C16 alcohol<br>0.125% disulfonate |

In some embodiments, the one or more surfactants in the aqueous solution can decrease the interfacial tension (IFT) of the aqueous solution with hydrocarbons in the reservoir. Reducing the IFT can decrease pressure required to drive the aqueous solution into the formation matrix. In addition, decreasing the IFT reduces water block during production, facilitating the flow of hydrocarbons from the formation to the wellbore (e.g., facilitating the flow of hydrocarbons back through the fractures and to the wellbore). In this way, hydrocarbon recovery can be facilitated by the one or more surfactants in the aqueous solution.

In some embodiments, the one or more surfactants in the aqueous solution can change the wettability of the reservoir. In particular, in embodiments where the reservoir is oil-wet or mixed-wet, the one or more surfactants in the aqueous solution can make the reservoir more water-wet. By increasing the water-wetness of the reservoir, the formation will imbibe injected aqueous solution into the formation matrix, leading to a corresponding flow of hydrocarbon from regions within the formation back to the fractures. In this way, hydrocarbon recovery can be facilitated by the one or more surfactants in the aqueous solution.

Nanoparticles

In some embodiments, the aqueous solution can include nanoparticles. The nanoparticles can include any of the component of the aqueous solution described herein. Examples of suitable nanoparticles are described, for example, in U.S. Pat. No. 10,266,750, which is hereby incorporated by reference in its entirety.

All of the compositions and methods disclosed and claimed herein can be made and executed without undue experimentation in light of the present disclosure. While the compositions and methods of this disclosure have been described in terms of preferred embodiments, it will be apparent to those of skill in the art that variations may be applied to the compositions and methods and in the steps or in the sequence of steps of the methods described herein without departing from the concept, spirit and scope of the disclosure. More specifically, it will be apparent that certain agents which are both chemically related may be substituted for the agents described herein while the same or similar results would be achieved. All such similar substitutes and modifications apparent to those skilled in the art are deemed to be within the spirit, scope and concept of the disclosure as defined by the appended claims.

By way of non-limiting illustration, examples of certain embodiments of the present disclosure are given below.

EXAMPLES

A complexing agent was identified that can bind $CO_2$ by forming a carbonate or bicarbonate salt of the complexing agent under some conditions (e.g., when the temperature is below 90° C.). However, under other conditions (e.g., at a temperature above 90° C.), a carbonate or bicarbonate salt of the complexing agent can evolve $CO_2$. Thus, depending on the conditions and composition employed, the composition can be used to sequester carbon dioxide or to generate/supplement a foam.

Example 1: DAC Iminoguanidine for Plugging

Figure 2:
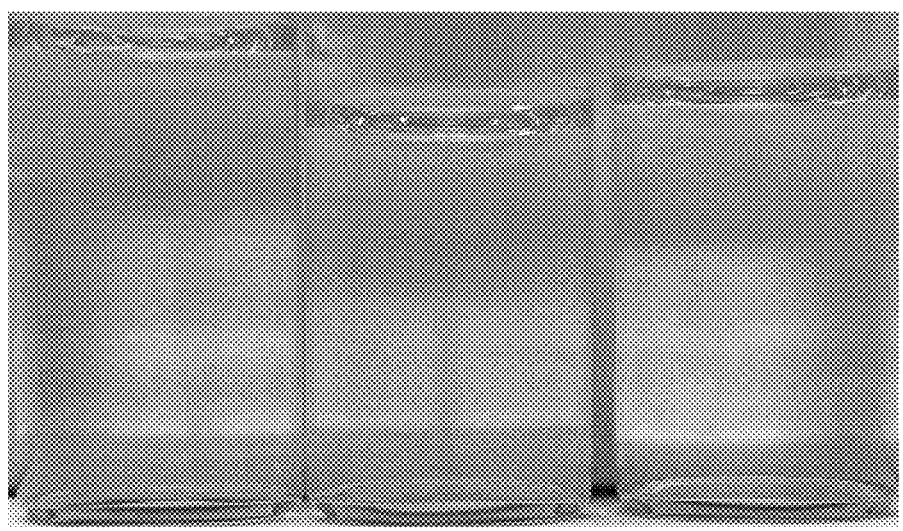
FIG. 2 shows images of the solubility of different formulation.

Solubility limit Ksp at 25° C. and 20 minutes of sonication. Solubility limit strongly depends on salinity: nonlinear dependence. See FIG. 2 and Table 1

TABLE 1

| NaCl (wt %) | 1 | 0.1 | 20 |
|---|---|---|---|
| GBIG (wt %) | 0.397 | 0.243 | 0.064 |
| GBIG Ksp | 0.0234 | 0.0143 | 0.0038 |
| Appearance | Clear, yellow solution | Clear, yellow solution | Clear, yellow solution |

$GBIG \cdot (HCO_3)_2(H_2O)_2(s)$ Precipitation Upon Contacting with $CO_{2(g)}$ Pour approximately 5 ml of the synthesized chemical solution into the polycarbonate reservoir. Open the $CO_2$ gas cylinder valve and take note of the pressure. Open the delivery valve of the regulator. Increase the delivery pressure to 0.5 psig by turning the regulator knob. Open the 3-way valve connected to the bottom of the polycarbonate reservoir to initiate $CO_2$ gas flow into the reservoir. Watch for precipitation in the liquid through the transparent polycarbonate reservoir wall for 30 minutes. For temperature dependence testing: Samples were placed in ovens at temperature of interest for 30 minutes, then used in the procedure detailed above.

Figure 3A:
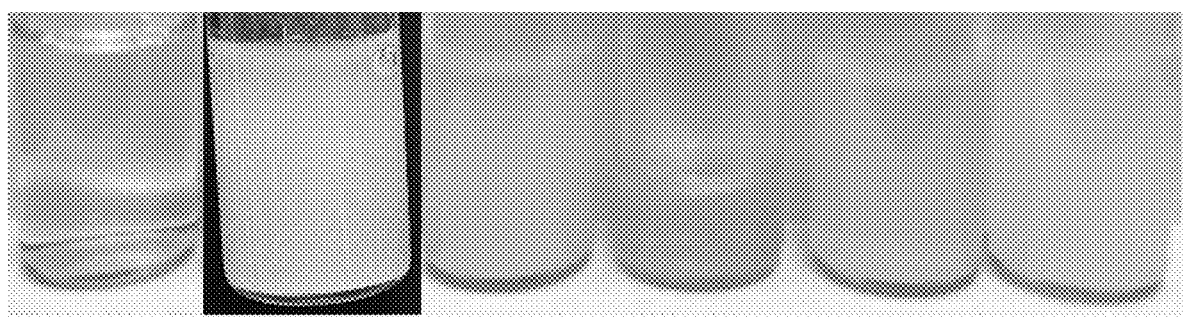
FIG. 3A-3C show images for results of the precipitation tests for varying salinity and GBIG concentration (3A) for Formulation including 1 wt % NaCl and 0.397 wt % GBIG, (3B) for Formulation including 0.1 wt % NaCl and 0.243 wt % GBIG, (3C) for Formulation including 20 wt % NaCl and 0.064 wt % GBIG.
Figure 3B:
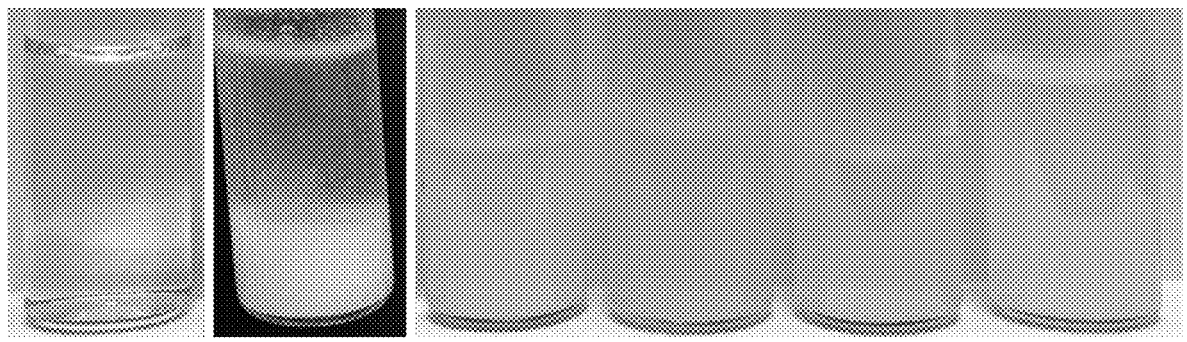
Figure 3C:
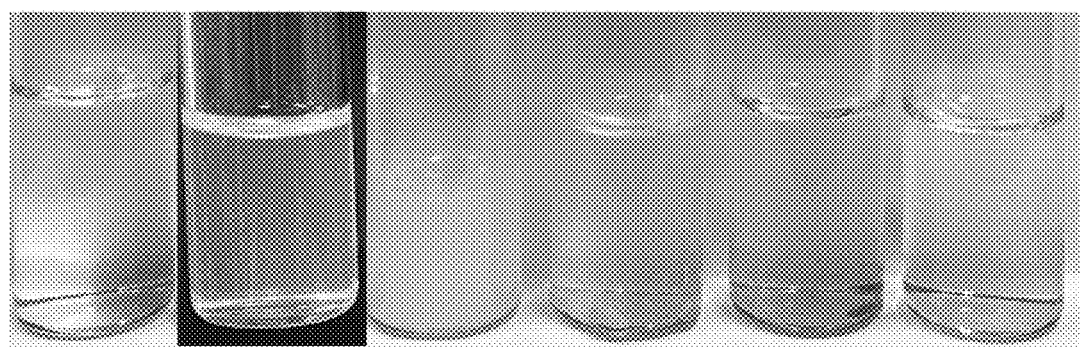

Results for the precipitation test for varying salinity and glyoxal-bis(iminoguanidine) (GBIG) concentration are shown in Tables 2-4 and FIGS. 3A-3C. Table 2 and FIG. 3A show results for 1 wt % NaCl and 0.397 wt % GBIG. Table 3 and FIG. 3B show results for 0.1 wt % NaCl and 0.243 wt % GBIG. Table 4 and FIG. 3C show results for 20 wt % NaCl and 0.064 wt % GBIG.

TABLE 2

| Temperature | 25° C. | 25° C. | 115° C. | 100° C. | 80° C. | 65° C. |
|---|---|---|---|---|---|---|
| Precipitation? | Initial | Yes | Yes | Yes | Yes | Yes |

TABLE 2-continued

| Appearance | Clear, yellow | Cloudy, suspended solids | Cloudy, suspended solids | Cloudy, suspended solids | Cloudy, suspended solids | Cloudy, suspended solids |
|---|---|---|---|---|---|---|

TABLE 3

| Temperature | 25° C. | 25° C. | 115° C. | 100° C. | 80° C. | 65° C. |
|---|---|---|---|---|---|---|
| Precipitation? | Initial | Yes | Yes | Yes | Yes | Yes |
| Appearance | Clear, yellow | Cloudy, settled solids | Cloudy, suspended solids | Cloudy, suspended solids | Cloudy, suspended solids | Cloudy, suspended solids |

TABLE 4

| Temperature | 25° C. | 25° C. | 115° C. | 100° C. | 80° C. | 65° C. |
|---|---|---|---|---|---|---|
| Precipitation? | Initial | Yes | Yes | Yes | Yes | Yes |
| Appearance | Clear, yellow | Hazy, suspended solids | Cloudy, suspended solids | Clear, suspended solids | Clear, suspended solids | Clear, suspended solids |

Core Plugging Experiment: Procedure

Figure 4:
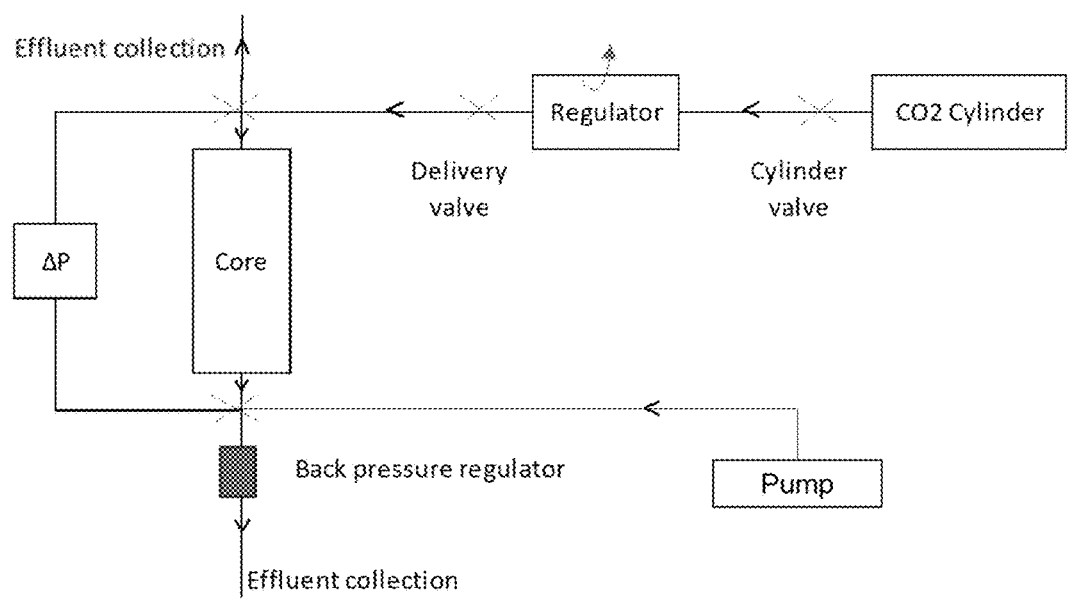
FIG. 4 illustrates a core plugging experimental process flow diagram.

A core plugging experimental process flow diagram is illustrated in FIG. 4. Table 5 shows the experimental conditions used in the core plugging experiments.

TABLE 5

| Pore Volume | 59 ml |
|---|---|
| Permeability | 1.43 Darcy |
| Initial Saturation | 100% Brine |
| Saturation phase | NaCl 1 wt % |

A 6 inch core was saturated with 1 wt % NaCl brine by vacuum saturation. Brine permeability was measured for 1 wt % NaCl brine for flow rates ranging from 11 ft/day to 244 ft/day. The core was saturated with GBIG solution (1 wt % NaCl, 0.397 wt % GBIG) by injection from the bottom of the core for at least 3 pore volumes. The liquid injection was stopped, the core was shut in and then turned 180 degrees so the injection port was now at the top. $CO_{2(g)}$ cylinder was connected to the top of the core with the regulator set to 0 psi delivery. The regulator delivery pressure was increased to 4 psi, below the 5 psi backpressure regulator (BPR) on the effluent line at the bottom of the core. The pressure drop was monitored, waiting for steady state. After steady state pressure drop is reached, the regulator delivery pressure is stepped up to 5 psi and the pressure drop is monitored again for steady state. The effluent is collected downstream of the BPR. Monitor the effluent flow rate. After steady state pressure drop is reached, the regulator delivery pressure is stepped up to the next pressure of investigation. The effluent is collected, and the pressure drop is monitored for steady state. Repeat step 10 until the maximum delivery pressure is reached (19 psi).

Figure 5A:
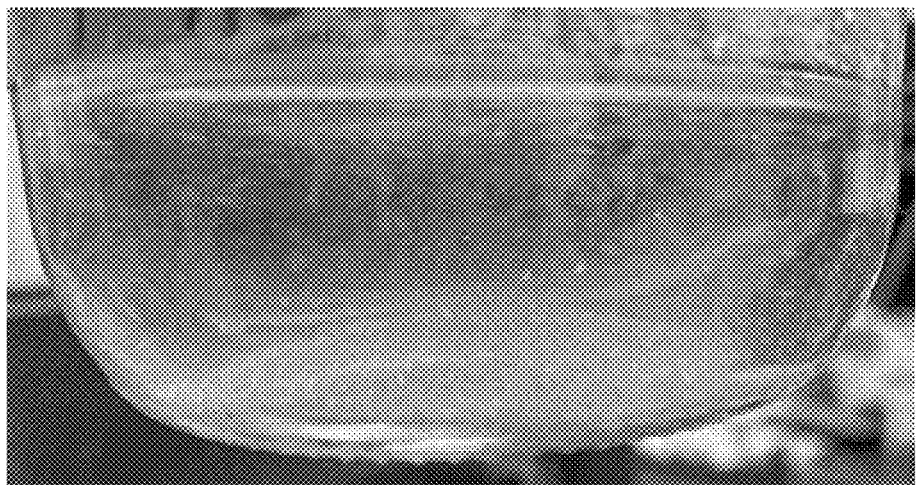
FIG. 5A-5B show images for injected fluid 1 wt % NaCl and 0.4 wt % GBIG (FIG. 5A) and produced fluid (FIG. 5B).
Figure 5B:
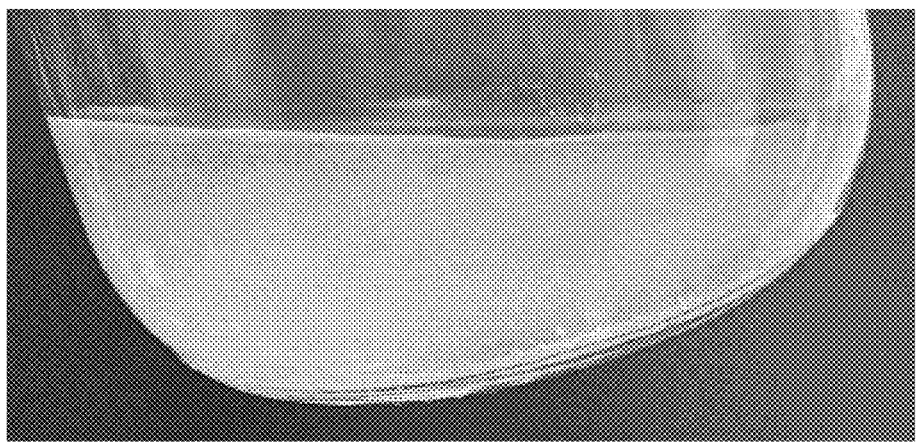
Figure 6:
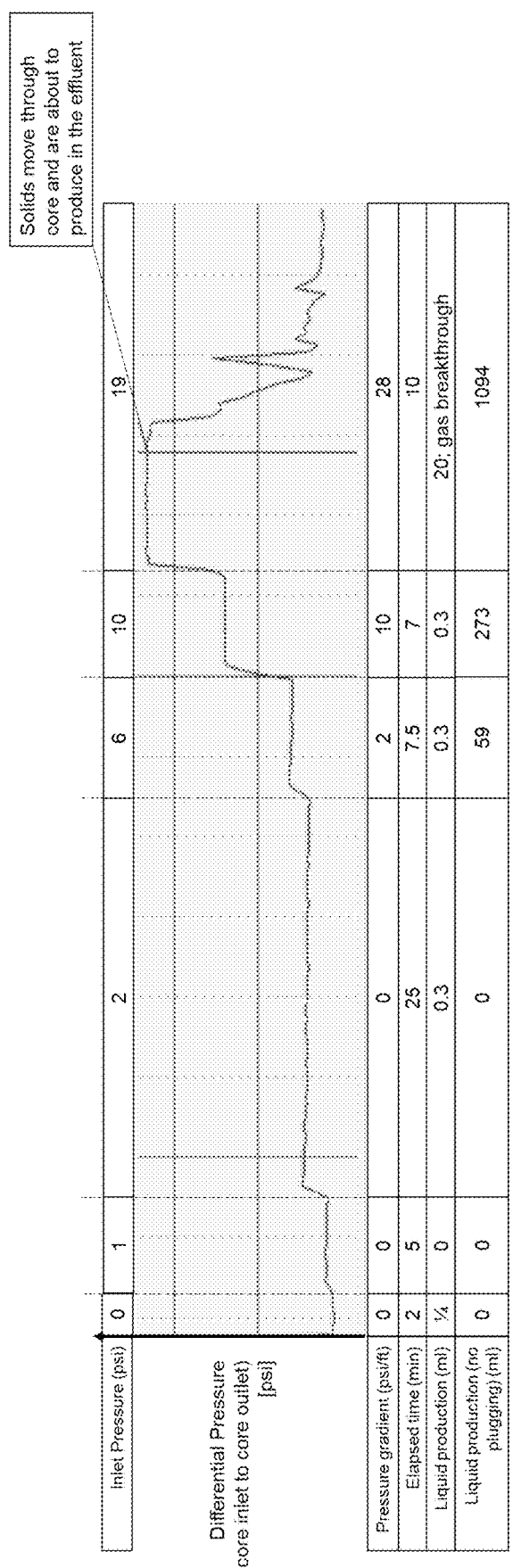
FIG. 6 shows a graph of the Bentheimer, 1.4 darcy permeability $CO_{2(g)}$ pressure gradient over time.
Figure 7:
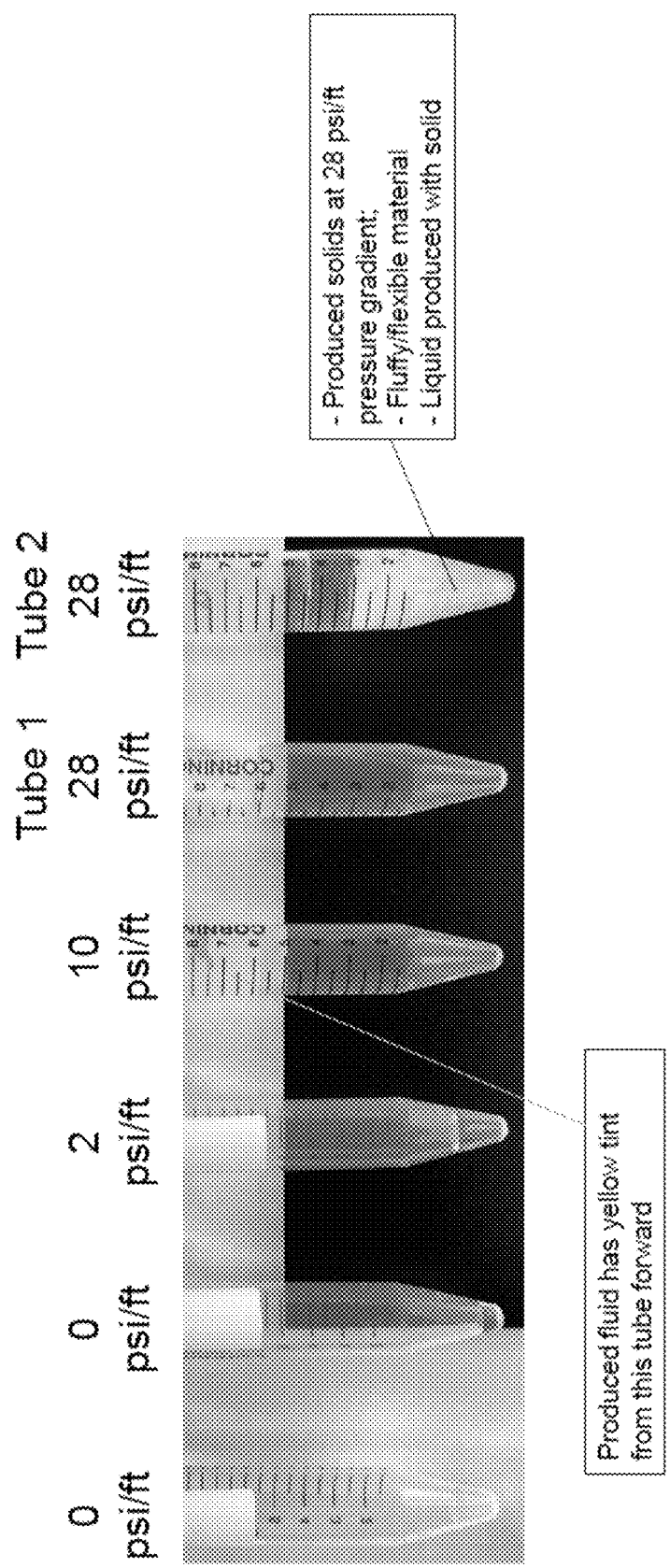
FIG. 7 show images of high permeability Bentheimer core flood results from 0 psi/ft to 28 psi/ft.

Results are shown in FIGS. 5A and 5B for injected fluid 1 wt % NaCl and 0.4 wt % GBIG (FIG. 5A) and produced fluid (FIG. 5B). The injected fluid had a clear yellow solution appearance. The produced fluid during core saturation had a colorless solution with suspended solids. The Bentheimer, 1.4 darcy permeability $CO_{2(g)}$ pressure gradient over time is shown in FIG. 6. The results show that differential pressure stabilized at each applied pressure gradient step from 1 to 38 psi. Liquid production was minimal for each pressure gradient step up to 28 psi/ft. 28 psi/ft pressure gradient was sufficient to mobilize the solid plug and produce it in the effluent. High permeability Bentheimer core flood results are shown in FIG. 7. Images of the produced fluids at different pressure gradients show produced fluids starting from 10 psi/ft through 28 psi/ft had a yellow tint and liquid produced with solids (fluffy/flexible material) at 28 psi/ft pressure gradient (FIG. 7).

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein; however, other combinations of steps, elements, components, and constituents are included, even though not explicitly stated.

What is claimed is:

1. A method for sequestering carbon dioxide within a subterranean formation, the method comprising:
   contacting carbon dioxide present in the subterranean formation with an iminoguanidine complexing agent, resulting in precipitation of a carbonate or bicarbonate salt of the iminoguanidine complexing agent within the subterranean formation,
   wherein the subterranean formation has a temperature below 90° C.; and
   wherein the iminoguanidine complexing agent is defined by Formula I-1 or Formula I-2:

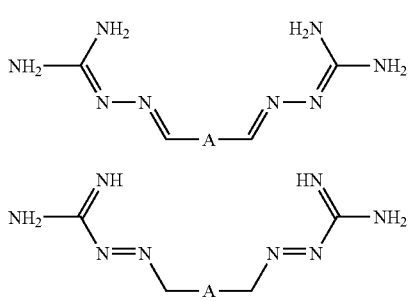

Formula I-1

Formula I-2 wherein
A is a ring-containing moiety or a bond, and
one or more of the hydrogen atoms in Formula I-1 or Formula I-2 may be replaced with one or more-equivalent number of methyl groups.

2. The method of claim 1, wherein contacting comprises injecting an aqueous composition comprising the iminoguanidine complexing into the subterranean formation via a wellbore in fluid communication with the subterranean formation.

3. The method of claim 2, wherein the iminoguanidine complexing agent is present in the aqueous composition in a concentration of from 0.1% to 10% by weight, based on the total weight of the aqueous composition.

4. The method of claim 2, wherein the aqueous composition comprises an aqueous solution further comprising one or more of an acid, an alkali agent, a polymer, a gelling agent, a crosslinker, a biocide, a scale inhibitor, a breaker, a pH adjusting agent, a non-emulsifier agent, an iron control agent, a chelating agent, a corrosion inhibitor, a clay stabilizing agent, a wettability alteration chemical, an anti-foam agent, a sulfide scavenger, a mobility control agent, a co-solvent, a surfactant(s), a surfactant package, or any combination thereof.

5. The method of claim 4, wherein the aqueous solution further comprises the surfactant(s) and wherein the surfactant(s) comprises an anionic surfactant, a non-ionic surfactant, a cationic surfactant, a zwitterionic surfactant, or any combination thereof.

6. The method of claim 1, wherein the iminoguanidine complexing agent has a Ksp value of from $1 \times 10^{-4}$ to 1.

7. The method of claim 1, wherein the carbonate or bicarbonate salt of the iminoguanidine complexing agent has a Ksp value of from $1 \times 10^{-8}$ to $1 \times 10^{-14}$.

8. The method of claim 1, wherein the iminoguanidine complexing agent and the carbonate or bicarbonate salt of the iminoguanidine complexing agent have a difference in Ksp value of from 4 to 14 orders of magnitude.

9. The method of claim 1, wherein the iminoguanidine complexing agent is selected from:

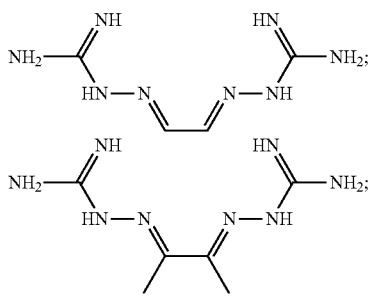

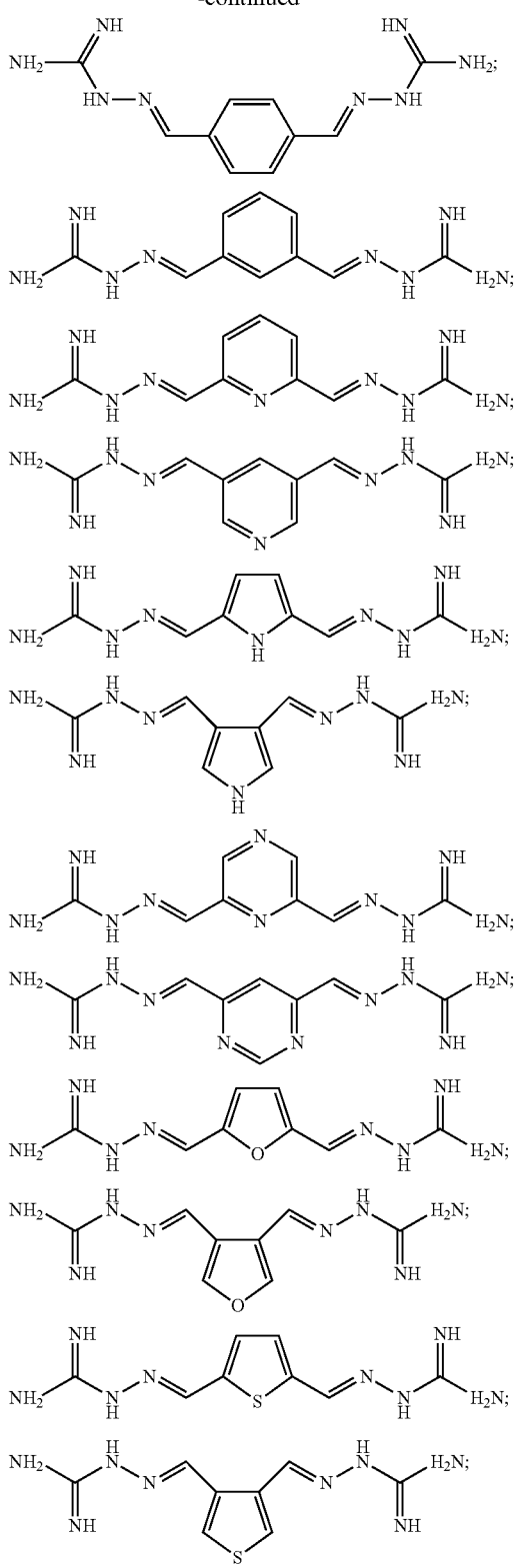

or any combination thereof.

10. The method of claim 1, wherein the carbonate or bicarbonate salt of the iminoguanidine complexing agent is defined by the following structures of Formula I-a or Formula I-b:

Formula I-a

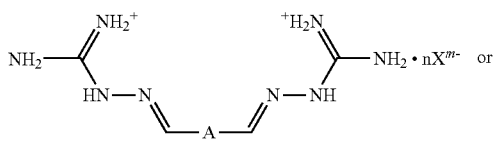

Formula I-b

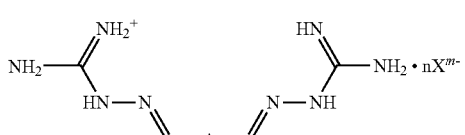

wherein

A is a ring-containing moiety or a bond; one or more of the hydrogen atoms in Formula I-a or Formula I-b may be replaced with one or more equivalent number of methyl groups;

$X^{m\sim}$ is a carbonate or bicarbonate anion, with m being 1 for bicarbonate and 2 for carbonate; and n is 0.5, 1, or 2; provided that n×m=2 for Formula I-a, and n×m=1 in the case of Formula I-b.

11. The method of claim 1, wherein the carbonate or bicarbonate salt of the iminoguanidine complexing agent is selected from:

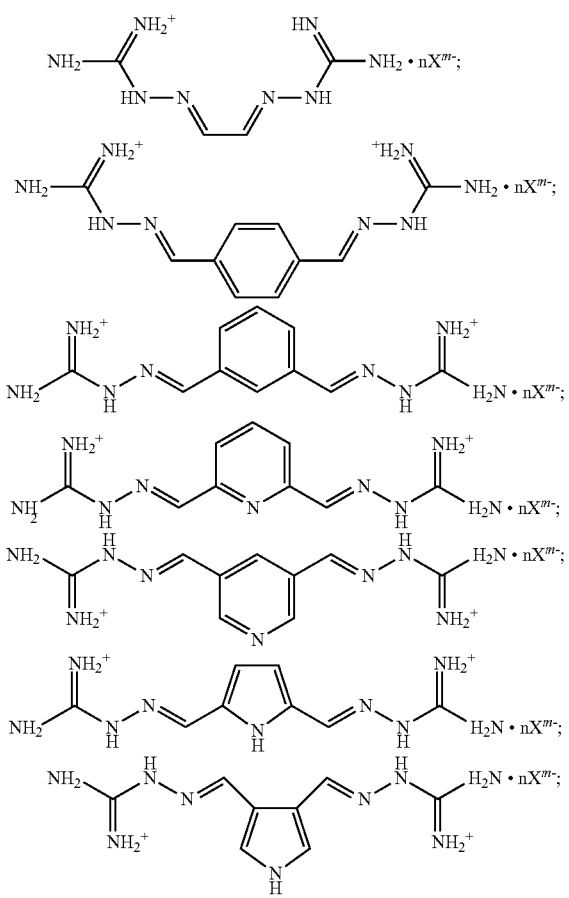

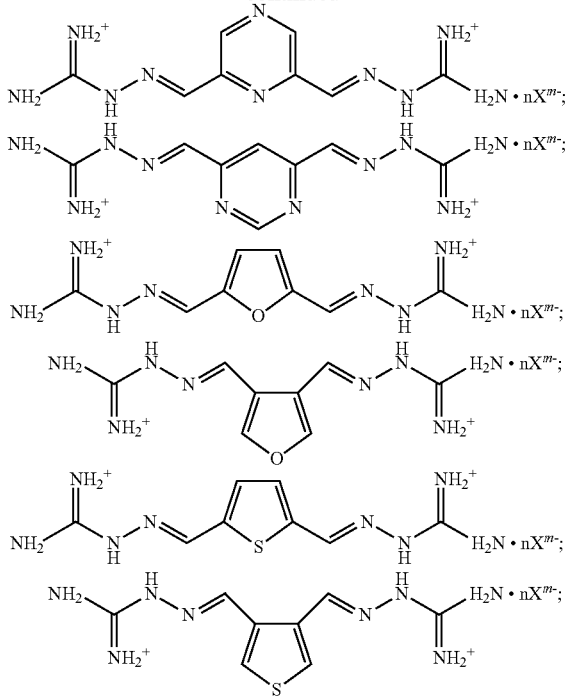

$X^{m\sim}$ is a carbonate or bicarbonate anion, with m being 1 for bicarbonate and 2 for carbonate; and n is 0.5, 1, or 2 or any combination thereof.

12. The method of claim 1, wherein the iminoguanidine complexing agent comprises a metal salt with a Ksp value of from $1\times10^{-4}$ to 1, and which reacts with $CO_2$ to form a carbonate or bicarbonate salt with a Ksp value of from $1\times10^{-8}$ to $1\times10^{-14}$.

13. The method of claim 1, wherein the subterranean formation has a temperature below 65° C.

14. The method of claim 1, further comprising injecting $CO_2$ through the wellbore and into the subterranean formation.

15. A method of influencing migration of a gas or fluid within a subterranean formation, the method comprising:
   injecting an aqueous composition comprising an iminoguanidine complexing agent into the subterranean formation via a wellbore in fluid communication with the subterranean formation;
   displacing the iminoguanidine complexing agent to a desired location within the subterranean formation; and
   contacting the iminoguanidine complexing agent with carbon dioxide, resulting in precipitation of a carbonate or bicarbonate salt of the iminoguanidine complexing agent at the desired location within the subterranean formation,
   wherein the iminoguanidine complexing agent is defined by Formula I-1 or Formula I-2:

Formula I-1

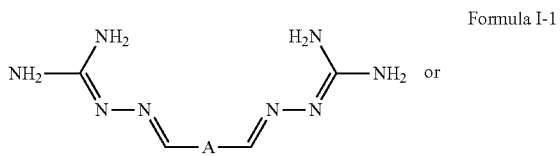

-continued

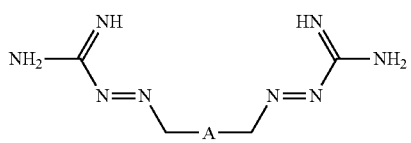

Formula I-2 wherein
A is a ring-containing moiety or a bond, and
one or more of the hydrogen atoms in Formula I-1 or Formula I-2 may be replaced with one or more equivalent number of methyl groups; and
wherein the subterranean formation has a temperature below 90° C.

16. A method of reducing migration of a gas or fluid within a subterranean formation, the method comprising:
injecting an aqueous composition comprising an iminoguanidine complexing agent into the subterranean formation via a wellbore in fluid communication with the subterranean formation; and
displacing the iminoguanidine complexing agent to a desired location within the subterranean formation to form a barrier to gas or fluid penetration;
wherein when the iminoguanidine complexing agent contacts carbon dioxide, a precipitate comprising a carbonate or bicarbonate salt of the iminoguanidine complexing agent forms at the desired location within the subterranean formation,
wherein the iminoguanidine complexing agent is defined by Formula I-1 or Formula I-2:

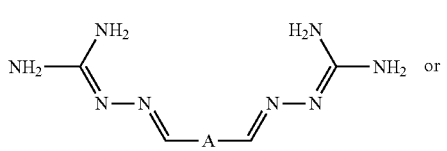

Formula I-1

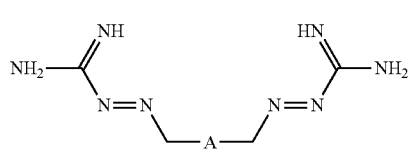

Formula I-2 wherein
A is a ring-containing moiety or a bond, and
one or more of the hydrogen atoms in Formula I-1 or Formula I-2 may be replaced with one or more equivalent number of methyl groups; and
wherein the subterranean formation has a temperature below 90° C.

* * * * *

UNITED STATES PATENT AND TRADEMARK OFFICE
CERTIFICATE OF CORRECTION

| | | |
|---|---|---|
| PATENT NO. | : 12,410,355 B2 | |
| APPLICATION NO. | : 18/234318 | |
| DATED | : September 9, 2025 | |
| INVENTOR(S) | : Sriram Chandrasekhar et al. | |

It is certified that error appears in the above-identified patent and that said Letters Patent is hereby corrected as shown below:

In the Claims

In Claim 2, Column 51, Line 22, replace "the iminoguanidine complexing into" with -- the iminoguanidine complexing agent into --

In Claim 10, Column 53, Lines 9-16, should read: --

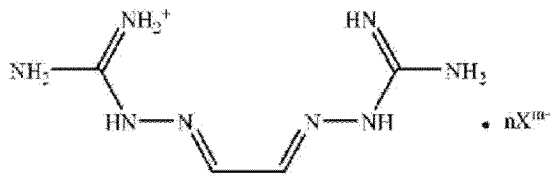

Formula I-b

--

Signed and Sealed this
Sixth Day of January, 2026

John A. Squires
*Director of the United States Patent and Trademark Office*